United States Patent
Lust et al.

(10) Patent No.: US 9,951,443 B2
(45) Date of Patent: Apr. 24, 2018

(54) SEPARATORS, ELECTRODES, HALF-CELLS, AND CELLS OF ELECTRICAL ENERGY STORAGE DEVICES

(71) Applicant: UNIVERSITY OF TARTU, Tartu (EE)

(72) Inventors: Enn Lust, Tartu (EE); Kerli Liivand, Tartu (EE); Ingrid Vaas, Tartu (EE); Thomas Thomberg, Tartu (EE); Indrek Tallo, Tartu (EE); Heisi Kurig, Tartu (EE); Tavo Romann, Tartu (EE); Rait Kanarbik, Tartu (EE); Tauno Tooming, Tartu (EE); Ester Tee, Tartu (EE); Alar Jänes, Tartu (EE)

(73) Assignee: UNIVERSITY OF TARTU, Tartu (EE)

( * ) Notice: Subject to any disclaimer, the term of this patent is extended or adjusted under 35 U.S.C. 154(b) by 65 days.

(21) Appl. No.: 14/986,451

(22) Filed: Dec. 31, 2015

(65) Prior Publication Data
US 2017/0191189 A1    Jul. 6, 2017

(51) Int. Cl.
*D01D 5/00* (2006.01)
*H01M 2/14* (2006.01)
(Continued)

(52) U.S. Cl.
CPC ............ *D01D 5/003* (2013.01); *H01G 11/04* (2013.01); *H01G 11/38* (2013.01); *H01G 11/46* (2013.01);
(Continued)

(58) Field of Classification Search
CPC ...... D01D 5/003; H01M 2/145; H01M 2/162; H01M 2/1673; H01M 4/0407;
(Continued)

(56) References Cited

U.S. PATENT DOCUMENTS

| | | | | |
|---|---|---|---|---|
| 6,419,712 B1 * | 7/2002 | Haverstick | ............ | H01M 4/622 29/623.1 |
| 2003/0147802 A1 * | 8/2003 | Smalley | ............... | B82Y 30/00 423/447.3 |

(Continued)

FOREIGN PATENT DOCUMENTS

| | | | | |
|---|---|---|---|---|
| CN | 1397488 | * | 2/2003 | ............ C01B 31/02 |
| CN | 103147226 | * | 6/2013 | |
| TW | 200738334 | * | 4/2006 | ............. B01J 23/42 |

OTHER PUBLICATIONS

Samatham et al. Polymer Engineering and Science 2006 vol. 46 No. 7 pp. 954-959.*

(Continued)

*Primary Examiner* — Miriam Stagg
*Assistant Examiner* — Aaron J Greso
(74) *Attorney, Agent, or Firm* — Merle W. Richman, III; CRK Law LLP

(57) ABSTRACT

Electrodes, separators, half-cells, and full cells of electrical energy storage devices are made with electrospinning and isostatic compression. The electrical energy storage device may include electrochemical double layer capacitors (EDLCs, also known as "supercapacitors"), hybrid supercapacitors ("HSCs"), Li-ion capacitors and electrochemical storage devices, Na-ion capacitors and electrochemical storage devices, polymer electrolyte fuel cells, and still other capacitors and electrochemical storage cells.

21 Claims, 49 Drawing Sheets

(51) Int. Cl.
  *H01M 2/16* (2006.01)
  *H01M 4/88* (2006.01)
  *H01M 4/04* (2006.01)
  *H01M 4/92* (2006.01)
  *H01M 8/1081* (2016.01)
  *H01M 8/1086* (2016.01)
  *H01M 8/1004* (2016.01)
  *H01G 11/86* (2013.01)
  *H01G 11/04* (2013.01)
  *H01G 11/38* (2013.01)
  *H01G 11/46* (2013.01)
  *H01G 11/52* (2013.01)
  *H01G 11/70* (2013.01)
  *H01M 4/62* (2006.01)
  *H01M 8/1018* (2016.01)
  *H01M 10/052* (2010.01)

(52) U.S. Cl.
  CPC ............ *H01G 11/52* (2013.01); *H01G 11/70* (2013.01); *H01G 11/86* (2013.01); *H01M 2/145* (2013.01); *H01M 2/162* (2013.01); *H01M 2/1673* (2013.01); *H01M 4/0402* (2013.01); *H01M 4/043* (2013.01); *H01M 4/623* (2013.01); *H01M 4/625* (2013.01); *H01M 4/881* (2013.01); *H01M 4/8853* (2013.01); *H01M 4/8896* (2013.01); *H01M 4/926* (2013.01); *H01M 8/1004* (2013.01); *H01M 8/1081* (2013.01); *H01M 8/1093* (2013.01); *H01M 10/052* (2013.01); *H01M 2008/1095* (2013.01); *H01M 2300/0082* (2013.01)

(58) Field of Classification Search
  CPC .. H01M 4/8853; H01M 4/043; H01M 4/8896; H01M 4/926; H01M 8/1081; H01M 8/1004; H01M 8/1093; H01M 2300/0082; H01M 2008/1095; H01M 4/04; H01M 8/10; H01M 4/62; H01G 11/70; H01G 11/86; H01G 11/04; H01G 11/38; H01G 11/46; H01G 11/52
  See application file for complete search history.

(56) References Cited

U.S. PATENT DOCUMENTS

| | | | | |
|---|---|---|---|---|
| 2004/0207126 A1* | 10/2004 | Czado | .................. | D01D 5/0015 264/465 |
| 2005/0014067 A1* | 1/2005 | Tenno | ..................... | C01B 31/04 429/231.8 |
| 2008/0150556 A1* | 6/2008 | Han | ........................ | B82Y 15/00 324/693 |
| 2009/0205713 A1* | 8/2009 | Mitra | ..................... | B82Y 10/00 136/263 |
| 2009/0305135 A1* | 12/2009 | Shi | ......................... | B82Y 30/00 429/217 |
| 2012/0013971 A1* | 1/2012 | Wu | ......................... | G02F 1/167 359/296 |
| 2012/0082884 A1* | 4/2012 | Orilall | ................ | H01M 2/1646 429/145 |
| 2013/0208429 A1* | 8/2013 | Liu | .......................... | H01B 1/24 361/729 |

OTHER PUBLICATIONS

Zhao et al. Journal of Applied Polymer Science vol. 97 pp. 466-474, 2005.*

Nanothinx (Nanothinx MSDS Carbon nanotube MSDS Jan. 20, 2009, {https://wcam.engr.wisc.edu/public/safety/MSDS/Carbon%20nanotubes.pdf} evidenced by Mitra et al. [Mitra] (US 2009/0205713).*

* cited by examiner

SEPARATORS, ELECTRODES, HALF-CELLS, AND CELLS OF ELECTRICAL ENERGY STORAGE DEVICES

FIELD OF THE INVENTION

This document relates generally to fabrication of separators and electrodes for electrical energy storage devices, as well as half-cells and complete cells that include such separators and electrodes. In particular, this document relates to separators, electrodes, half-cells, and complete cells of electrochemical double layer capacitors (EDLCs), hybrid supercapacitors (HSCs), Li-ion capacitors, Li-ion electrochemical electrical energy storage devices, Na-ion capacitors, Na-ion electrochemical electrical energy storage devices, polymer electrolyte fuel cell energy storage devices, and other energy storage devices.

BACKGROUND

Electrodes divided by a separator are widely used in many devices that store electrical energy, including primary (non-rechargeable) battery cells, secondary (rechargeable) battery cells, fuel cells, and capacitors. Important characteristics of electrical energy storage devices include energy density, power density during discharge, maximum charging rate, internal leakage current, equivalent series resistance (ESR), and the ability to withstand multiple charge-discharge cycles without unacceptable deterioration in the desirable characteristics of the devices. Electrochemical double layer capacitors, also known as supercapacitors, are gaining popularity in many energy storage applications, because of their high power densities (in both charge and discharge modes), and with energy densities approaching those of conventional rechargeable cells.

Electrical double layer capacitors and HSCs store electrical energy as adsorbed ions in the double layer and/or as redox active compounds deposited onto/into the porous electrode structures, and have very high power density values and very long cycle lives, but moderate energy density values. To increase the energy density, an EDLC-type electrode (with only or predominantly physical adsorption ion processes) can be combined with elements that provide faradic reactions at the electrode surface, resulting in an HSC, in which one electrode's charging/discharging of the electrical double layer takes place, and at another electrode faradic charge transfer processes (redox processes) take place. The faradic reaction capacitance may be very high (sometimes 10 or even more times higher than EDLC capacitance), and thus, the HSC capacitance may substantially determine the energy density. For EDLCs, the columbic efficiency is generally very high (e.g., up to 98%), but for HSCs the columbic efficiency may be somewhat lower (e.g., up to 95%). The development of EDLCs and HSCs is described in Conway (Electrochemical Supercapacitors: Scientific Fundamentals and Technological Applications (1999)) and other sources.

The basic structure of a typical EDLC may include a highly porous, sometimes microporous-mesoporous, electrode, charged negatively for cation adsorption; a highly porous, positively charged electrode for anion adsorption; and a polymeric electronically non-conductive and redox inactive porous separator between the negatively and positively charged electrodes. The adsorption/desorption of ions in hybrid/supercapacitors and electrochemical oxidation and/or reduction reactions take place at or inside of the porous structure of the electrodes, to store an electric charge and to generate electric current.

There are three main groups of EDLCs, characterized based on the electrolyte composition used. First, there are non-aqueous EDLCs that use organic solvents. Second, there are aqueous EDLCs. And third, there are EDLCs that use ionic liquids. Usually, in aqueous EDLCs, $H_2SO_4$, KOH, and alkali metal salts ($Li_2SO_4$, $Na_2SO_4$, $Rb_2SO_4$, and $Mg_2SO_4$) are used. In non-aqueous EDLCs, the selection of salts is broader, including $NaPF_6$, $NaClO_4$, $NaBF_4$, $LiBF_4$, $LiPF_6$, $LiClO_4$, $(C_2H_5)_4NBF_4$, $(C_2H_5)_3CH_3NBF_4$, $(C_2H_5)_3C_3H_7ClO_4$, and others.

In both aqueous and non-aqueous EDLCs and HSCs, the separator may be a porous, electrically non-conductive polymer layer, such as cellulose or polyvinylidene difluoride (PVDF). The operating temperature region may be from −30 to +80 degrees Celsius. A commonly-used EDLC electrode material is a thin layer of porous, amorphous carbon particles, where the amount of binder (such as polytetrafluoroethylene/Teflon/PTFE suspension in water) varies from zero to 30 percent by weight, and the amount of graphite powder (added to increase the electrical conductivity) varies from zero to 30 percent by weight. In some electrode materials, the poly(vinylidene diflouride) solution in dimethylformamide (DMF) and acetone mixture has been used as a binder with zero to 30 percent by weight in dry mass. Various porous carbon particles, like carbon black and amorphous carbons, may be used. The rate of ion adsorption from electrolyte solution, however, may be rather low; one possibility to increase the adsorption/desorption rate is to use hierarchically porous electrodes and/or electrochemically more active redox electrodes (i.e., cathodes and/or anodes). A more attractive possibility is to decrease the adsorption layer thickness, the so-called reaction volume or reaction area, through microporous-mesoporous hierarchically porous structure of the electrode layers. "Micropores" are pores with width lower than 2 nm, while "mesopores" are pores with geometries in the 2 to 50 nanometers range. (This division of pores according to the geometry sizes is given in Short history and types of pores in Silicon, University of Liverpool, Online Master Programmes, available at the time of this writing online at www porous-35.com/porous-si-2.html). Additionally, in the literature "ultramicropores" and "nanopores" (pores with width lower than 0.7 nm) have been discussed, in addition to the three main pore types mentioned above.

To make a conventional electrode, carbon particles, binder, carbon black powder (sometimes added to increase the electrical conductivity of layered electrodes), and one or more solvents are mixed together to form a plastic mass. The mass is passed through rotating drums that apply pressure, resulting in a compact electrode layer. The minimum thickness of the electrode layer achievable depends on the carbon particle size; typically, at least 7 to 10 layers of particles are needed to form an electrode with acceptable mechanical structural characteristics.

Well controlled carbon powders have been prepared using high-temperature chlorination ($Cl_2$) or HCl treatment methods, having porous positive and negative electrodes, each with a hierarchical microporous-mesoporous structure. Preparation of sugar-based carbon nanospheres with very high surface area has been created by three of the inventors herein.

In a typical EDLC using acetonitrile, propylene carbonate, or a mixture of organic carbonates, with specific additives (Sulphur-containing organic compounds, fluorinated carbonates), cell voltages ΔF up to 3.0 V may be applied. For higher ΔE applications, special treatments (such as drying, degassing, reduction) of carbon materials with molecular hydrogen at, for example, 800 degrees Celsius for 2 to 6 hours may be needed.

Generally, EDLCs are manufactured with electrodes divided by a porous separator that prevents the electrodes from coming into contact with each other and thus obstructs electronic current flow directly between the electrodes. The separator is immersed in and impregnated with an electrolyte, and therefore does not stop ionic current flows between the electrodes in both directions. Double layers of charges form at the boundaries between the solid electrodes and the electrolyte.

An electric potential applied between a pair of electrodes of an EDLC causes the electrolyte's ions to be attracted and move towards the electrodes with the opposite charges, generating layers of oppositely-charged ions near each electrode surface. Electrical energy is stored in the charge separation layers between these ionic layers and the charge layers of the corresponding electrode surfaces. In fact, the charge separation layers behave essentially as electrostatic capacitors. Electrostatic energy can also be stored in the double layer capacitors through orientation and alignment of molecules of the electrolytic solution under influence of the electric field induced by the potential.

In comparison to conventional capacitors, double layer capacitors have high capacitance in relation to their volume and weight. There are two main reasons for these volumetric and weight efficiencies. First, the charge separation layers are very narrow. Their widths are typically on the order of nanometers. Second, the electrodes can be made from a porous material, having very large effective surface area per unit volume and per unit weight. Because capacitance is directly proportional to the electrode area and inversely proportional to the widths of the charge separation layers, the combined effects of the large effective surface area and narrow charge separation layers result in capacitance that is very high in comparison to that of conventional capacitors of similar size and weight. High capacitance of double layer capacitors allows the capacitors to receive, store, and release large amounts of electrical energy.

As has already been mentioned, equivalent series resistance is also an important capacitor performance parameter. Frequency response of a capacitor depends on the characteristic time constant of the capacitor, which is essentially a product of the capacitance and the capacitor's equivalent series resistance, or "RC." To put it differently, equivalent series resistance limits both charge and discharge rates of a capacitor, because the resistance controls the current that flows into or out of the capacitor. Maximizing the charge and discharge rates is important in many applications. In automotive applications, for example, a capacitor used as an energy storage device powering a vehicle's motor has to be able to provide high instantaneous power during acceleration, and to receive bursts of power produced by regenerative braking. In internal combustion vehicles, the energy storage device periodically powers a vehicle's starter, also requiring high power output in relation to the size of the capacitor.

The internal resistance also creates heat during both charge and discharge cycles. Heat causes mechanical stresses and speeds up various chemical reactions, thereby accelerating capacitor aging. Moreover, the energy converted into heat is lost, decreasing the efficiency of the capacitor. It is therefore desirable to reduce equivalent series resistance of capacitors.

Active materials used for electrode construction—activated carbon, for example—may have limited specific conductance. Thus, large contact area may be desired to minimize the interfacial contact resistance between the electrode and its terminal. The active material may also be too brittle or otherwise unsuitable for directly connecting to capacitor terminals. Additionally, the material may have a relatively low tensile strength, needing mechanical support in some applications. For these reasons, electrodes may incorporate current collectors.

A current collector is typically a sheet of conductive material to which the active electrode material is attached. Aluminum foil is commonly used as the current collector of an electrode. In one electrode fabrication process, for example, a film that includes activated carbon powder (i.e., the active electrode material) is produced, and then attached to a thin aluminum foil using an adhesive layer or direct deposition. Thus, for better power density and energy density characteristics, a half-cell or a single cell electrode's sides may be covered by a thin metal film (Al, Ti, Ta, Nb or by Cu or Ni current collectors, for non-aqueous electrolyte and water based systems, respectively) applying magnetron, pulsed laser deposition, physical vapor deposition or other methods, to reduce the series contact resistance values of the dry and filled with electrolyte electrode/membrane half-cells and complete cells.

To improve the quality of the interfacial bond between the film of active electrode material and the current collector, the combination of the film and the current collector may be processed in a pressure laminator. Pressure lamination increases the bonding forces between the film and the current collector, and reduces the equivalent series resistance of the energy storage device in which the electrode is used.

Furthermore, lamination densifies the film of active electrode material, improving the volumetric efficiency of the electrode and of the energy storage device.

It is desirable to provide improved highly ultramicroporous-microporous-mesoporous positively and negatively charged electrodes, separators, half-cells, and complete cells made with two electrodes and a separator. It is desirable to provide energy storage devices including EDLCs, HSCs, Li-ion capacitors and batteries, Na-ion capacitors and batteries, other capacitors and batteries, polymer electrolyte fuel cells, and still other energy storage devices, built with such improved electrodes, separators, half-cells, and complete cells. It is also desirable to provide methods for preparation of such improved electrodes, separators, half-cells, and complete cells, and energy storage devices manufactured with such electrodes, separators, half-cells, and complete cells.

SUMMARY

To address the above-described and other needs, this document discloses methods for preparation of EDLCs, HSCs, Li-ion and Na-ion capacitor/battery half-cells and single cells, with ultramicroporous, microporous, and mesoporous positively and negatively charged electrodes, and separators. Specific electrospinning conditions for ultramicroporous-microporous-mesoporous carbon and activated carbon electrodes are disclosed. Specific conditions are also disclosed for forming electrospun polymer separator layers, which may include carbon-polymer nanoparticles composites deposited onto the electrospun microporous-mesoporous polymer separator layers, and further include poly (vinylidene difluoride) (PVDF), Nafion, and/or other polymeric compound-based membranes.

In embodiments, a half-cell (electrode plus separator) or a single cell (two electrodes and a separator between the electrodes) with microporous-mesoporous positively and negatively charged electrodes and hierarchical structure are prepared using an electrospinning method followed by isostatic compression of the electro-spun membranes at selected temperatures and pressures. A particular method example includes the steps of: (1) initial preparation of microporous-mesoporous carbon applying thermal decomposition of binary (molybdenum carbide ($Mo_2C$), titanium carbide (TiC), vanadium carbide (VC), tungsten carbide (WC), silica carbide (SiC), chromium carbides ($Cr_xC_y$), ternary carbides ($Ta_4HfC_5$ and $WTiC_2$), and/or other carbon-containing organic materials such as D-glucose, sugars, starch, peat, organic aerogels; (2) additional cleaning by $H_2$ at a temperature between about 500 and about 1000 degrees Celsius, for between about 0.5 hour and about 15 hours, employing a feeding rate between about 100 and about 1000 ml/minute per gram of material being cleaned; (3) deactivation with Ar (using a feeding rate between about 20 and about 2000 ml/minute per gram of material being deactivated) or $N_2$ (using a feeding rate between about 100 and about 1000 ml/minute per gram of material being deactivated), for a time duration of between about 0.5 hour to about 4 hours at a temperature between about 500 and about 1200 degrees Celsius, to reduce redox-active groups (oxygen-containing, electrochemically active functional groups such as kinone type C=O, COO, COOH); (4) preparation of an electrode layer with thickness, for example, from about 30 μm to about 200 μm applying electrospinning; (5) followed by isostatic compression. In aspects, the electrode material may be exposed to one or more solvents that act as pore forming agents, to increase microporosity-mesoporosity of the electrode.

In aspects, the sides of the half-cells and single cell electrodes may be covered by very thin metal film forming current collectors, such as Al, Ti, Ta, Nb, Cu, or Ni current collectors, for non-aqueous electrolyte, ionic liquid-based and aqueous energy storage devices. The current collectors may be applied using magnetron sputtering, pulsed laser deposition, physical vapor deposition, or other methods, to reduce the series contact resistance of the half-cells and single cells.

In aspects, the ultramicroporous, microporous, and mesoporous carbon activated or non-activated electrodes with hierarchical porous structure may have surface area, for example, from 100 to 2200 $m^2$ per gram; and total pore volume, for example, from 0.1 to 2.0 $cm^3$ per gram. In aspects, electrodes are electrospun onto a PVDF separator, and have d-metal (e.g., Mn, Fe, Ni, Co, or compounding alloys etc.) oxide centers and Pt-, Ir-, Pt—Ru-alloy nanoclusters activated cathodes and anodes deposited onto them.

Exemplary method embodiments include the following steps:

1. Preparing ultramicroporous-microporous-mesoporous carbon powder having well-developed hierarchical porous structure with specific surface area from 100 to 2200 $m^2 g^{-1}$, using carbon particles preparation methods including high-temperature chlorination reaction with molecular $Cl_2$ or gaseous HCl from $Mo_2C$, TiC, VC, WC, SiC, $Cr_xC_y$ (i.e., a binary metal carbide, carbide-derived carbon, or CDC), or from organic compounds applying thermal decomposition method (organic carbon powder or OCP), or from organic aerogels (OAG), resulting in ultramicroporous-microporous-mesoporous carbon particles;

2. Conducting an additional activation reaction of raw carbon particles with $CO_2$, $H_2O$ or analogous treatment methods, at temperatures from about 600 to about 1200 degrees Celsius, for a period of between about 2 and about 14 hours;

3. Cleaning of the raw carbon particles by a high-temperature treatment (e.g., from about 600 to about 1000 degrees Celsius) process with molecular hydrogen, in order to reduce the surface-active oxygen-containing functional groups and other surface-active functional groups;

4. Deactivating carbon powder with Ar gas at high and/or low temperatures, between about 20 and about 1000 degrees Celsius, for a period of between 0 to about 10 hours;

5. Depositing redox-active catalytical d-metal centers (Mn, Fe, Co, Ni, V, etc., as oxides), Pt-, Ir- or Pt—Ru-alloy nanoclusters (with Pt and Ir in Pt—Ru nanoparticles each from about 0.01 percent to about 80 percent of the catalyst by weight) onto the microporous-mesoporous carbon particles;

6. Thoroughly washing the d-metal-carbon, Pt-carbon, Ir-carbon or Pt—Ru-carbon composites, and drying them at temperatures between about 20 and about 80 degrees Celsius;

7. Preparing raw carbon slurry by mixing (a) the hierarchically porous carbon particles or d-metal, Pt-metal, Ir-metal and Pt—Ru-alloy nanoclusters activated or non-activated composites with specific surface area from 100 to 2200 $m^2 g^{-1}$ with (b) PVDF, PTFE, or Nafion binder (electronically non-conductive polymer binding for formation of flexible carbon composite electrodes);

8. Applying solvent mixture (e.g., water with organic solvents, such as DMF, isopropanol) as a micropores-mesopores forming agent during evaporation/thermal treatment step for obtaining highly ultramicroporous-microporous-mesoporous electrodes with hierarchical porous structure;

9. Preparing PVDF solution in DMF-acetone mixture having predetermined viscosity in the range of between about 1 and about 50 Pa*s, for making electrospun polymer membranes with controlled thickness and porosity. Thickness can be controlled by varying the deposition time, while porosity depends on the polymer solution concentration and viscosity.

10. Preparing microporous-mesoporous-macroporous (or microporous-mesoporous, or microporous-macroporous) separator from the PVDF solution in a DMF-acetone mixture (or Nafion-$H_2O$ with isopropanol mixture for a proton conducting Nafion membrane) using electrospinning at DC electric field strength from about 0.5 kV to about 1.5 $kV*cm^{-1}$;

11. Electrospinning the microporous-mesoporous (or microporous-mesoporous-macroporous, or microporous-macroporous) carbon slurries onto the previously-electrospun membranes to obtain ultramicroporous-microporous-mesoporous electrode/separator half-cells and/or microporous-mesoporous electrode/separator full cells;

12. Depositing Al, Ti, Ta, Cu, or another current conductor layers onto carbon electrodes to form current collectors of the electrodes, for example, through electromagnetron deposition, physical vapor deposition, and/or chemical vapor deposition techniques;

In an example, the EDLC, HSC, LiB, and/or NaB half-cells and single cells thus fabricated may perform effectively, for example, between −30 and +80 degrees Celsius in acetonitrile, butyrolactone, propylene carbonate and organic carbonate (propylene carbonate, ethylene carbonate, diethyl carbonate, ethylmethylcarbonate) mixtures with fluorinated and sulfurated organic solvent specific additives; and from −10 to +100 degrees Celsius in ionic liquids.

The resulting electrodes and/or separators may be used in EDLCs, with an addition of some fluorinated organic carbonates or sulphur containing cyclic carbonates. The EDLCs may, for example, function more effectively from about −40 to +100 degrees Celsius, particularly in the lower temperature end.

The resulting electrodes and/or separators may also be used in HSC half and complete cells, LiB and NaB half- and complete cells. The cells and half-cells may function more effectively, for example, from −20 to +60 degrees Celsius, demonstrating high capacitance and faradic capacitance values, which in examples range from about 100 to about 220 $F*g^{-1}$.

The EDLC half-cells and single cells as well as HSC, LiB and NaB half-cells and single cells may be completed by depositing Al, Ti, Ta, and/or Cu layer(s) onto carbon electrode (or electrodes), with various deposition methods, such as electromagnetron deposition, laser ablation, physical vapor deposition, and chemical vapor deposition.

Selected examples of the EDLC, HSC, LiB and NaB half-cells and single cells prepared using the electrospinning methods perform effectively from about −30 to about +80 degrees Celsius in acetonitrile, butyrolactone, propylene carbonate and organic carbonate (propylene carbonate, ethylene carbonate, diethyl carbonate, ethylmethyl-carbonate) mixtures with fluorinated and/or sulfurated organic solvent specific additives; and from about −10 to about +100 degrees Celsius in ionic liquids.

Selected examples of EDLC, HSC, Li-ion and Na-ion capacitor/battery electrodes, prepared according to the electrospinning method include ultramicroporous, microporous, and mesoporous carbon activated and/or non-activated electrodes with hierarchical porous structure and surface area from about 100 to about 2200 $m^2*g^{-1}$ and with total pore volume from about 0.1 to about 2.0 $cm^3*g^{-1}$.

In selected examples, a method for preparation of an electrical double layer capacitor, hybrid supercapacitor, Li-ion and Na-ion capacitor/battery single cell and microporous-mesoporous separator between electrospun and isostatically compressed electrodes based single cell working effectively from −30 to +80 degrees Celsius with ultramicroporous-microporous-mesoporous electrodes, includes the following steps: (A) thermal decomposition of the D-glycose solution at 300 degrees Celsius or carbide derived carbons ($Mo_2C$, SiC, WC, VC, TiC) at 600-1200 degrees Celsius, followed by $CO_2$, $H_2O$ or $ZnCl_2$ treatment (activation) at 600-1200 degrees Celsius for 0-12 hours, molecular hydrogen reduction (cleaning of raw material) from 600-900 degrees Celsius for 0-12 hours and Ar treatment at 900-1200 degrees Celsius for 2-12 hours; (B) preparation of a raw electrode slurry by mixing the carbon powder, organic binder and solvent or mixture of solvents as ultramicropores-micropores-mesopores forming agents for obtaining highly ultramicroporous-microporous-mesoporous electrodes during drying or gas evaporation; (C) preparation of electrospun polymer including (poly)vinylidene difluoride, Teflon suspension and/or Nafion suspension based membrane from optimal concentration solution of PVDF in organic solvent mixture at T=20 degrees Celsius and dc electric field strength from 0.5 to 1.5 $kV\ cm^{-1}$ and drying as prepared membrane at fixed temperature from 20 to 80 degrees Celsius; (D) electrospinning (preparation) of ultramicroporous-microporous-mesoporous electrodes and microporous-mesoporous membrane half-cell and single cell by combining two half-cell separately or two half-cells compressed together to have a completed single cell at temperatures from 20 to 80 degrees Celsius at pressures from 1 to 5 MPa for a time duration of 0.5 to 20 minutes; (E) completing EDLC single cell by magnetron sputtering of Al, Ti, Ta, Nb, Cu, Ni, etc. current collectors onto both sides of electrode/membrane/electrode single cell or onto one side of electrode/membrane half-cell at a reduced pressure of 10-8 MPa at a power of 70 W.

In aspects, the content of PVDF in the ultramicroporous-microporous-mesoporous carbon electrode layer is within the range of about 0 to about 30 percent by weight.

In aspects, the PVDF, Telfon, and/or Nafion concentration in dimethylformamide+acetone mixture or water, respectively, is within the range of between about 5 to about 30 percent by weight.

In aspects, a carbon powder is prepared using high temperature thermal decomposition of organic material or high temperature selective reaction of binary or ternary carbide with $Cl_2$ or HCl. Thereafter, the material is exposed to oxygen containing surface groups that have been activated at a temperature from about 400 to about 900 degrees Celsius using $CO_2$ through $CO_2+C\rightarrow 2CO$ reaction; thereafter, the material is reduced by molecular hydrogen at a temperature from about 600 to about 850 degrees Celsius and cleaned by an Ar stream at a temperature of about 800 degrees Celsius for 2.5 to 12 hours.

In aspects, the amount of uncompressible pore forming agent in the raw electrode paste is in a range of 0 to about 30 percent by weight of the total raw electrode paste.

In aspects, poly(vinylidene difluoride) solution in organic solvents or Teflon suspension in $H_2O$ is used as a binder and the amount of binder is in a range of 0 to about 30 percent by weight of the total raw electrode suspension.

In aspects, the obtained ultramicroporous-microporous-mesoporous carbon/binder composite electrode possesses the hierarchical microporous-mesoporous-macroporous structure pores with diameter from 0.6 to 100 nm with surface area from 100 to 2200 $m^2 \cdot g^{-1}$ and with total pore volume from 0.2 to 2.0 $cm^{-3} \cdot g^{-1}$.

In aspects, the dimethylformamide and acetone mixture is used as a mixed solvent to obtain a PVDF solution with desired viscosity, where the molar ratio of solvents DMF:acetone is between 1:1 to 5:1, or $H_2O$ in Teflon suspension is used as a solvent for Teflon suspension to have a viscous solution for electrospinning of membrane.

In aspects, the temperature at which isostatic compression is performed is between about 20 and about 80 degrees Celsius.

In aspects, the isostatic pressure is in a range from about 1 to about 5 MPa, and the isostatic compression is performed at a constant temperature.

In aspects, the isostatic compression is performed at a constant temperature and a constant pressure from about 0.5 to about 20 minutes.

In aspects, the content of graphitic carbon powder in a raw electrode suspension is between 0 to about 20 percent by weight, to increase the electrical conductivity of the electrode layers.

These and other features and aspects of selected embodiments, variants, and examples will be better understood with reference to the following description, drawings, and the appended claims.

DETAILED DESCRIPTION

Figure 1:
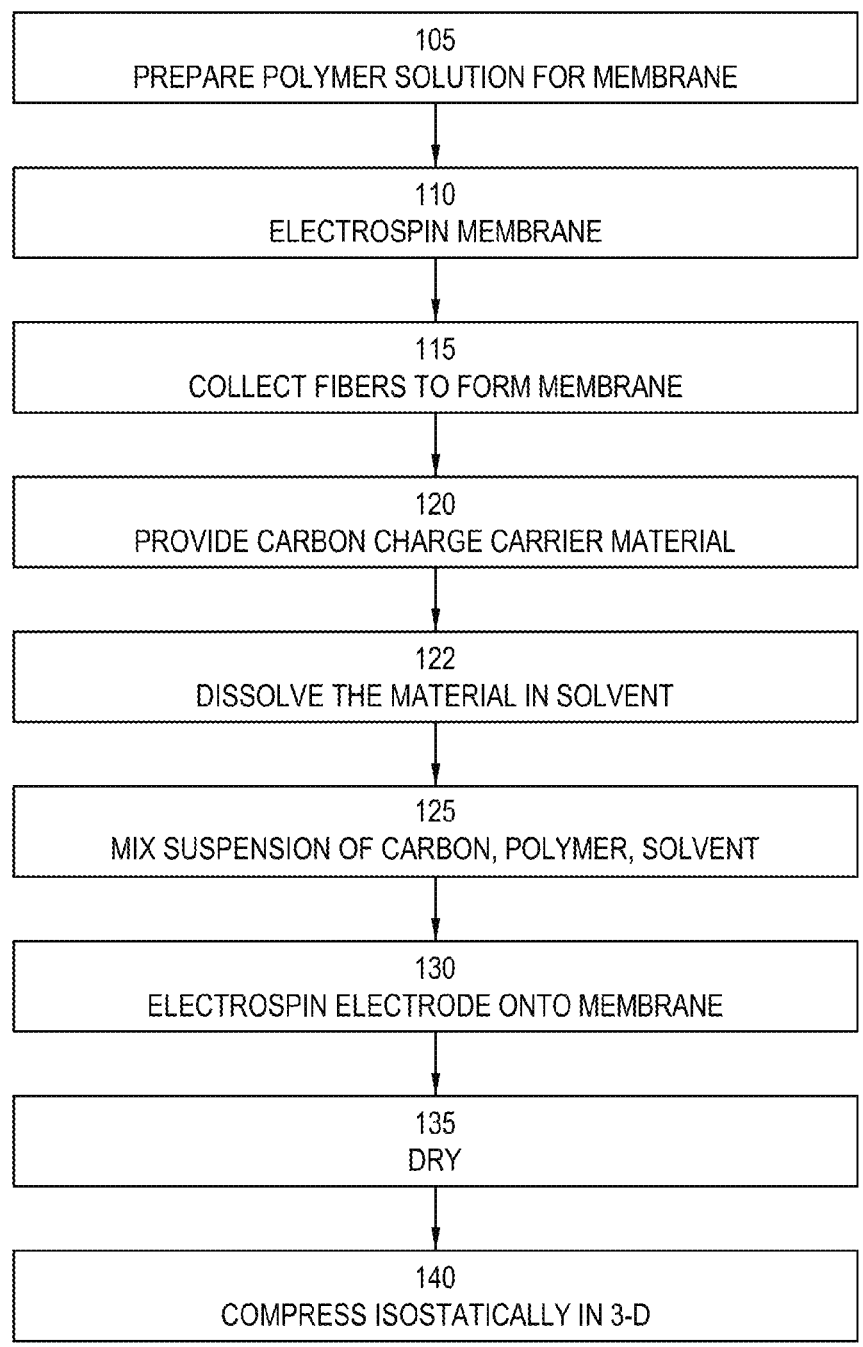
FIG. 1 illustrates selected steps of a process of manufacturing a separator and an electrode of an energy storage device.

In this document, the words "embodiment," "variant," "example," and similar words and expressions refer to a particular apparatus, process, or article of manufacture, and not necessarily to the same apparatus, process, or article of manufacture. Thus, "one embodiment" (or a similar expression) used in one place or context may refer to a particular apparatus, process, or article of manufacture; the same or a similar expression in a different place or context may refer to a different apparatus, process, or article of manufacture. The expression "alternative embodiment" and similar words and expressions are used to indicate one of a number of different possible embodiments, variants, or examples. The number of possible embodiments, variants, or examples is not necessarily limited to two or any other quantity. Characterization of an item as "exemplary" means that the item is used as an example. Such characterization does not necessarily mean that the embodiment, variant, or example is preferred; the embodiment, variant, or example may but need not be a currently preferred embodiment, variant, or example. All embodiments, variants, and examples are described for illustration purposes and are not necessarily strictly limiting.

"Top," "bottom," "left," "right" and analogous directional indicators may be used for describing the embodiments in the Figures; such terms are intended to facilitate the description and not as substantive requirements, unless specifically noted or otherwise made clear.

When the word "selected" is used with reference to an item (such as a component, embodiment, variant, element, step) and without mention of the specific selection process, the word signifies any one or more, but not necessarily all, of the items available for the purpose described. For example, "selected components of the mixture include" may be used in the sense that other components may be found in the referenced mixture, and some of the described components may be omitted in some other mixtures.

The word "about" and similar expressions, are used to indicate the possibility of small deviations from a precise value or an exact range; but examples with the precise value or range are subsumed within the value or range qualified by the word "about" or by a similar expression.

Other and further explicit and implicit definitions and clarifications of definitions may be found throughout this document.

Reference will be made in detail to one or more embodiments (apparatus, methods, and/or articles of manufacture) that are illustrated in the accompanying drawings. Same reference numerals may be used in the drawings and this description to refer to the same apparatus or article of manufacture elements and method steps. The drawings may be in a simplified form, not to scale, and may omit apparatus elements and method steps that can be added to the described apparatus, articles of manufacture, and methods, while possibly including optional elements and/or steps.

FIG. 1 illustrates selected steps of a process 100 for manufacturing a separator and an electrode of an energy storage device, such as an EDLC, HSC, LiB or NaB capacitor or battery, or another energy storage device mentioned in this document. Some additional details of the steps of this process may be described or detailed elsewhere in this document.

In step 105, a polymer solution in DMF with acetone-mixed solvent is prepared. The polymer may be, for example, PVDF, Nafion, Nafion-$H_2O$ with isopropanol mixture, a Teflon suspension, or a combination of these and/or other polymers. The concentration of the polymer in the solution may be, for example, between about 5 and about 35 percent of PVDF by weight, and the concentration of DMF in the DMF-acetone solvent may be, for example, between 75 and 85 percent by weight. In selected examples, the concentration of PVDF is 17.5% (+/−0.5%), 20.0% (+/−0.5%), 22.5% (+/−0.5%), and 25.5% (+/−0.5%) by weight; and the concentration of DMF in the DMF-acetone solvent is 77.5% (+/−1%), 80.0% (+/−1%), 82.5% (+/−1%), and 85.0% (+/−1%). The viscosity of the solution may be in the range of between about 1 and about 50 Pa*s.

In step 110, a high DC electric field is applied to the polymer solution so that dispersion of the solution and formation of polymer nano/microfibers take place. The strength of the field may be, for example, between 0.5 and 1.5 kV/cm; in selected examples, the strength of the field is between 0.8 and 1.5 kV/cm; in other selected examples, the strength of the field is between 0.9 and 1.3 kV/cm. The pumping rate of the solution may be, for example, from 0.5 to 5 ml/h per needle.

In step 115, the nano/microfibers are collected onto a material collector, to obtain a nano/microfibre polymer separator or membrane with well-defined microporosity-mesoporostiy. The material collector may be, for example, stationary or rotating. It may be made from aluminum or some other metal. In some embodiments, the thickness of the separator/membrane thus obtained is from about 10 μm to about 30 μm.

In step 120, carbon charge carrier material with high specific surface area is provided. Details of this step will be described below in connection with a process 200 of FIG. 2 and elsewhere in this document. The material may be mixed with graphite powder, for example, using a ratio from about 80/20 to about 95/5, by weight, where the lower percentage corresponds to the graphite powder. In examples, the percentage of graphite powder by weight is 20% (+/−0.5%), 15 (+/−0.5%), 10 (+/−0.5%), and 5 (+/−0.5%).

In step 122, the charge carrier material from the previous step (e.g., the hierarchically porous carbon particles or d-metal, Pt-metal, Ir-metal and Pt—Ru-alloy nanoclusters activated or non-activated composites with specific surface area from 100 to 2200 $m^2$ $g^{-1}$) and a selected electronically non-conductive polymer binder (such as PVDF, PTFE, Nafion) are dissolved in a DMF-acetone mixed solvent, forming a suspension with variable viscosity depending on the amount of the binder in the solution. The concentration of the solvent by weight may be, for example, between about 15 and about 25 percent. In examples, the concentration is 15.0% (+/−0.5%) 17.5% (+/−0.5%), 20.0% (+/−0.5%), 22.5% (+/−0.5%), and 25.0% (+/−0.5%) by weight; and the ratio of DMF to acetone is between about 70/30 and about 95/5, by weight, with the higher percentage corresponding to DMF.

In step 125, the suspension from the previous step is thoroughly mixed at a temperature, for example, from about 20 to about 30 degrees Celsius, and for a time duration of, for example, between about 5 and 48 hours to form a viscous microheterogeneous from about 2 to about 15 μm suspension (solution) of carbon particles, polymer, and solvent.

In step 130, the solution from the step 125 is drop-wise fed and subjected to a DC electric field, so that the suspension is dispersed to form nano/micro carbon-polymer wires or particles. The strength of the electric field in this step may be, for example, between 1.0 and 1.8 kV/cm. The intermeshing nanowires or microwires in this step may be deposited directly onto the membrane from the step 115.

In step 135, the material from the step 130 is dried, that is, solvent is quickly evaporated from the solution and the resulting fibers/particles are deposited onto electrospun separator materials (e.g., PVDF, Nafion, other polymers). The drying may take place at temperatures from about 20 to about 80 degrees Celsius. In examples, the drying takes place at a temperature between 20 and 30 degrees Celsius, for a period between 10 and 30 hours. A separator/carbon electrode combination is thus formed.

In step 140, the separator/carbon electrode combination from the step 135 is isostatically compressed. For example, the isostatic compression may take place at a temperature from about 20 to about 80 degrees Celsius, with applied constant pressure from about 3 MPa to about 25 MPa, for a period of about 0.5 minute to about 20 minutes. This results in a flexible, compressed electrode/separator half-cell. In specific examples, a pressure of 8-12 MPa is applied for between 1 and 3 minutes. The isostatic compression described here (and elsewhere in this document) may be performed using fluid pressure, for example, by placing the objects being compressed in a flexible container (such as a thin polymer bag), placing the flexible container into another container (generally not a flexible one) with a fluid, such as water, and applying the required pressure to the fluid. Because the fluid surrounds the entire article, the pressure should be equal from all directions, and occurrences of unwanted distortions in the article may be avoided or reduced. Electrodes, half-cells (i.e., electrode/separator/membrane combinations), and full cells (electrode-separator-membrane-separator-electrode combinations) may be isostatically compressed in three dimensions in this way. In particular, complete electrodes, half-cells, and full cells may be isostatically compressed or hot pressed at an elevated temperature (e.g., >25 degrees Celsius), in one step.

Figure 2:
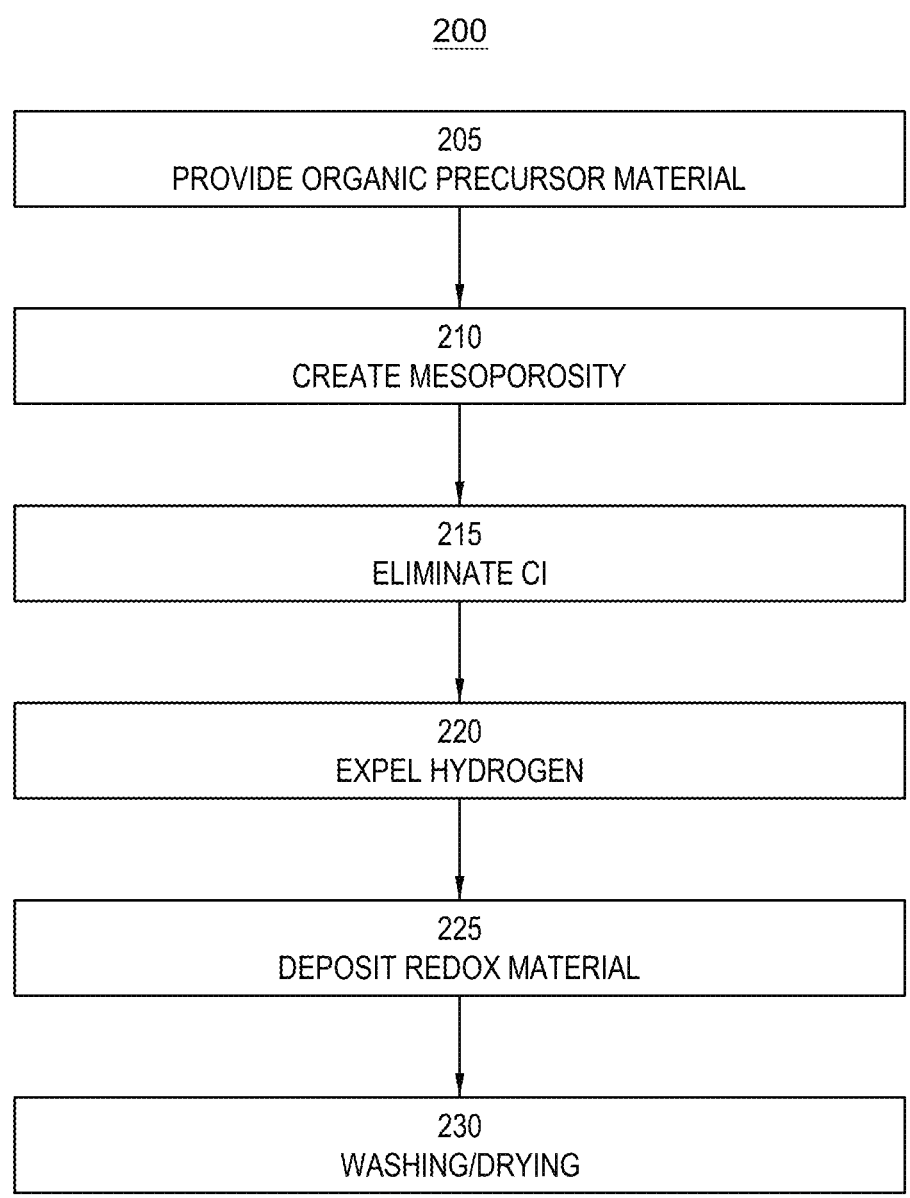
FIG. 2 illustrates selected steps of a process for preparing carbon charge material for use in the process of FIG. 1.

FIG. 2 illustrates selected steps of the process 200 for preparing the carbon charge carrier material used in the process 100. (The process 200 has already been mentioned above, in relation to the step 120 of the process 100.) Some additional details of the steps of this process may be described or detailed elsewhere in this document. The process 200 may result in an ultramicroporous-microporous-mesoporous carbon powder having well-developed hierarchical porous structure with specific surface area from 100 to 2200 $m^2 g^{-1}$ The process 200 may use carbon particles preparation methods including high-temperature chlorination reaction with molecular $Cl_2$ or gaseous HCl from $Mo_2C$, TiC, VC, WC, SiC, $Cr_xC_y$, (i.e., a binary metal carbide, carbide-derived carbon, or CDC), or from organic compounds applying thermal decomposition method (organic carbon powder or OCP), or from organic aerogels (OAG), resulting in ultramicroporous-microporous-mesoporous carbon particles.

In step 205, an organic precursor material is provided. The material may be carbon powder.

In step 210, mesoporosity is created in the precursor material by exposing it to $CO_2$ under high temperature from about 500 to about 1200 degrees Celsius, for a duration of between about 2 and about 16 hours. Alternatively or additionally, the precursor material may be subjected to high temperature gaseous HCl treatment at from about 600 to about 1200 degrees Celsius for a period of time between about 0.5 hour and about 10 hours. Alternatively or additionally, this step may include conducting activation reaction of raw carbon particles with $CO_2$, $H_2O$, $ZnCl_2$ or analogous treatment methods, at temperatures from about 600 to about 1200 degrees Celsius, for a period of between about 2 and about 14 hours. Also, this step may include application of a solvent mixture (e.g., water with organic solvents, such as DMF, isopropanol) as a micropores-mesopores forming agent during evaporation/thermal treatment, for obtaining highly ultramicroporous-microporous-mesoporous electrode material with hierarchical porous structure.

In step 215, chlorine ($Cl_2$) and chloride ($Cl^-$) content is eliminated by exposing the material to hydrogen for a time duration of between about one hour and about two hours, at a temperature of between about 600 and about 1000 degrees Celsius; in embodiments, the temperature range is between 750 and 1000 degrees Celsius; in embodiments, the temperature range is between 800 and 900 degrees Celsius. Surface-active oxygen-containing functional groups and/or other surface-active functional groups may thus be reduced.

In step 220, adherent hydrogen is expelled from the material with nitrogen, argon, or another noble gas. This may be done by exposure to the gas for between about 0.5 and about 4 hours, at a temperature from about 300 to about 900 degrees Celsius. In variants, the carbon powder may be deactivated with argon gas at temperatures between about 20 and about 1000 degrees Celsius, for a period of between 0 to about 10 hours.

In step 225, redox-active catalytical d-metal centers (Mn, Fe, Co, Ni, V, etc., as oxides), Pt or Ir nanoclusters or Pt—Ru-nanoclusters (with Pt and Ir in Pt—Ru-nanoparticles from about 0.01 percent to about 80 percent of the catalyst by weight) are deposited onto the microporous-mesoporous carbon particles from the previous steps.

Step 230 includes thoroughly washing the d-metal-carbon, Pt-, Ir- or Pt—Ru-carbon composites, and drying them at temperatures between about 20 and about 80 degrees Celsius.

In embodiments, pairs of dried half-cells from the process 100 are isostatically compressed together to obtain complete single cells of two electrodes and a common separator between the electrodes.

The electrode (carbon) side of a half-cell (or the electrode sides of a single cell) may be covered by a conductor, for example, Al, Ta, Ti, Ni, Cu, or another current collector thin film layer. The film may be deposited, for example, using magnetron sputtering method at a residual pressure of about ≤$10^{-8}$ Pa and at a power of between about 50 and about 80 Watts; in examples, the power is about 70 Watts. Other deposition methods (for example, chemical vapor deposition, pulsed laser deposition) may also be used.

Other inventive applications of isostatic compression for electrical energy storage devices include methods of fabricating half-cells for Li-ion capacitors/batteries, Na-ion capacitors/batteries, hybrid supercapacitors, polymer electrolyte fuel cells (PEM), and polymer electrolyte membrane electrolysers (PEMEC). In selected embodiments, these methods include the steps of forming partially graphitized carbon particles and/or carbon acetylene black powder into an electrospun electrode structure, typically mixed together with one or more binders (which may be organic binders, for example, PVDF, Teflon suspension, Nafion), water, and organic solvent mixtures; drying the structure; isostatically compressing the dried structure at temperatures from about 20 to about 80 degrees Celsius and pressures from about 1 to about 25 MPa, for a time duration of between about 0.5 to about 20 minutes; and forming a highly ultramicroporous-microporous-mesoporous cathode/anode electrodes for Li-ion capacitors/batteries, Na-ion capacitors/batteries, HSCs, as well as cathode and anode electrodes for PEM and PEMEC. Li-ion and Na-ion battery electrodes may be deposited from, respectively, Li- and Na-containing salts in situ using electrochemical deposition methods. The PEM and PEMEC electrodes may be prepared using chemical, physical, or electrochemical in situ deposition methods.

The Brunauer-Emmett-Teller (BET) analysis (using $N_2$ gas adsorption measurement at the nitrogen boiling temperature) or $CO_2$ adsorption analysis of certain ultramicroporous-microporous-mesoporous carbon powders shows that electrode materials with very large specific surface areas (e.g., from about 100 to about 2200 $m^2*g^{-1}$) can be synthesized by using solution based D-glycose thermal decomposition and high temperature binary carbide decomposition (chlorination or HCl) methods followed by post-treatment activation with $CO_2$, $H_2O$ or $ZnCl_2$, and followed by $H_2$ cleaning steps. The three-modal pore size distribution with medium pore diameter from 0.5 to 0.7 nm, 0.7 to 2.0 nm, and 2.0 to 10 nm has been calculated and a very large total pore volume (given in Table 1 below) has been obtained. Table 1 shows that the electrospun electrodes may have very high specific surface areas and there may be only weak blocking of ultramicropores, micropores, and mesopores with the organic binder (e.g., PVDF, Teflon, Nafion, other binders) used for electrospinning of nanowire based electrodes with very high specific surface areas. The additional isostatic compressing step generally should not noticeably reduce the specific surface area and total pore volume, often resulting in just a small decrease from 5 to 30% in macroporosity. Therefore, in addition to the ultramicropores and micropores there may be mesopores inside the hierarchically porous electrodes, characterized by a high ion transport rate and thus transport properties to the adsorption zone or reaction volume (triple phase boundary area). The Hg porosity data show that the porous PVDF membrane using electrospinning method from polymer solution (and similarly to electrodes) with well-established pore size distribution and large surface area values (e.g., from about 10 to about 148 $m^2*g^{-1}$). The Hg porosimetry data, however, show that the surface area, porosity, and pore size distribution may depend noticeably on the electrospinning parameters used.

TABLE 1

$N_2$ adsorption data of different carbon powders.

| Carbon powder | $S_{BET}$ ($m^2/g$) | $S_{SAIEUS}$ ($m^2/g$) | $d_{pore-max}$ (nm) | $V_{tot}$ ($cm^3/g$) |
|---|---|---|---|---|
| GDAC-10 h | 1540 | 1820 | 0.56 | 0.695 |
| VC—CDC 900° C. ($Cl_2$) | 1385 | 1352 | 0.57 | 0.66 |
| WC—CDC 1100° C. ($Cl_2$) | 1574 | 1267 | 0.71 | 0.78 |
| $Mo_2C$—CDC 600° C. ($Cl_2$) | 1944 | 1605 | 0.60 | 1.12 |
| $Mo_2C$—CDC 800° C. ($Cl_2$) | 1916 | 1574 | 0.82 | 1.83 |
| $Mo_2C$—CDC 1000° C. ($Cl_2$) | 937 | 711 | 0.83 | 1.45 |
| SiC—CDC 1100° C. ($CO2$) | 1140 | 731 | 0.89 | 0.48 |
| TiC—CDC 950° C. ($Cl_2$) | 1450 | 1618 | 0.59 | 0.63 |

Noticeable influences of electric field strength, feed rate, and PVDF concentration employed in fabricating membranes using electrospinning are shown by data in Table 2 and Table 3, below.

TABLE 2

Detailed preparation conditions of different electrospun membranes

| Sample | Concentration (%) | Solvent content | Field strength (kV cm$^{-1}$) | Polymer solution feed rate (mlh$^{-1}$) | Distance between tip and collector (cm) |
|---|---|---|---|---|---|
| TUX1&TUX3 | 20 | DMA | 0.70 | 15.0 | 25 |
| TUX5 | 25 | DMA | 0.75 | 15.0 | 20 |
| TUX6 | 25 | DMA | 0.63 | 15.0 | 20 |
| TUX7 | 25 | DMF-acetone (8:2) | 0.67 | 0.25 | 15 |
| TUX8 | 20 | DMF-acetone (8:2) | 1.27 | 0.5 | 15 |
| TUX9 | 20 | DMF-acetone (8:2) | 1.07 | 1.0 | 15 |
| TUX10 | 22.5 | DMF-acetone (8:2) | 1.07 | 0.5 | 15 |

TABLE 3

Hg intrusion porosimetry measurement results of electrospun membranes

| Sample | $S_{Hg}$ ($m^2 g^{-1}$) | Porosity (%) |
|---|---|---|
| TUX1&TUX3 | 21.15 | 42 |
| TUX5 | 56.00 | 18 |
| TUX6 | 50.30 | 22 |
| TUX7 | 37.84 | 23 |
| TUX8 | 32.25 | 30 |
| TUX9 | 26.50 | 26 |
| TUX10 | 89.50 | 24 |

Experimental results show that the amount of binder and particle size of carbon powders have a substantial effect on the sintered mechanical stability of microporous-mesoporous-macroporous structure of the electrode/separator structures.

We now proceed to describe certain experimental and calculated results, in connection with a number of Figures. Some of the experimental results have been fitted to theoretical models, such as pore size distribution, sizes of catalyst nanoparticles established, XRD data, TEM data, and Raman data.

Figure 3A:
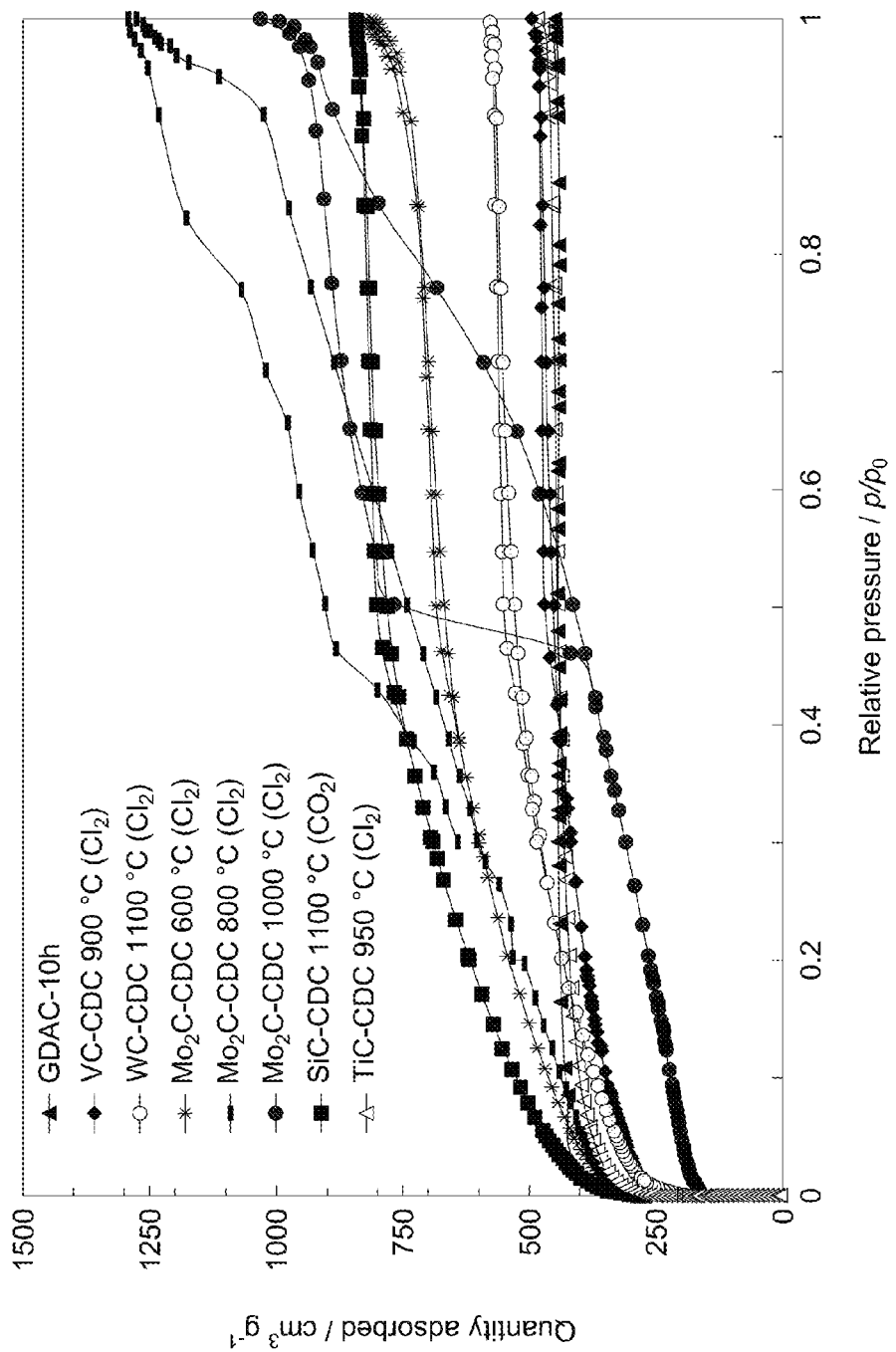
FIGS. 3A, 3B, 3C, 4, 5, 6A, 6B, 6C, 7A, 7B, 8A, 8B, 8C, 8D, 9, 10, 11A, 11B, 12A, 12B, 13, 14A, 14B, 14C, 15A, 15B, 15C, 16A, 16B, 16C, 16D, 17A, 17B, 18A, 18B, 19, 20, 21, 22, 23, 24, 25, 26, 27, 28, 29 and 30 illustrate certain experimental and calculated results relating to energy storage devices using the novel electrodes and separators manufactured with the processes of FIG. 1 and FIG. 2.
Figure 3B:
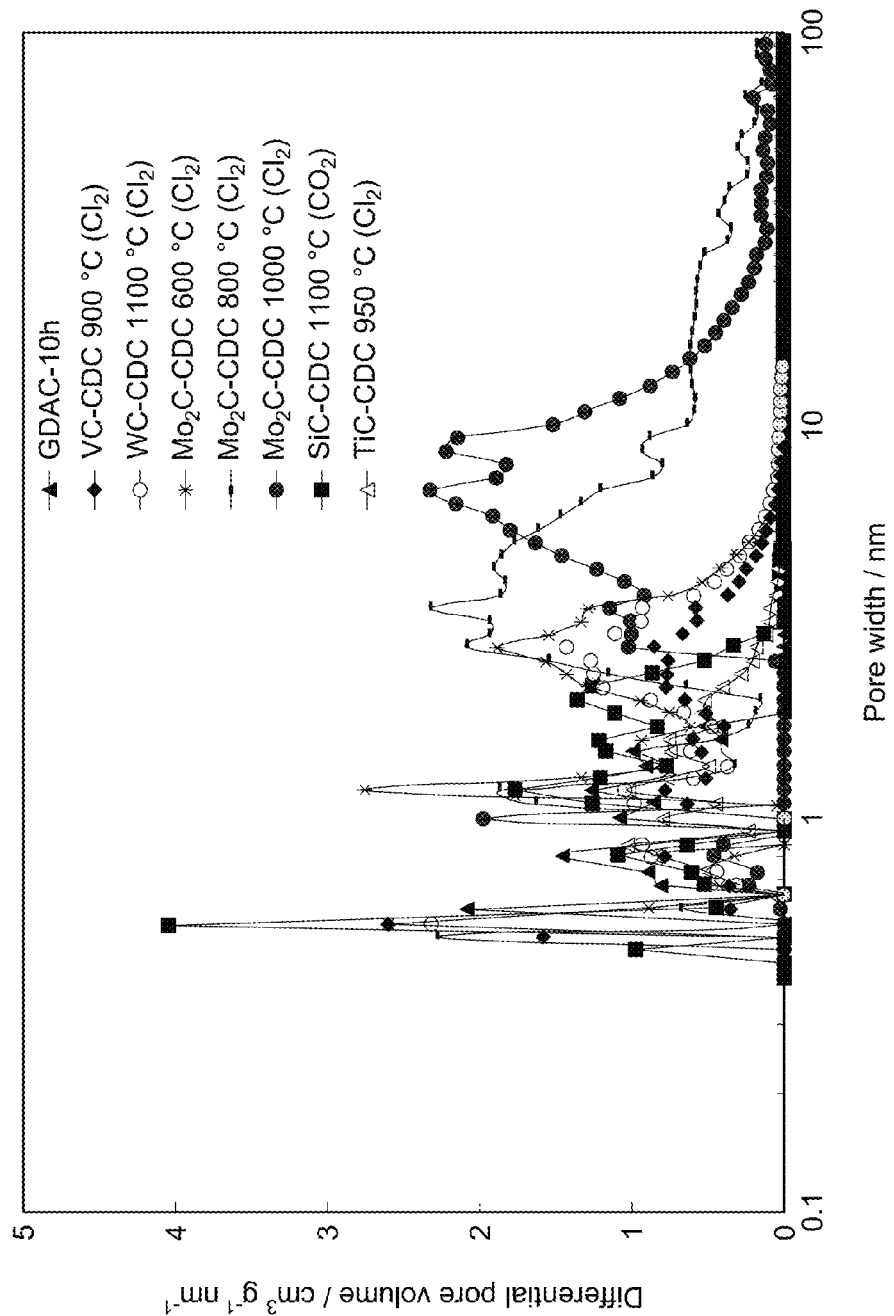
Figure 3C:
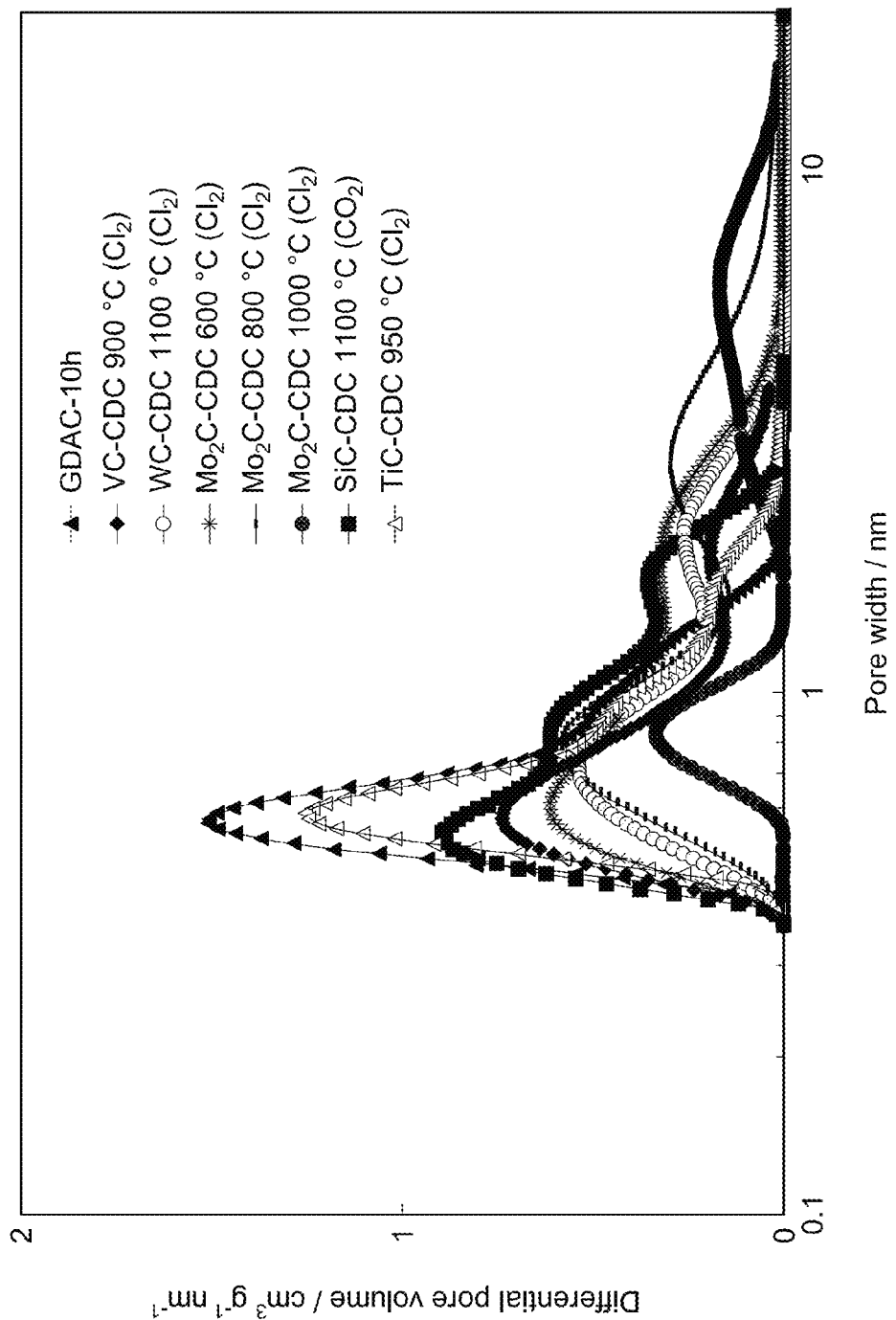
Figure 4:
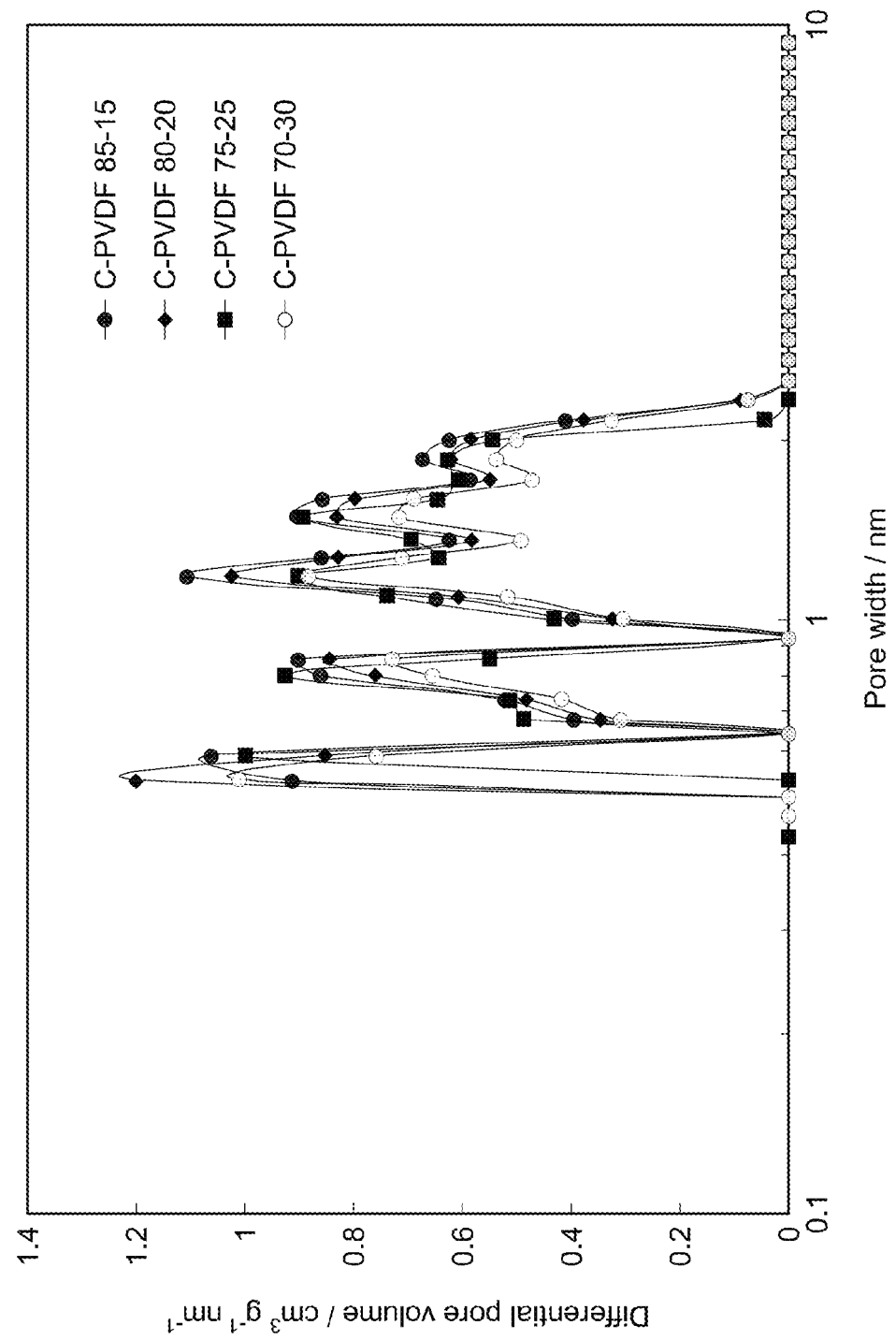
Figure 5:
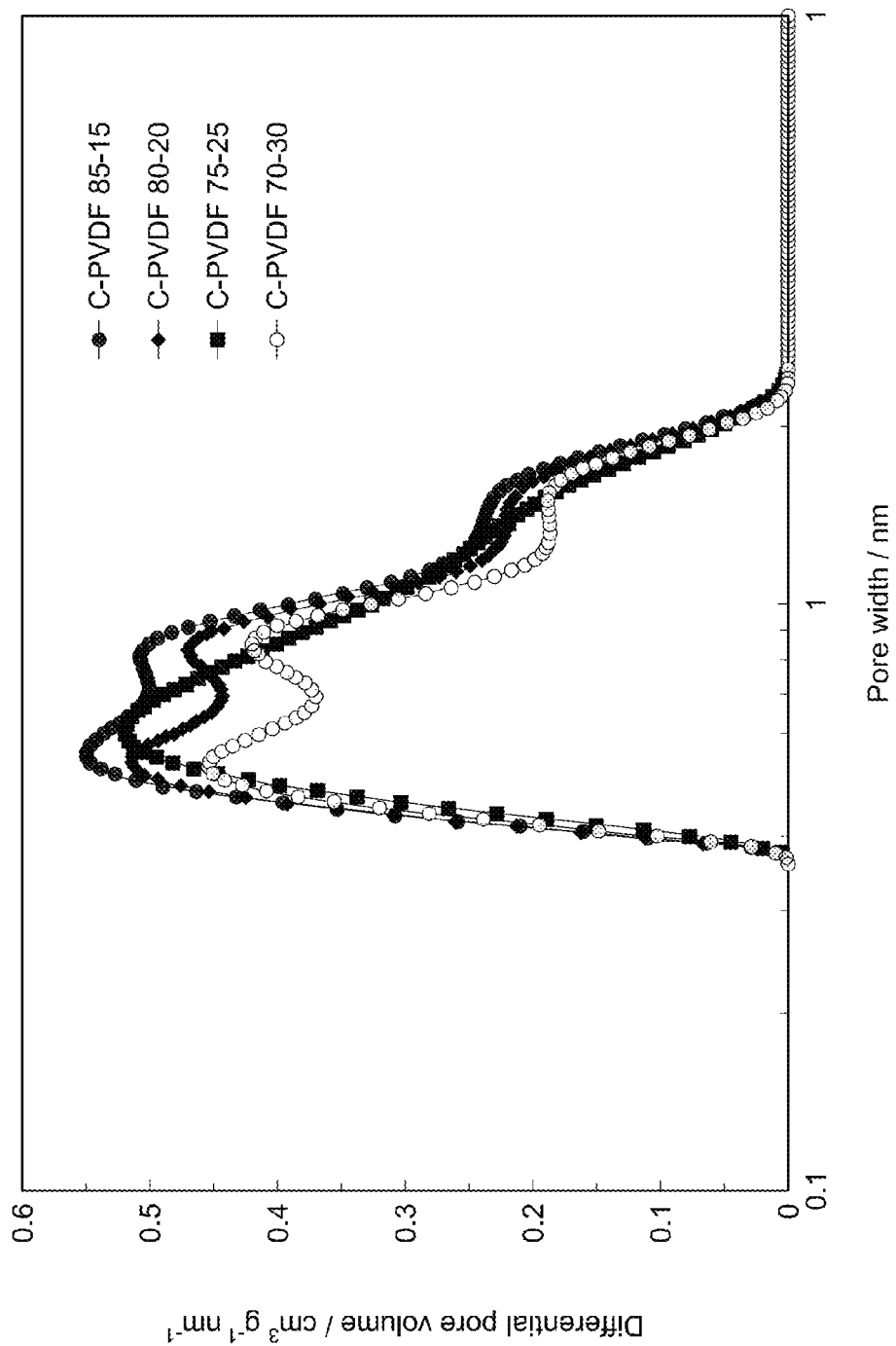
Figure 6A:
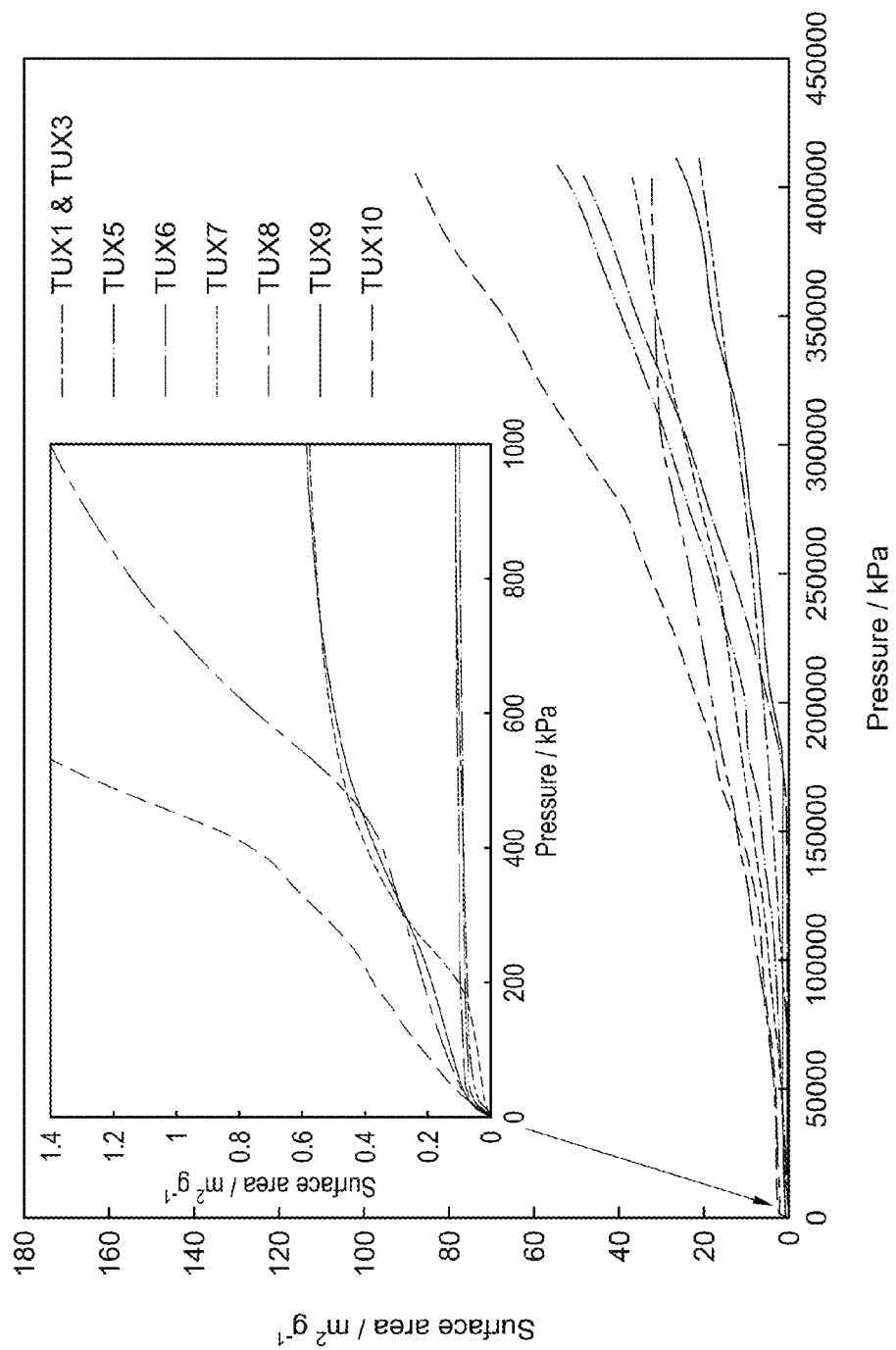
Figure 6B:
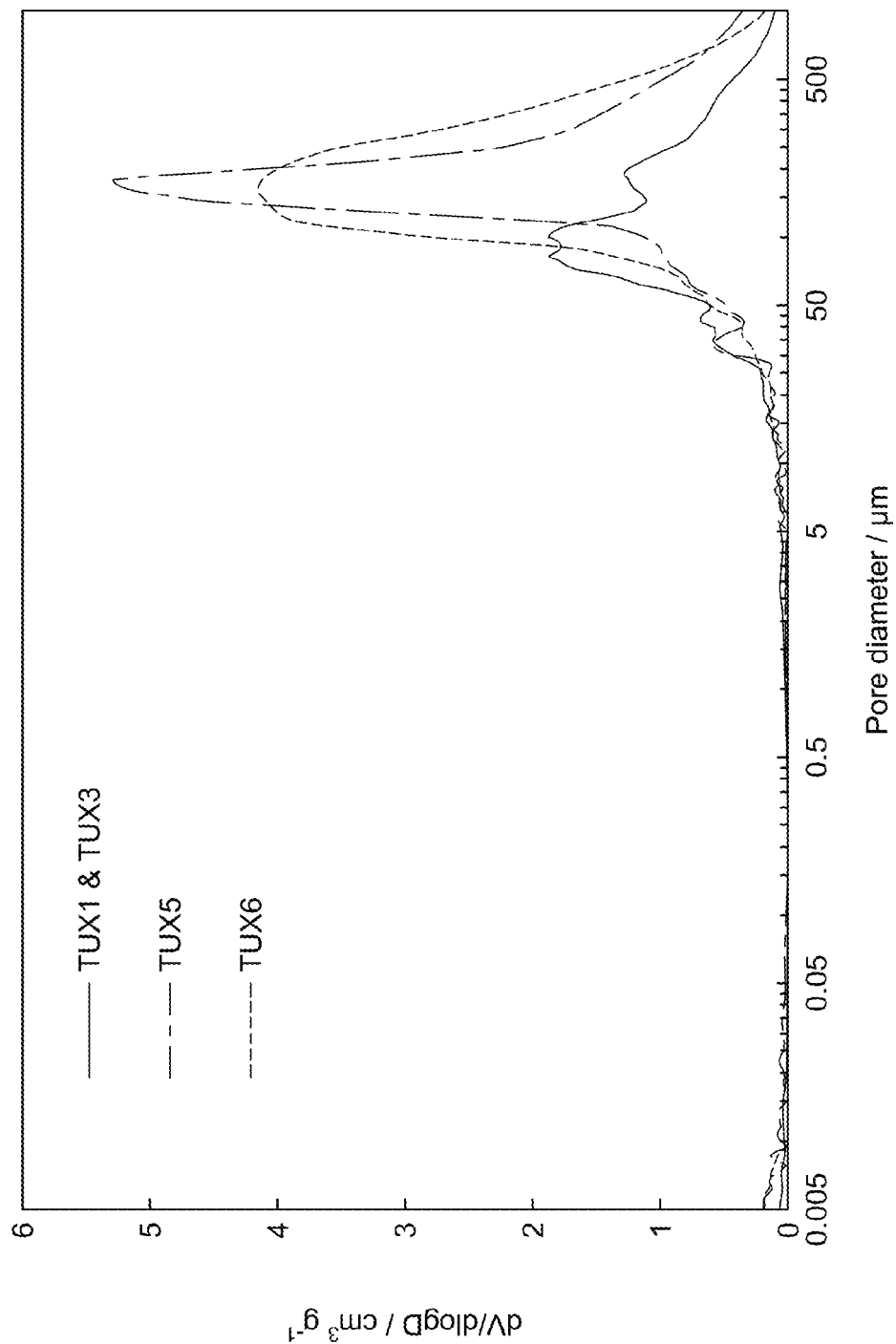
Figure 6C:
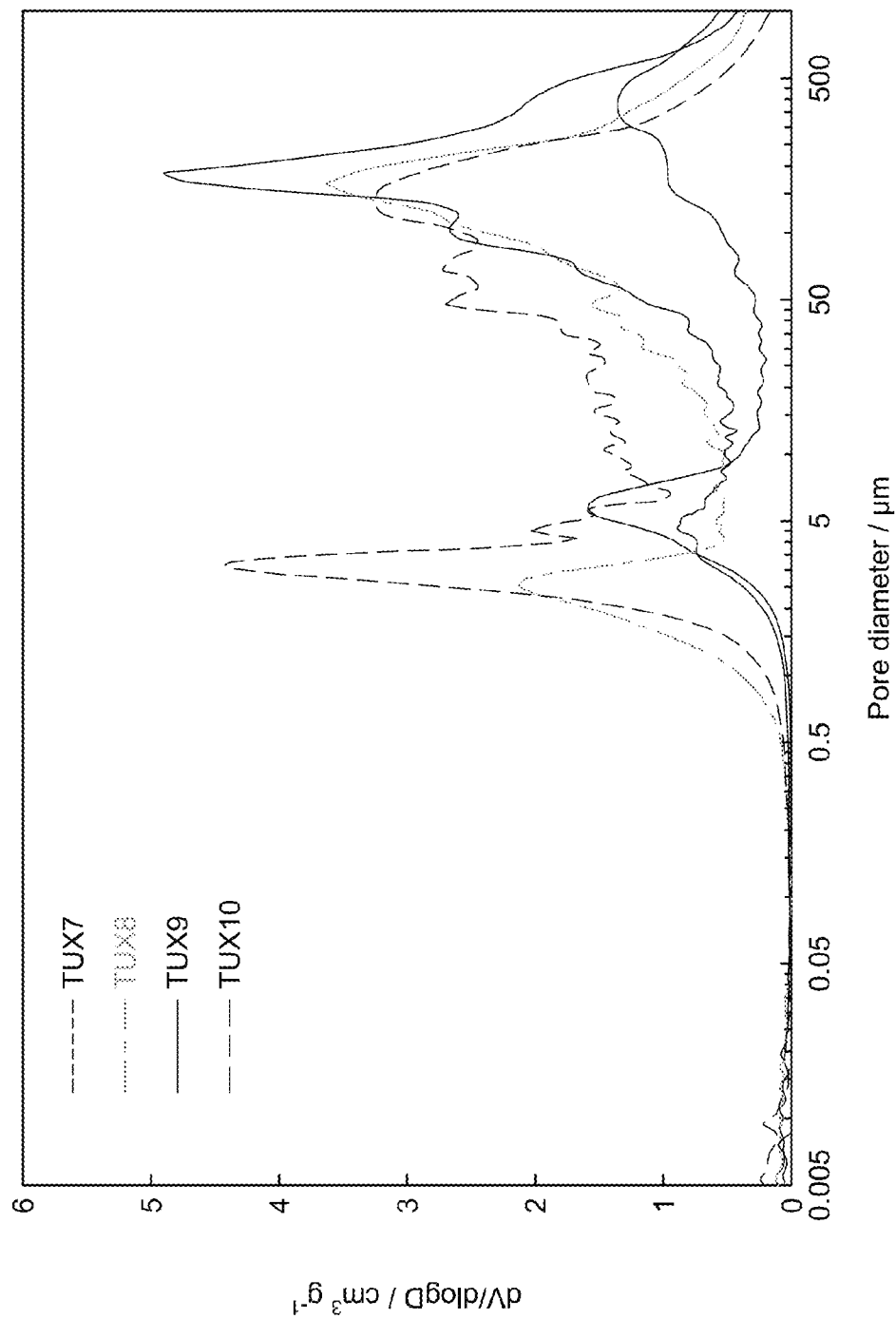
Figure 7A:
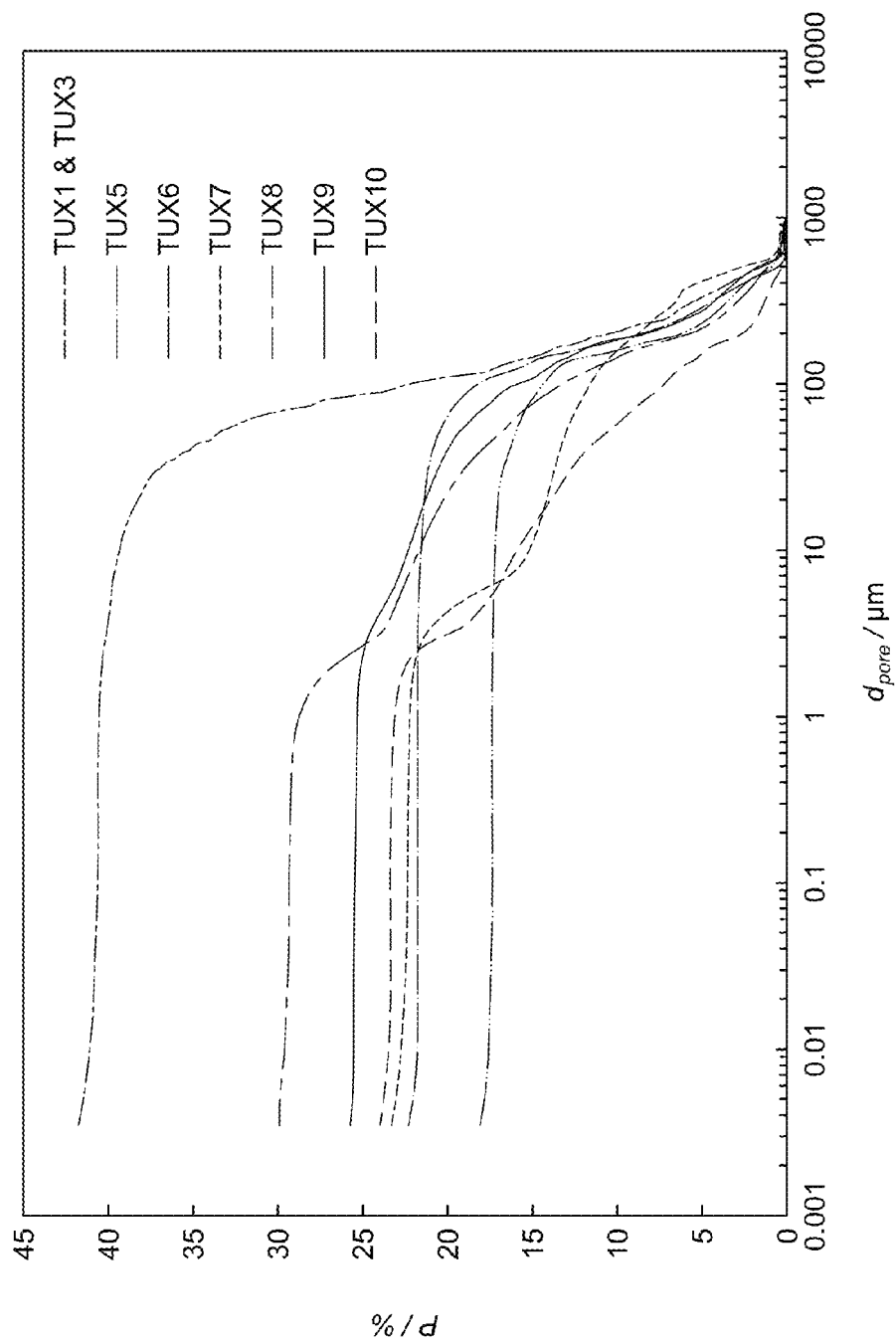
Figure 7B:
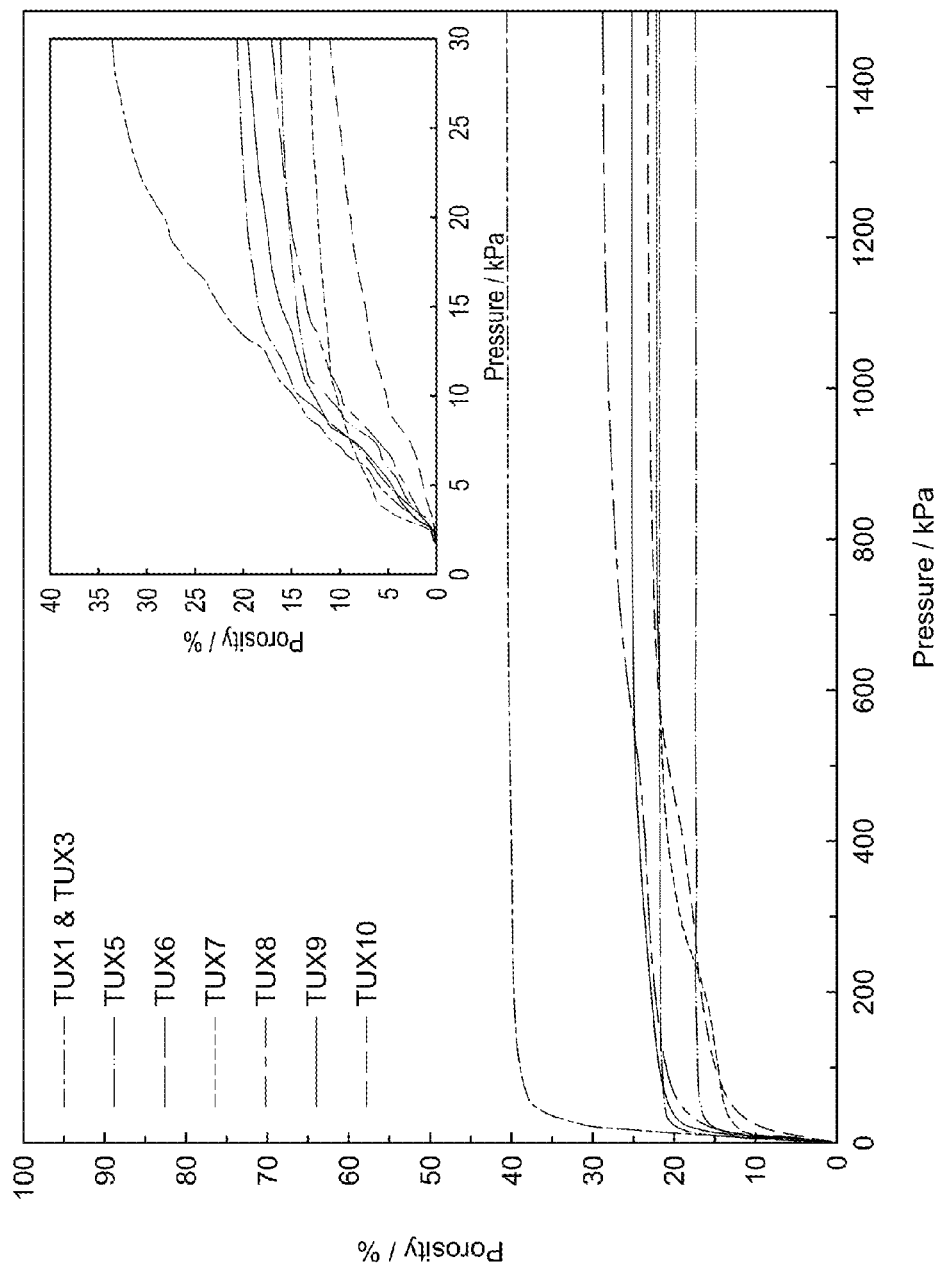
Figure 8A:
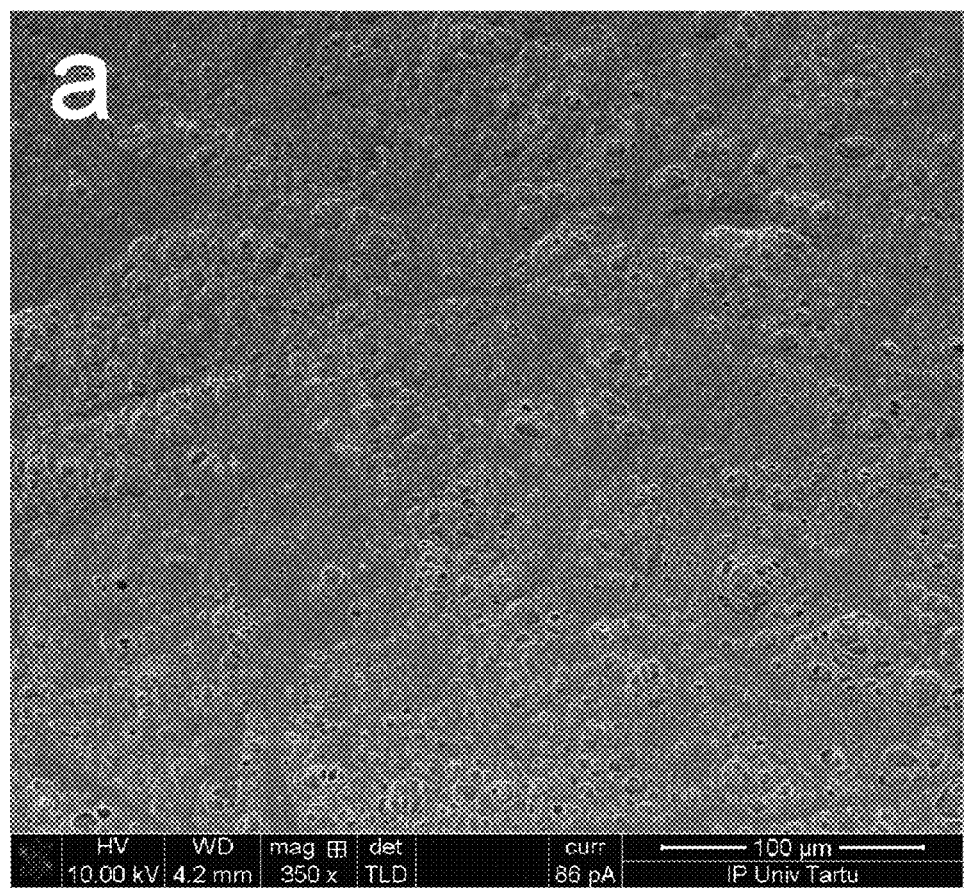
Figure 8B:
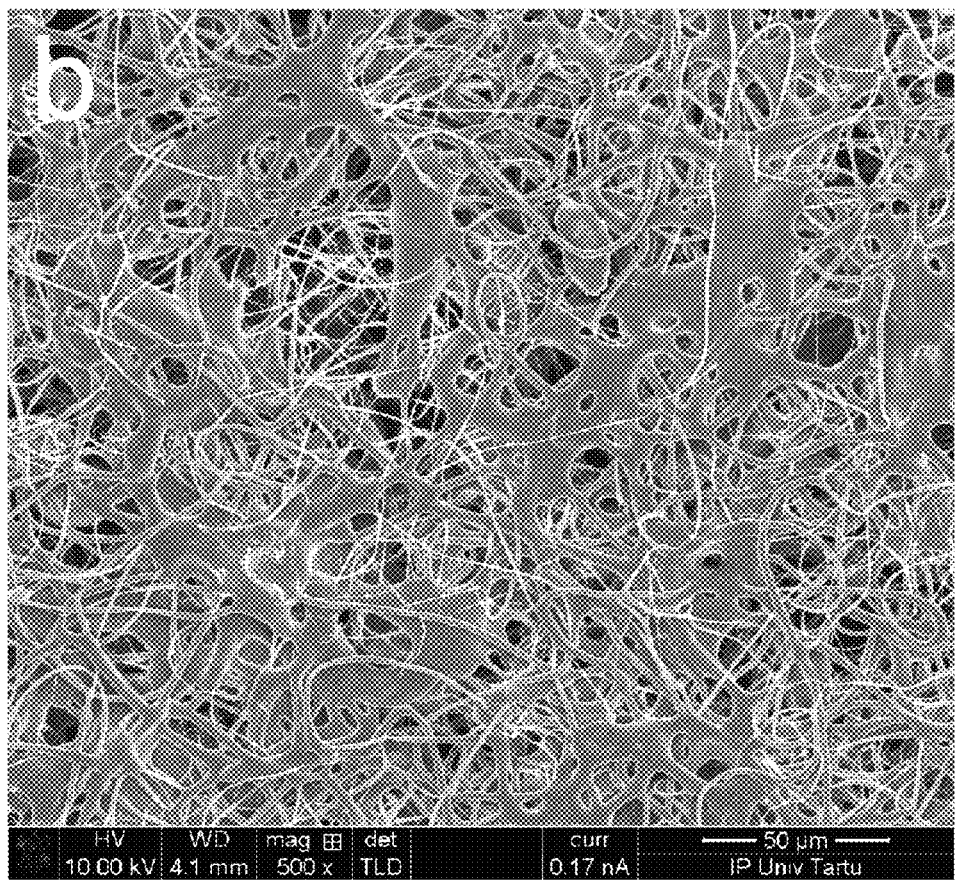
Figure 8C:
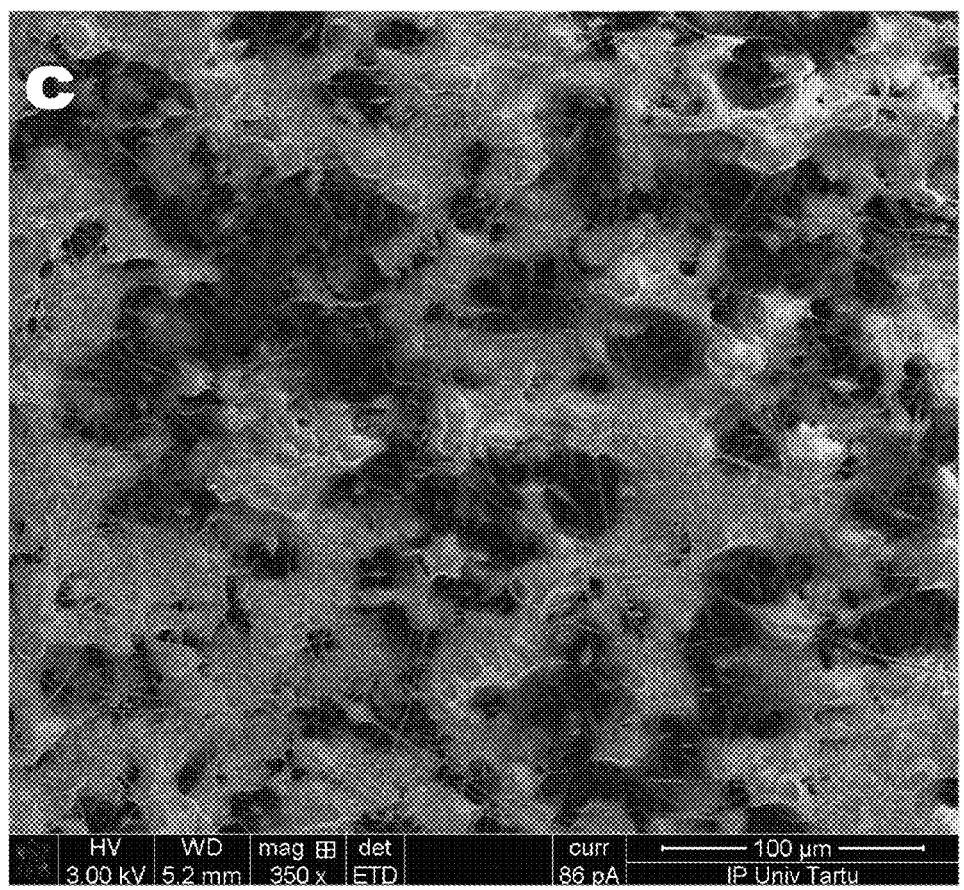
Figure 8D:
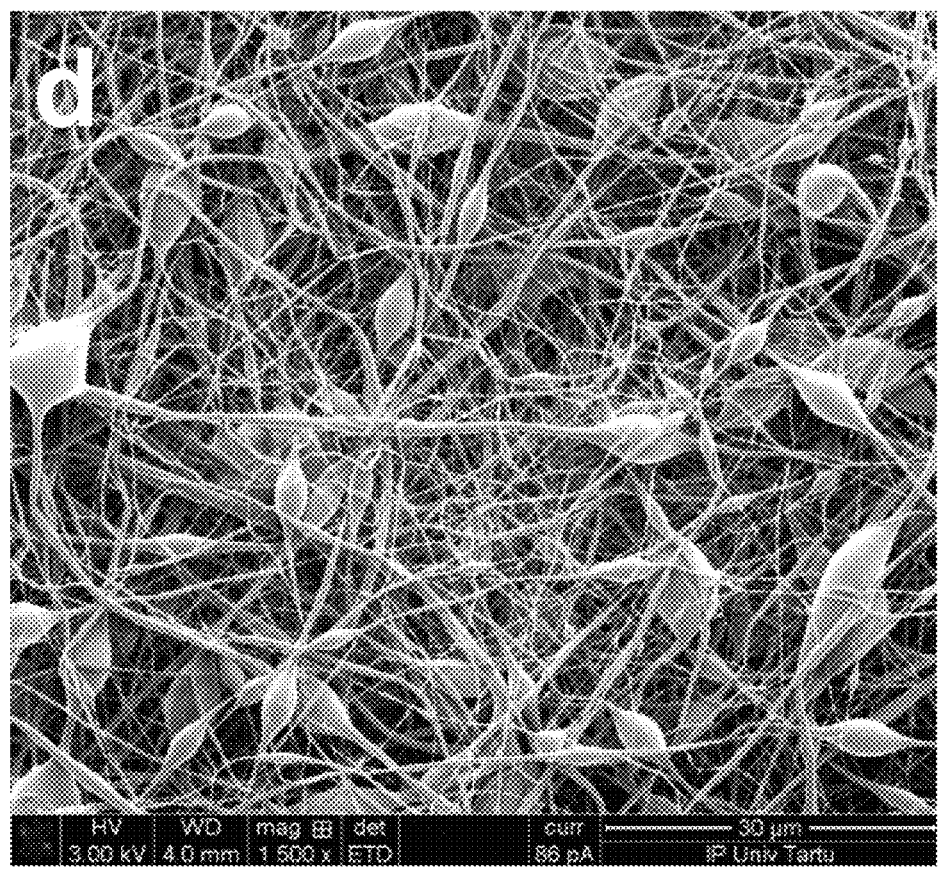

FIGS. 3A, 3B, and 3C show gas adsorption isotherms and pore size distribution measurement data for ultramicroporous-microporous-mesoporous carbon powders, and FIGS. 4 and 5 show analogous data for electrospun carbon-PVDF composite electrodes, based on Brunauer-Emmett-Teller (BET) gas adsorption measurement method and calculated using density functional theory (DFT) (FIGS. 3B and 4) and SAIEUS model (FIGS. 3C and 5), explaining the pore size distribution and adsorption hysteresis (FIG. 3A) and condensation into mesopores. The medium pore diameter, total pore volume and surface area of carbons are given in Table 1 above. The corresponding carbon powders have been prepared by the thermal high temperature chlorination (noted as $Cl_2$) of binary carbides (denoted as TiC—CDC, VC—CDC, $Mo_2C$—CDC, SiC—CDC, and HCl methods (CDC—HCl)) or high temperature decomposition method from d-glucose (denoted as GDAC) at T=800 degrees Celsius for 0 to 12 hours, activated through the reaction with $CO_2$ and chemically reduced using $H_2$ at fixed temperatures for 0, 4, 6, 8, 10, 12 hours, as noted in the Figures).

FIGS. 6A, 6B, 6C, 7A, and 7B show mercury intrusion porosimetry measurement data for electrospun membranes from different raw solutions of PVDF in DMF with acetone mixture, with detailed data given in Tables 2 and 3 above. Based on the data in FIGS. 6A, 6B, 6C, 7A, and 7B and in Tables 2 and 3, the concentration, solvent composition, and electric field strength have large influence on the membrane porosity, surface area, and differential pore size distribution values.

FIGS. 8A, 8B, 8C, and 8D show backscattered electron scanning electron microscopy (SEM) images for electrospun membranes prepared from different raw PVDF solutions in DMF with acetone mixture, electrospun at different electric field strengths (which are given in Table 2).

Figure 9:
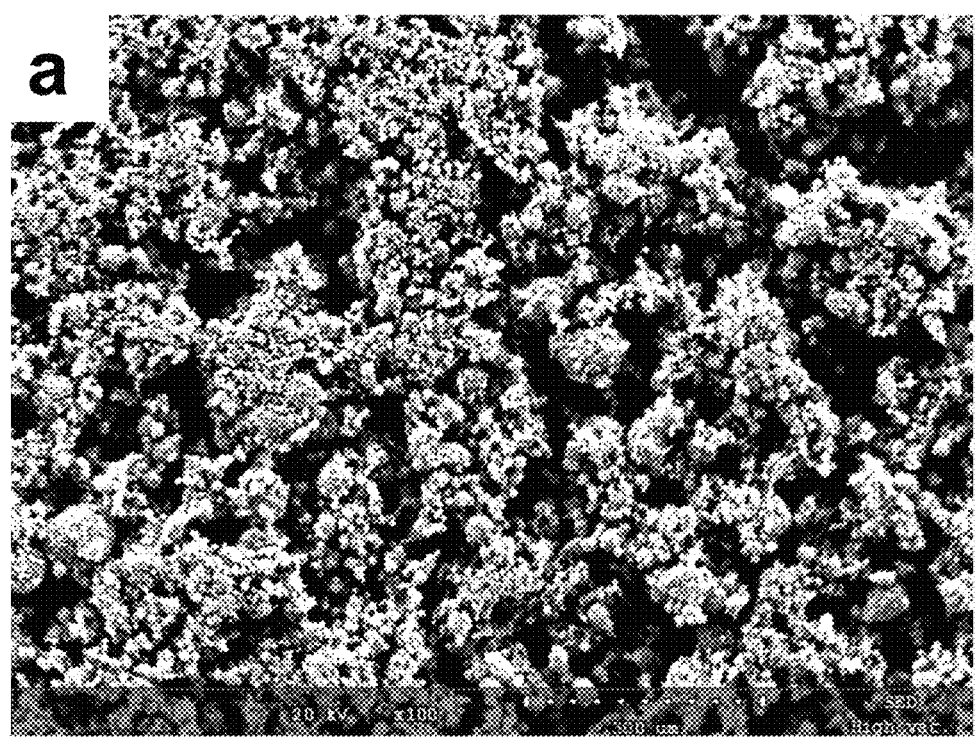
Figure 10:
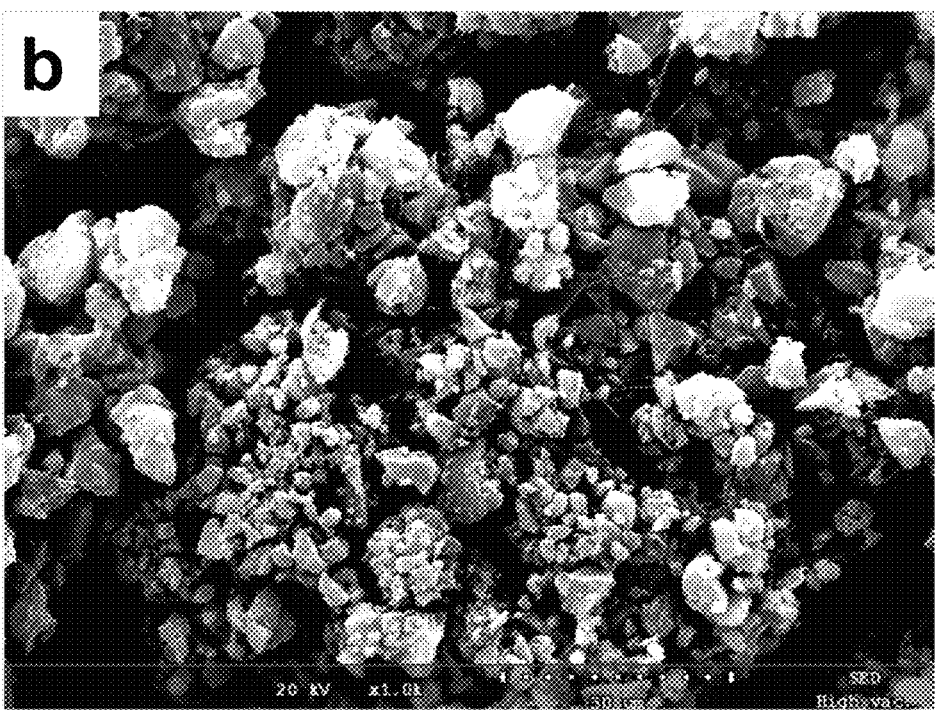

FIGS. 9 and 10 show SEM data for the electrospun electrode layer deposited onto a PVDF membrane at electric field strength 1.33 kV*cm$^{-1}$. FIG. 9 illustrates the electrode structure without the compression step, and FIG. 10 illustrates the electrode structure with additional isostatic hot pressing at 5 MPa for 2 minutes.

Figure 11A:
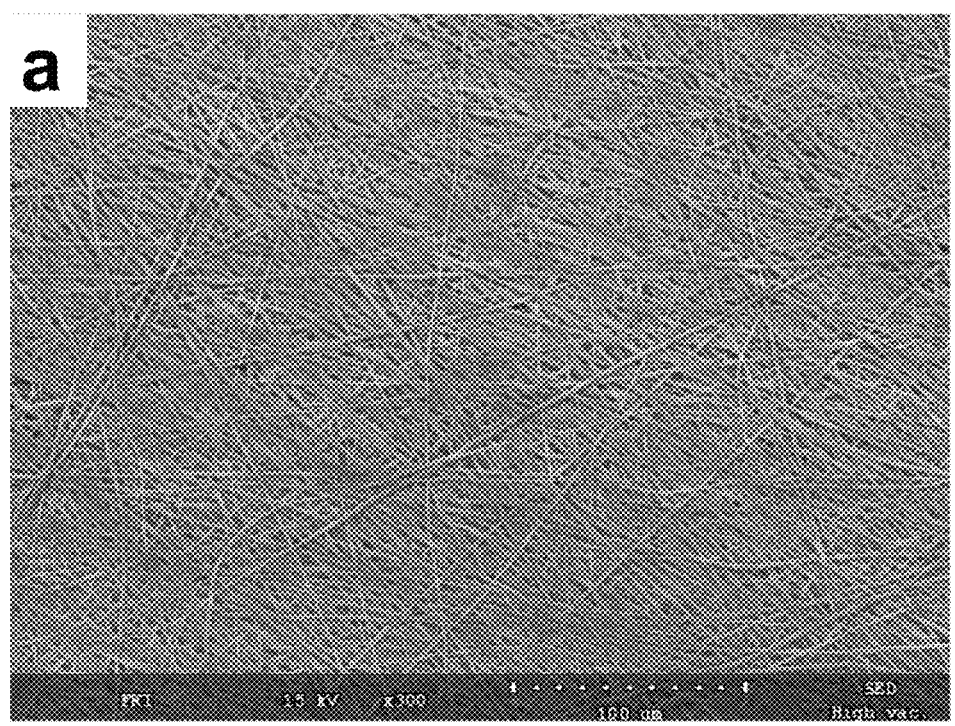

FIG. 11A illustrates SEM data for an electrospun membrane after isostatic hot pressing at 5 MPa for 2 min.

Figure 11B:
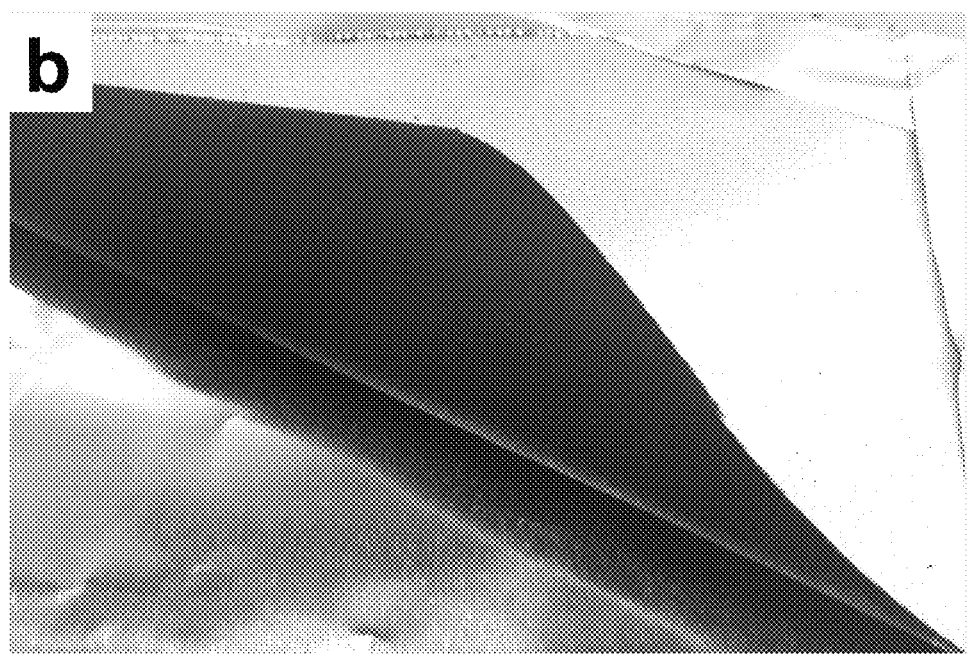

FIG. 11B shows a photo image of an electrospun half-cell, where the active electrode layer is black and the separator layer is white/grey.

Figure 12A:
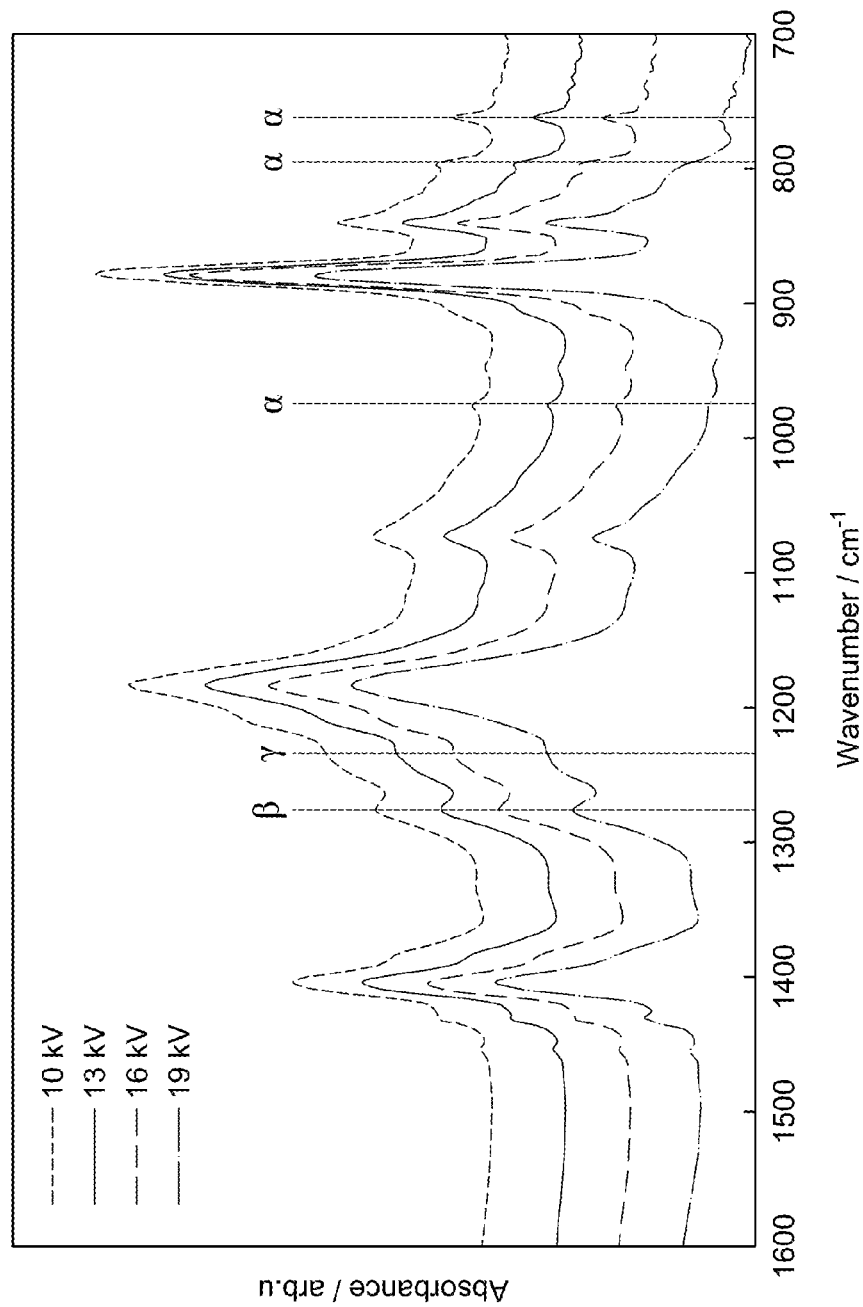
Figure 12B:
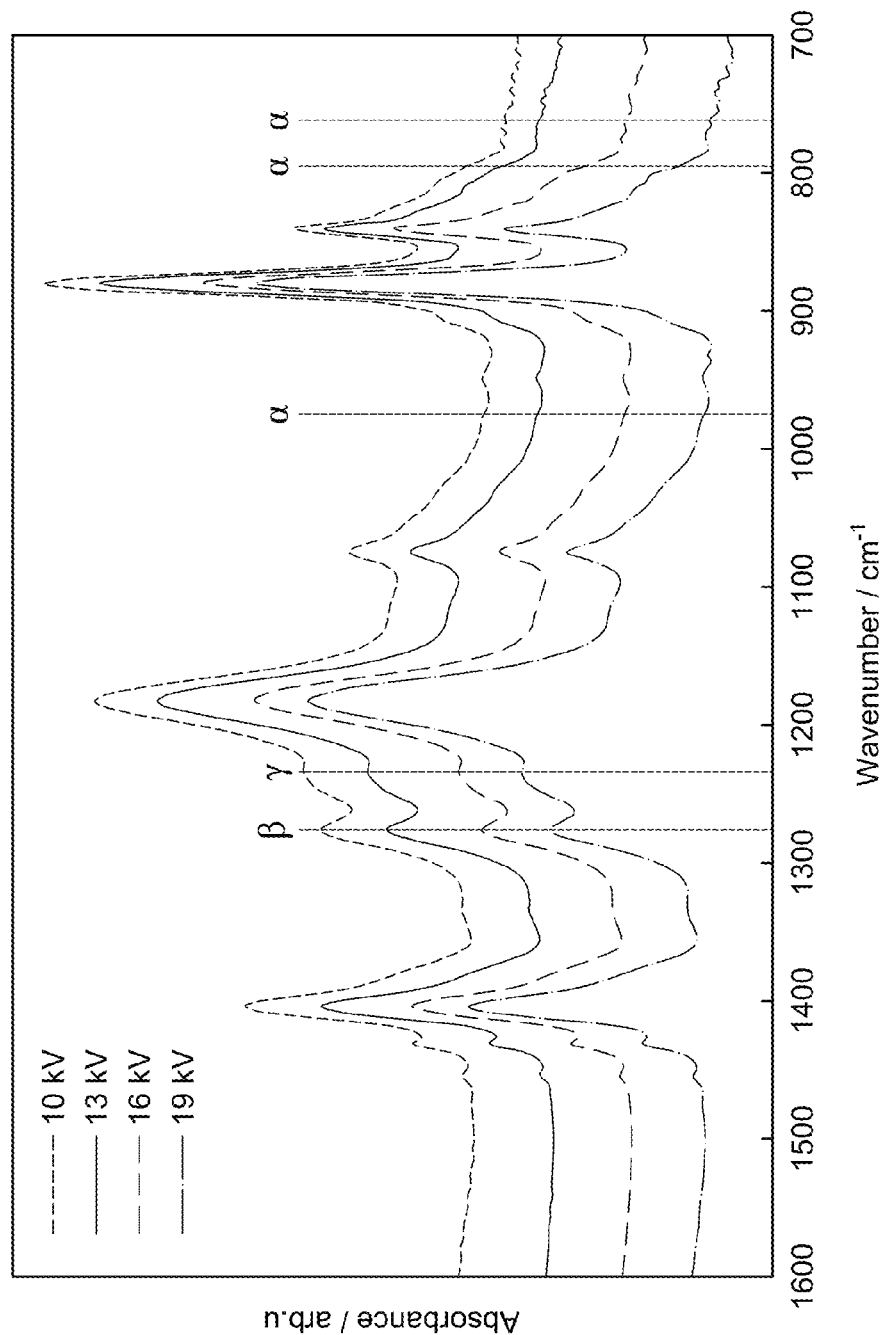

FIGS. 12A and 12B illustrate infra-red (IR) spectra for electrospun PVDF membranes prepared from 20% PVDF solution in DMF-acetone mixtures (a) 8:2 and (b) 7:3, at different applied dc voltages, and at solution feed rate of 0.5 ml*h$^{-1}$. Based on the data of FIG. 12, different polymorphic α, β, and γ phases (as noted in the Figures) in electrospun membranes have been created.

Figure 13:
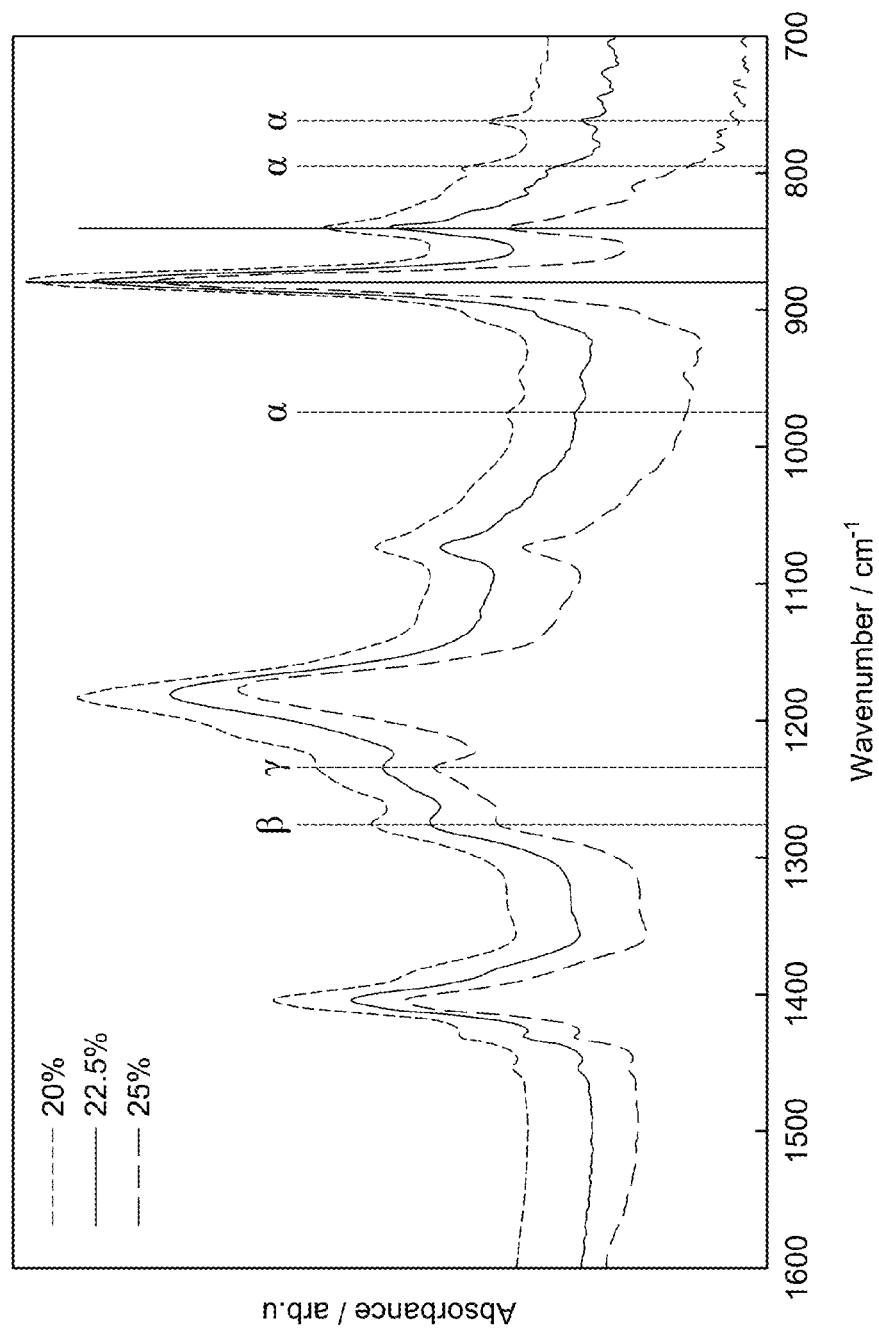

FIG. 13 illustrates the influence of the PVDF concentration in DMF-acetone mixture (given in the Figure) for polymorphic composition of PVDF membrane, analyzed using an infra-red (IR) spectroscopy method.

Figure 14A:
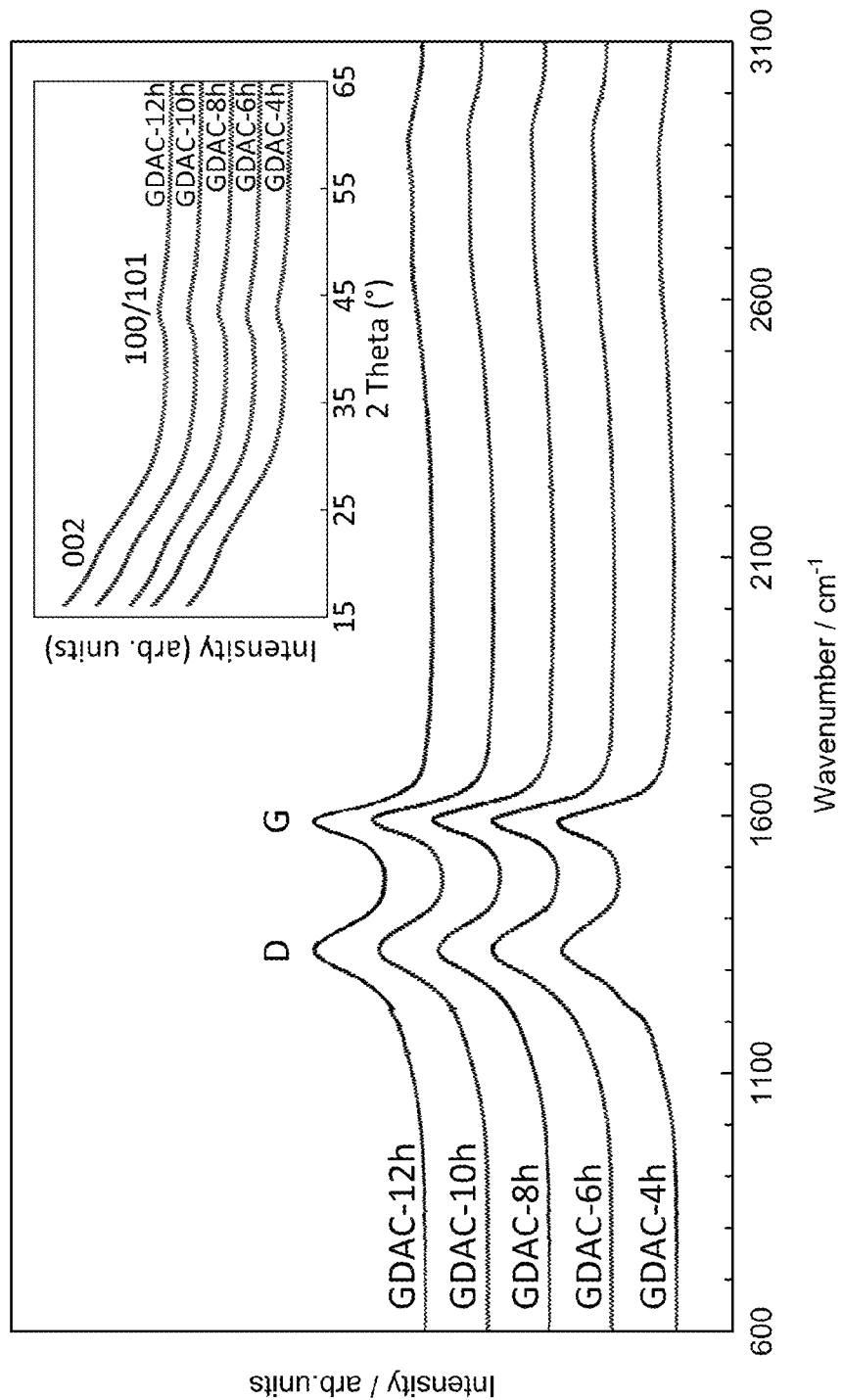
Figure 14B:
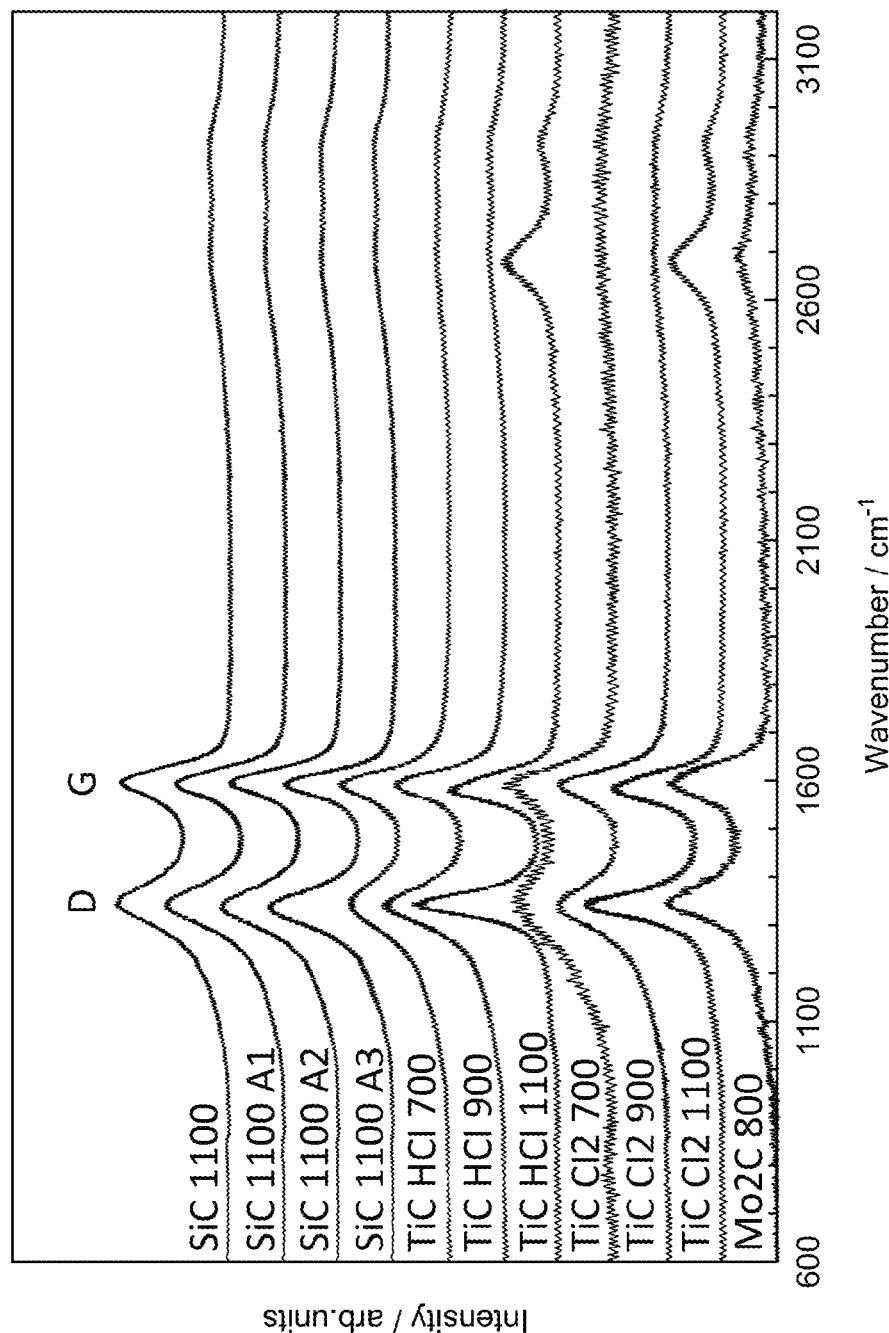
Figure 14C:
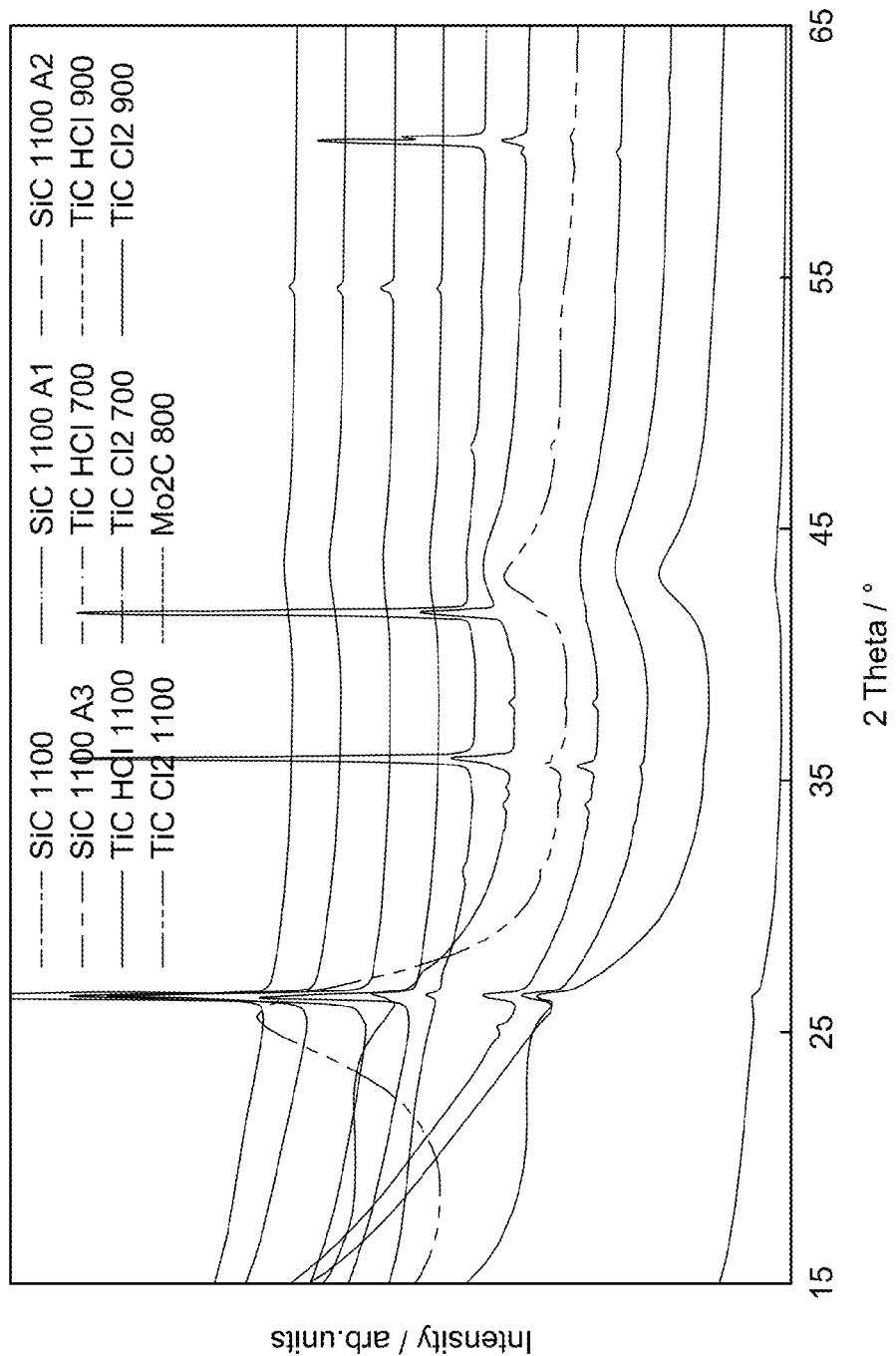

FIGS. 14A, 14B, and 14C show Raman spectroscopy and X-ray diffraction data (inset) for different carbon powders (noted in Figures).

Figure 15A:
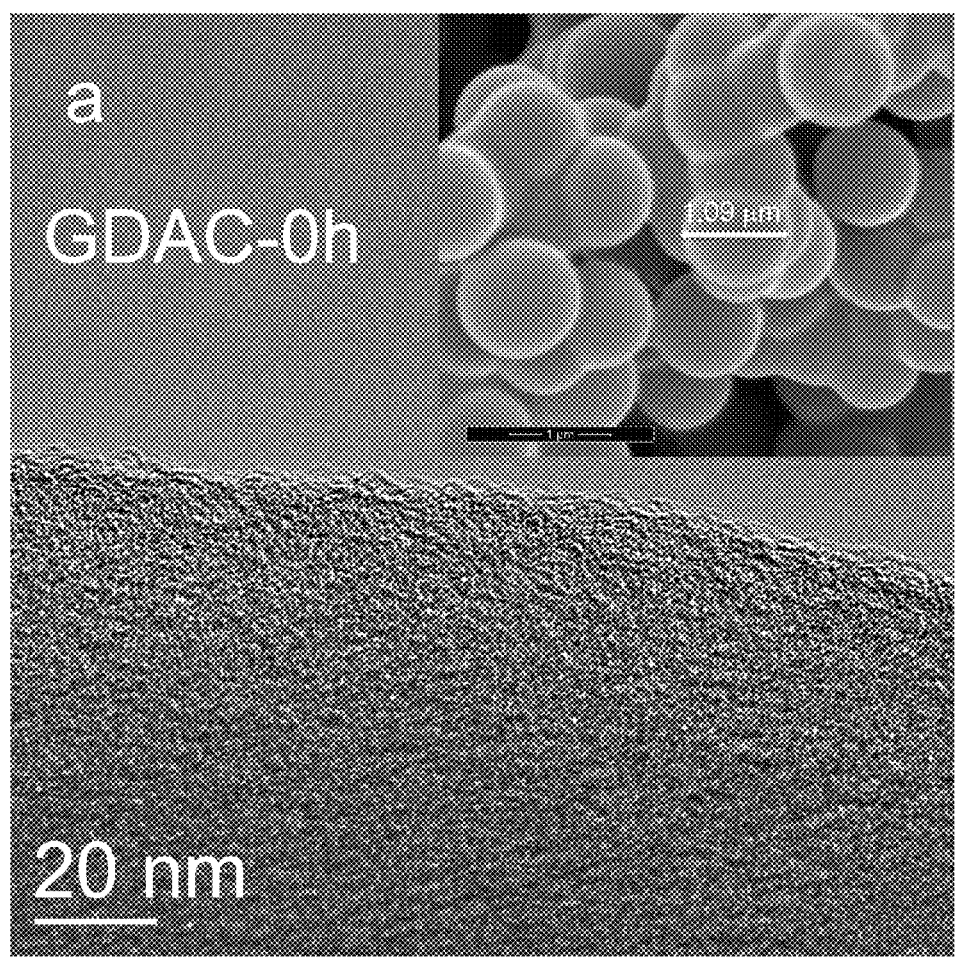
Figure 15B:
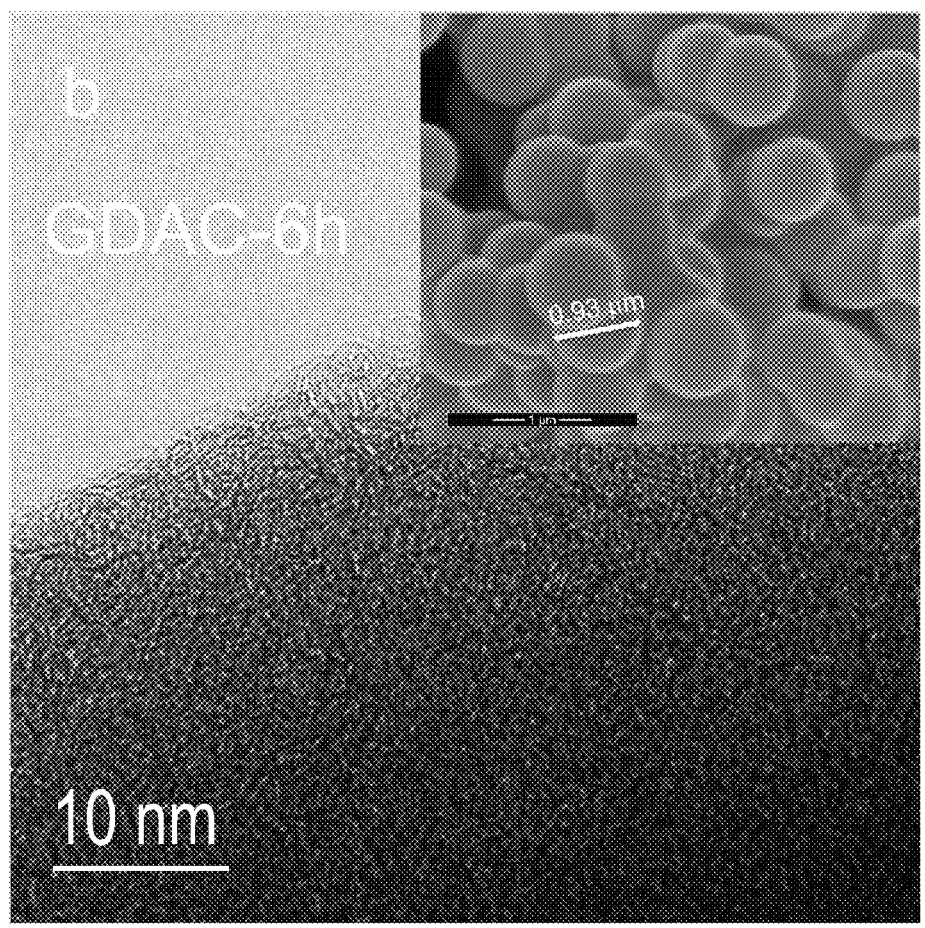
Figure 15C:
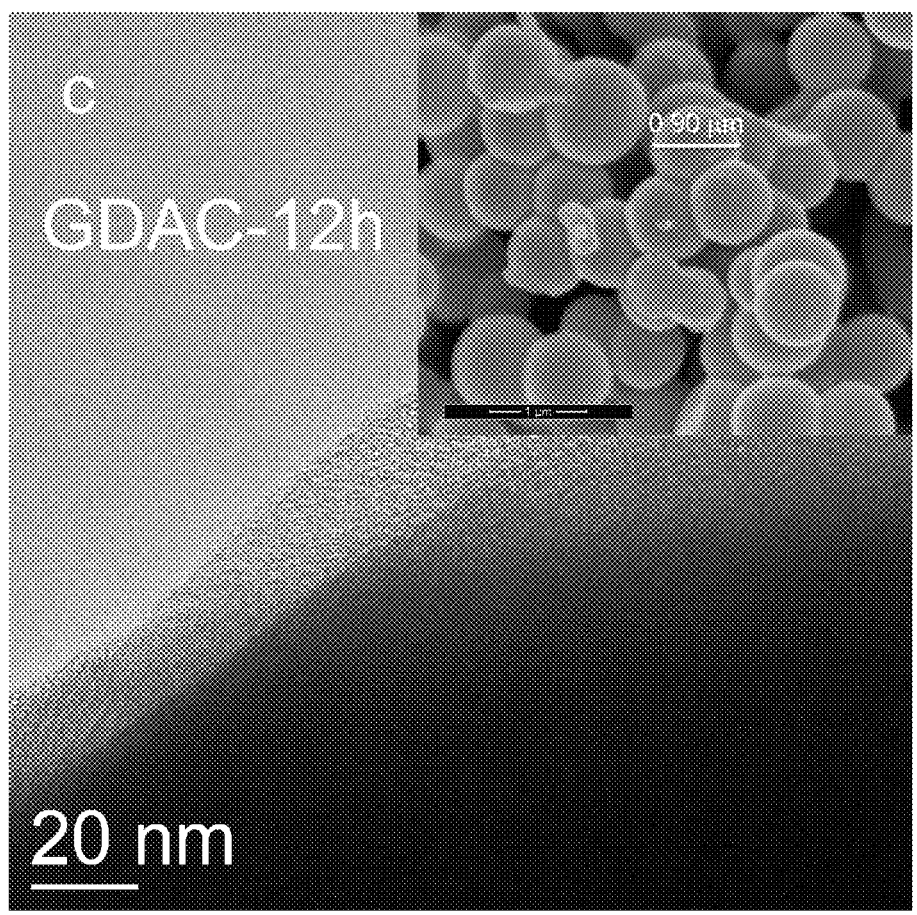

FIGS. 15A, 15B, and 15C show high-resolution transmission electron microscopy (HRTEM) data and SEM image (inset) for porous D-glucose derived activated carbons prepared using different $CO_2$ activation times (noted in Figures as GDAC-xh).

Figure 16A:
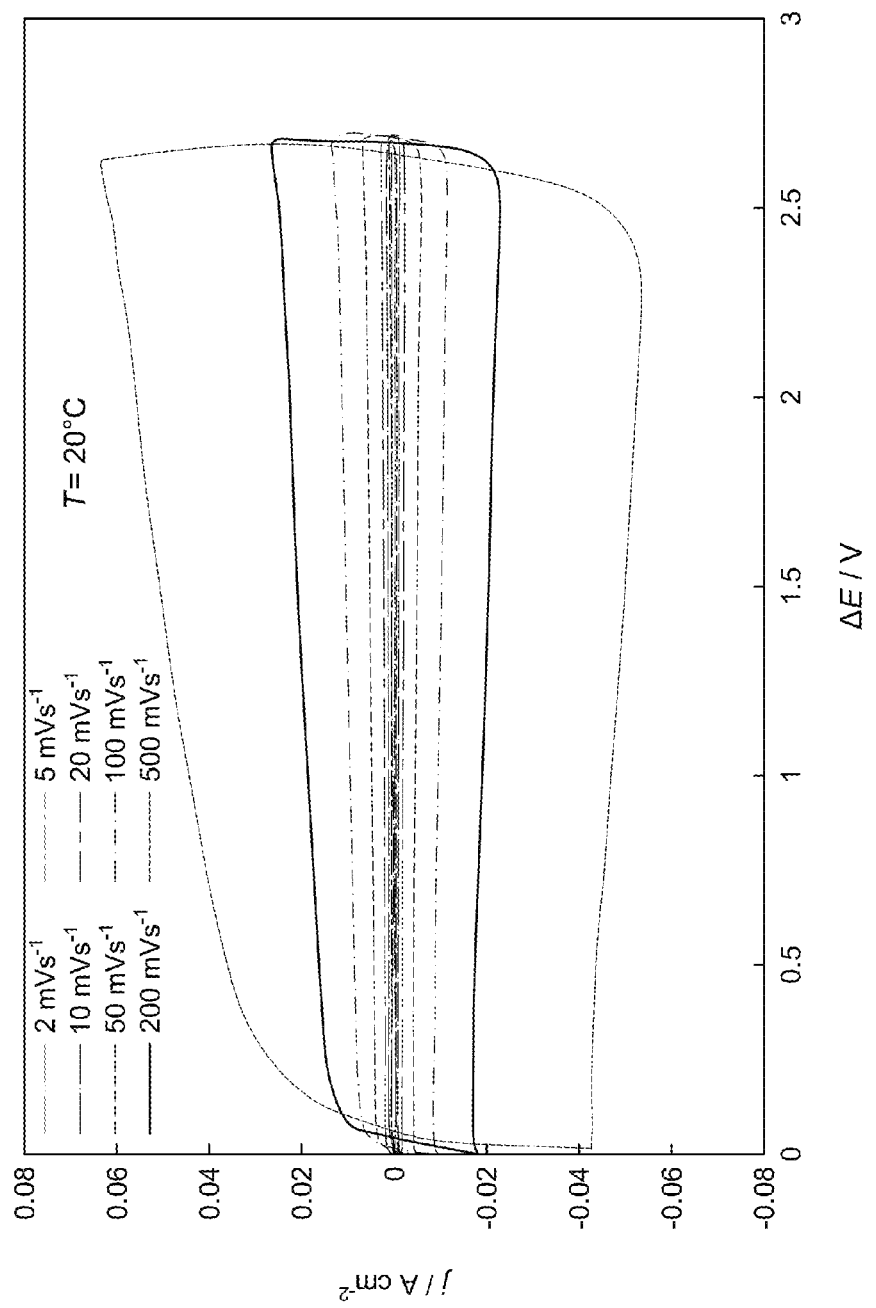
Figure 16B:
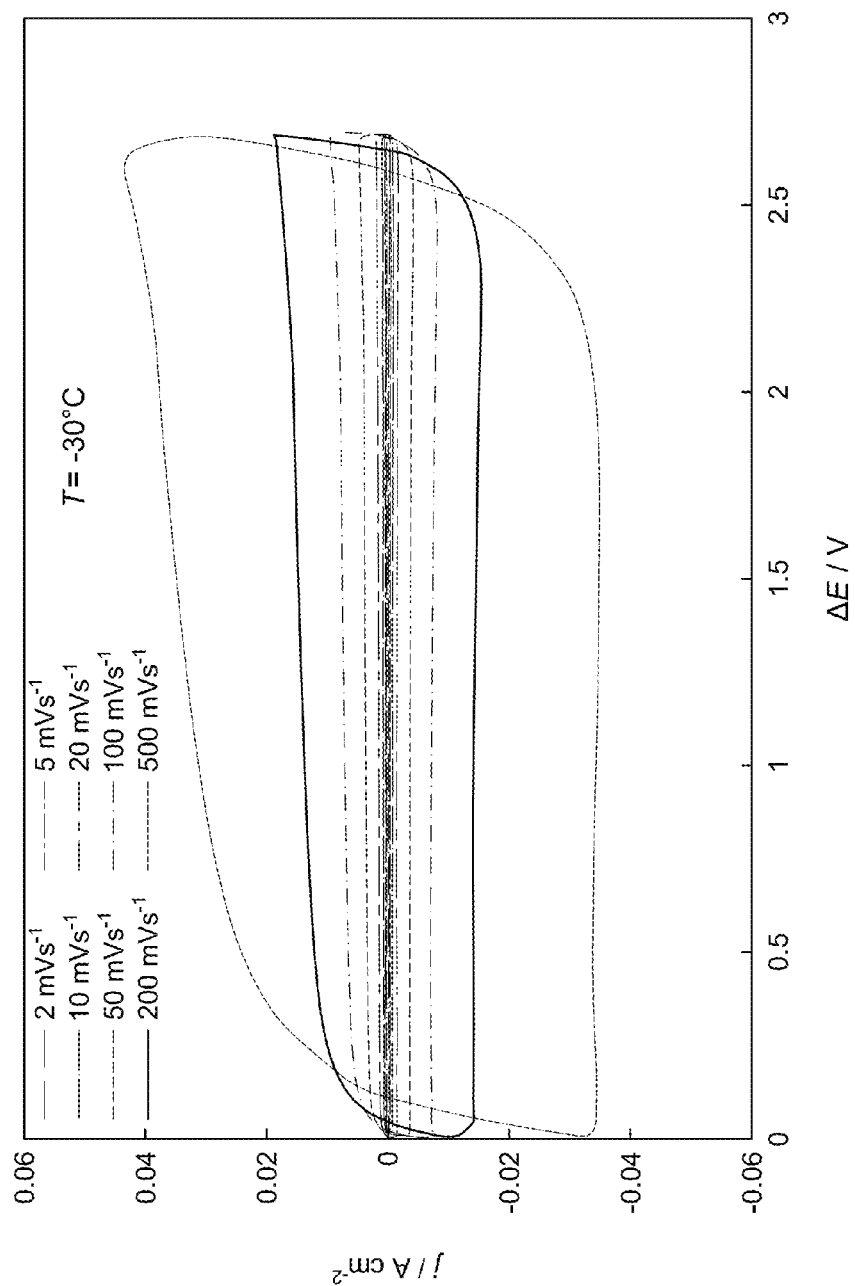
Figure 16C:
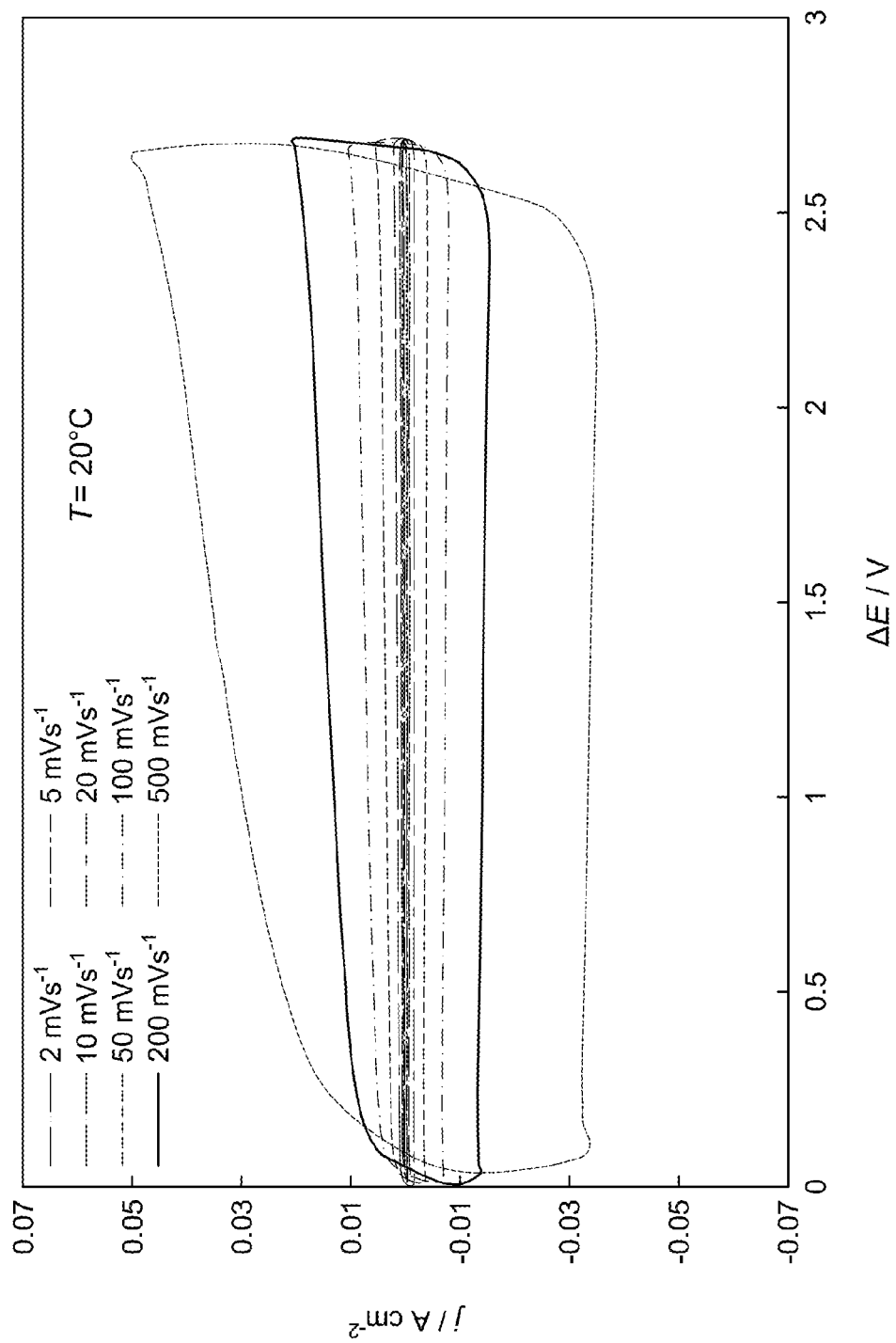
Figure 16D:
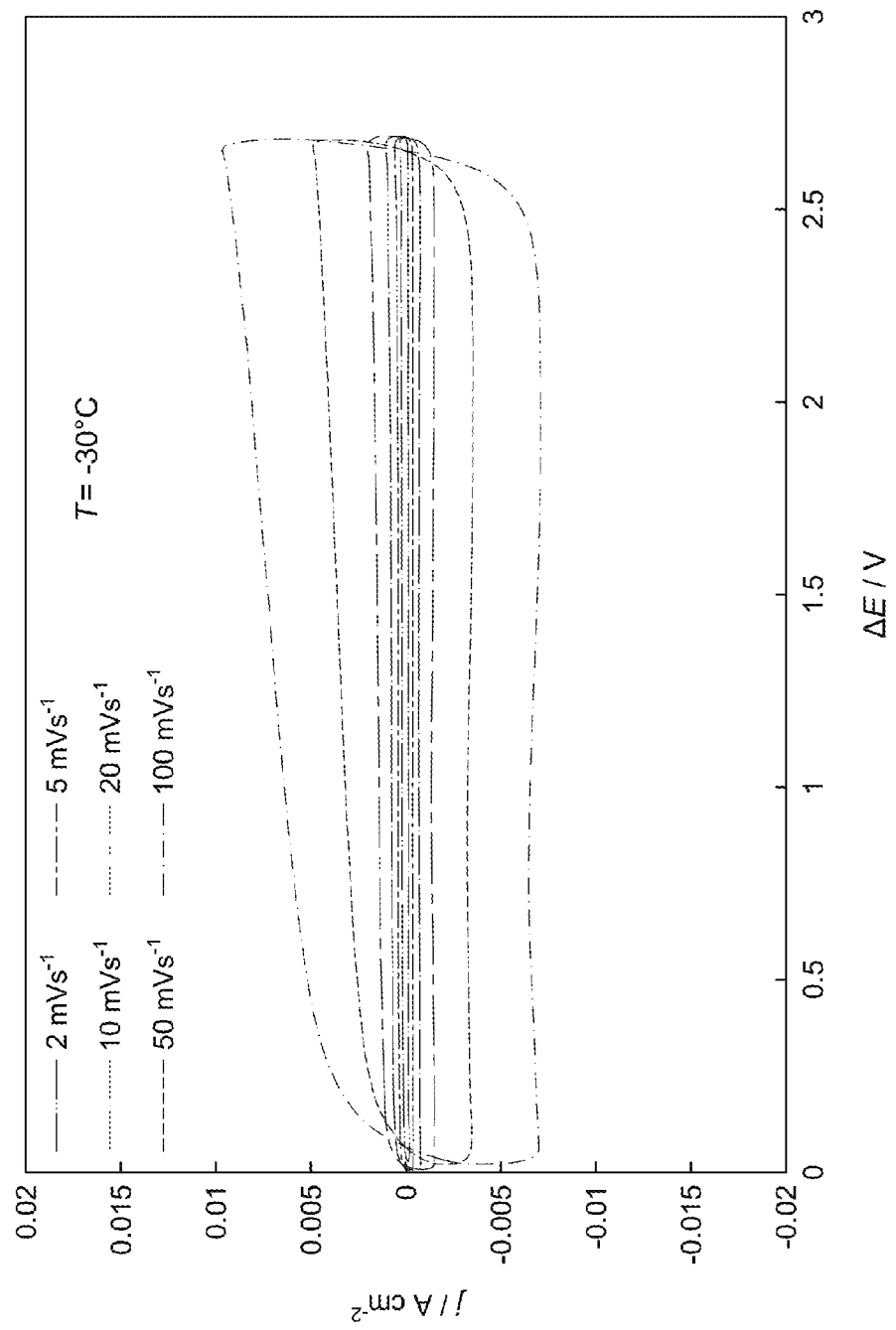
Figure 17A:
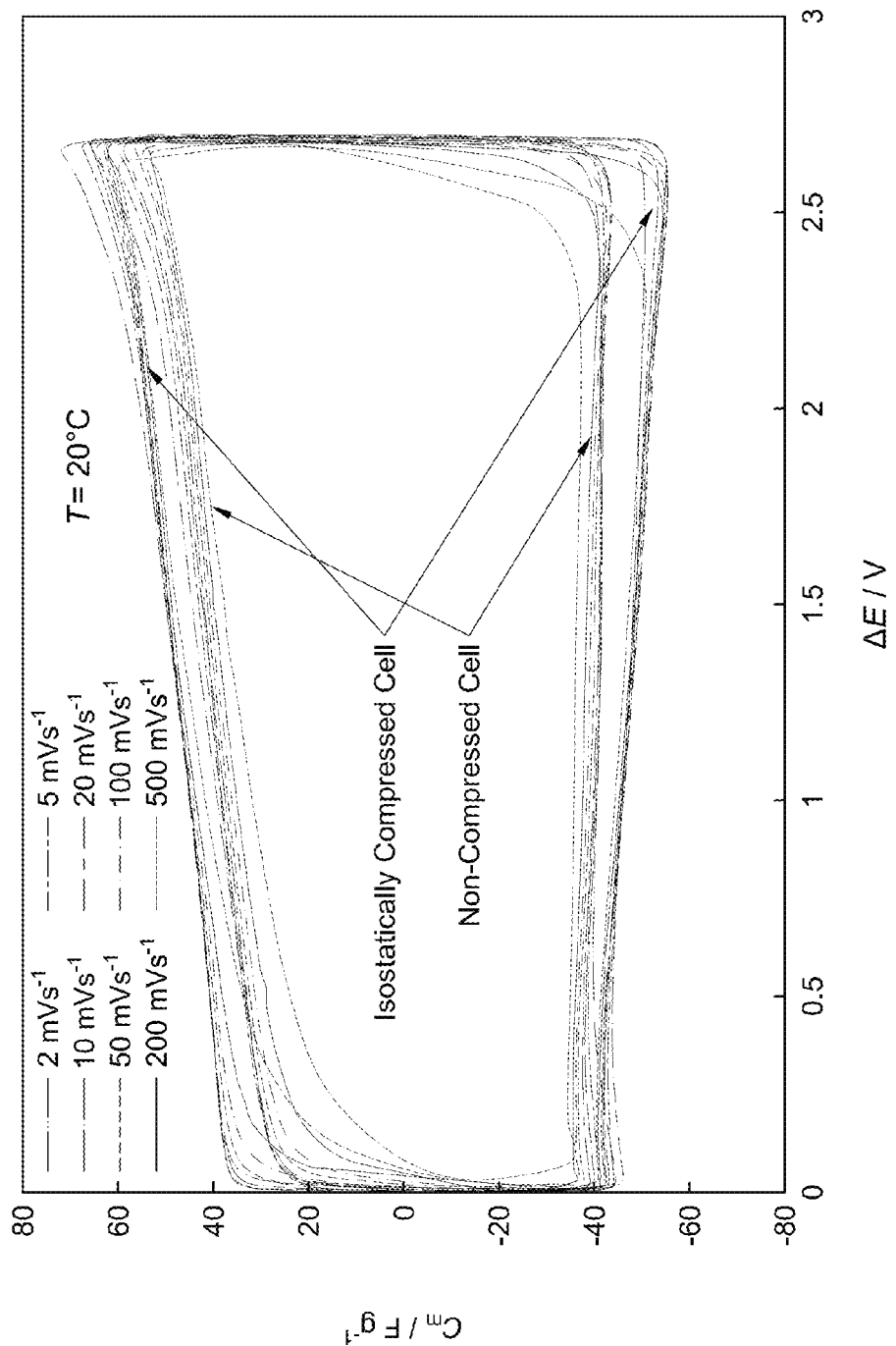
Figure 17B:
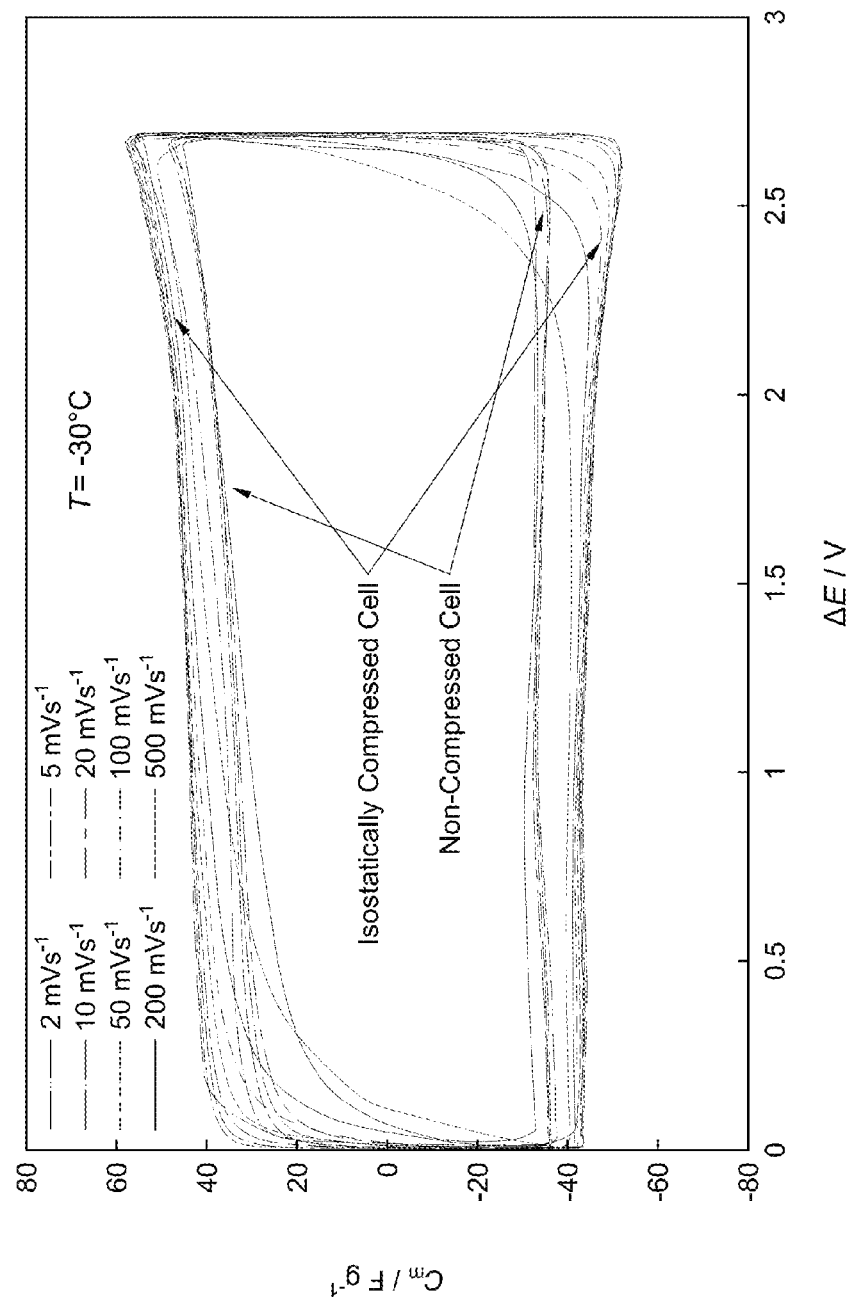

FIGS. 16A, 16B, 16C, 16D, 17A and 17B show, respectively, cyclic voltammograms (i.e., current density vs. cell potential) and capacitance vs. cell potential plots for carbon electrode/membrane two half-cell structures (forming single cells). In FIGS. 16A and 16B, the structures had been isostatically compressed at 20 degrees Celsius for 2 minutes; in FIGS. 16C and 16D, the structures had not been compressed. Different potential scan rates are marked in the Figures. The data of FIGS. 16A, 16C, and 17A were obtained at 20 degrees Celsius; the data of FIGS. 16B, 16D, and 17B were obtained at −30 degrees Celsius.

Figure 18A:
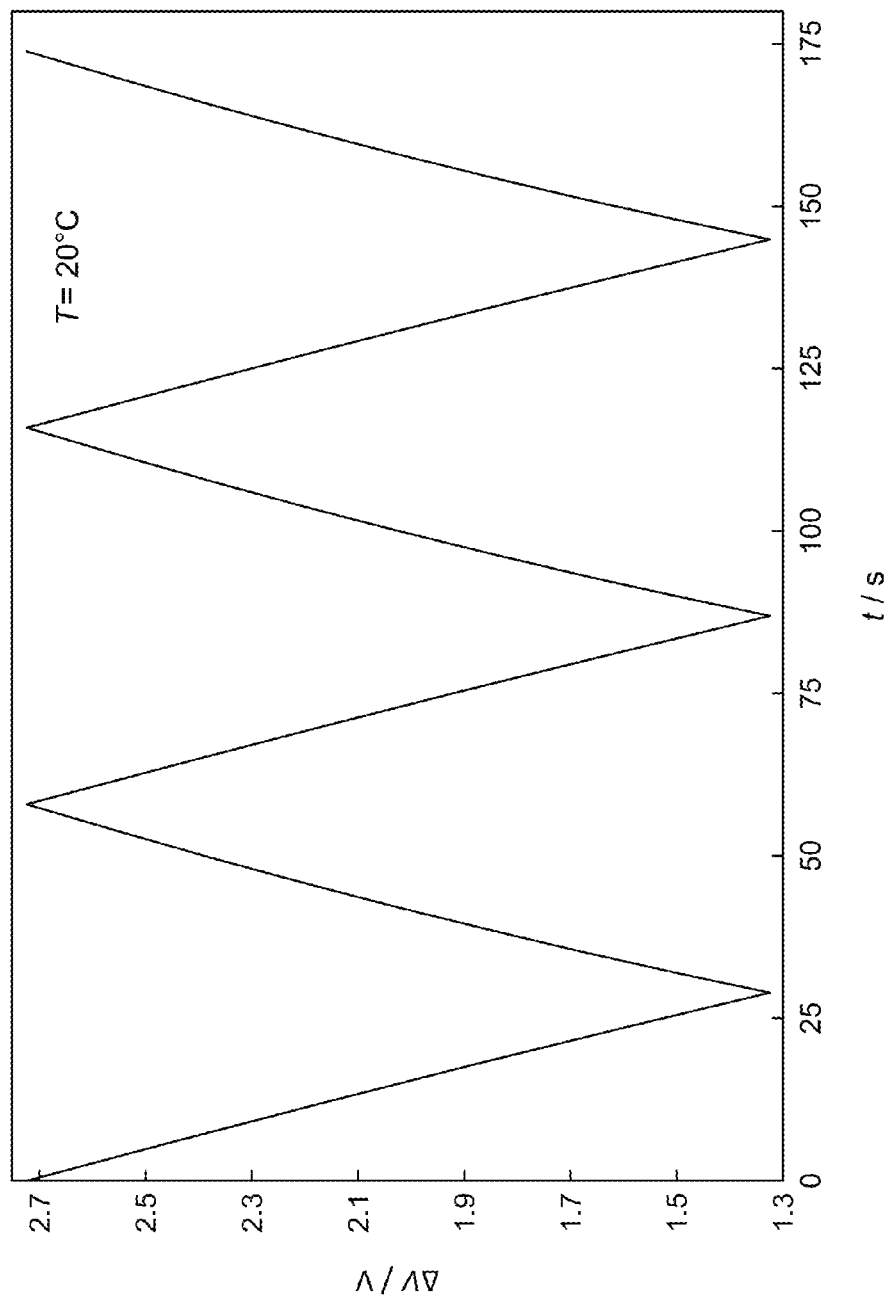
Figure 18B:
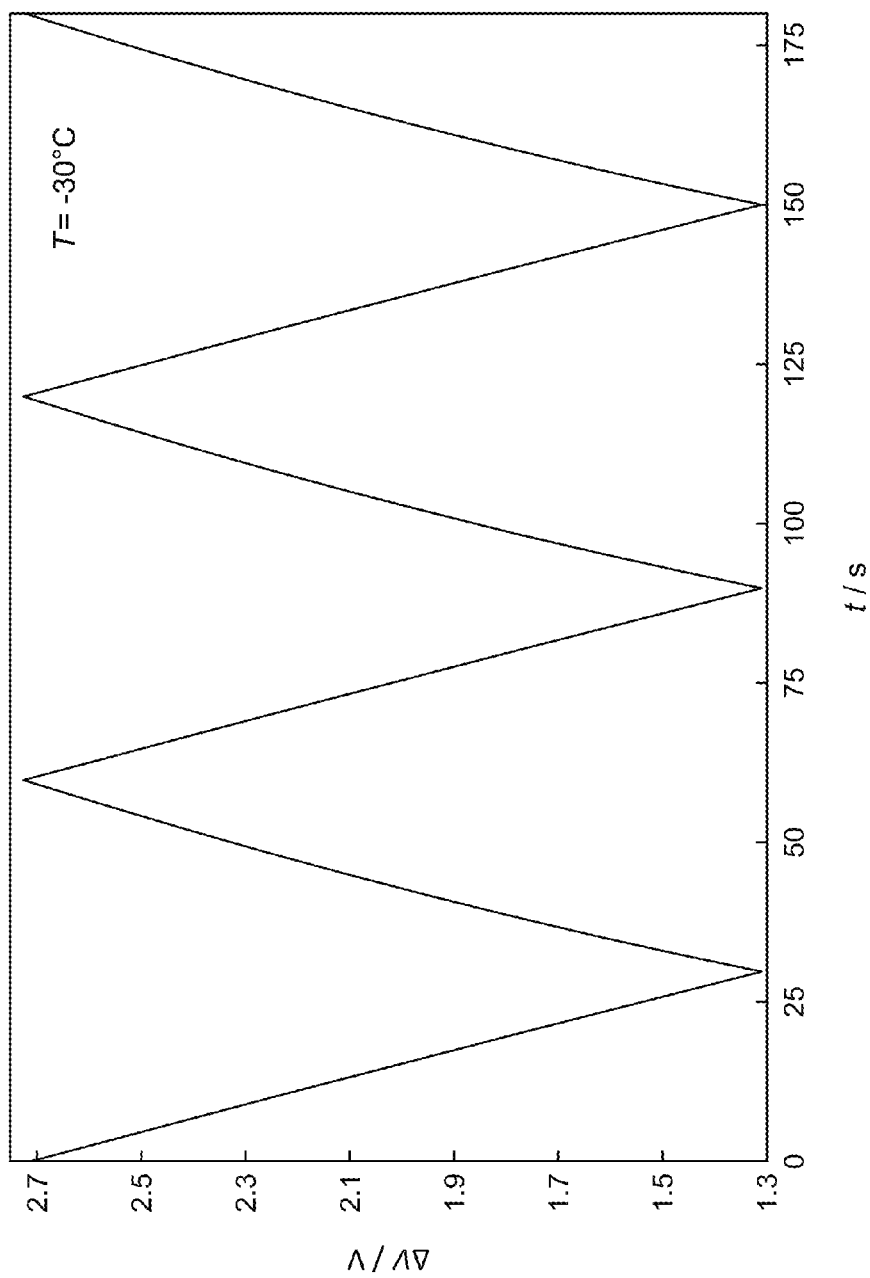

FIGS. 18A and 18B show constant current charge-discharge curves for EDLC cells (isostatically compressed at 20 degrees Celsius for 2 minutes) at testing temperature of 20 degrees Celsius (18A) and −30 degrees Celsius (18B).

Figure 19:
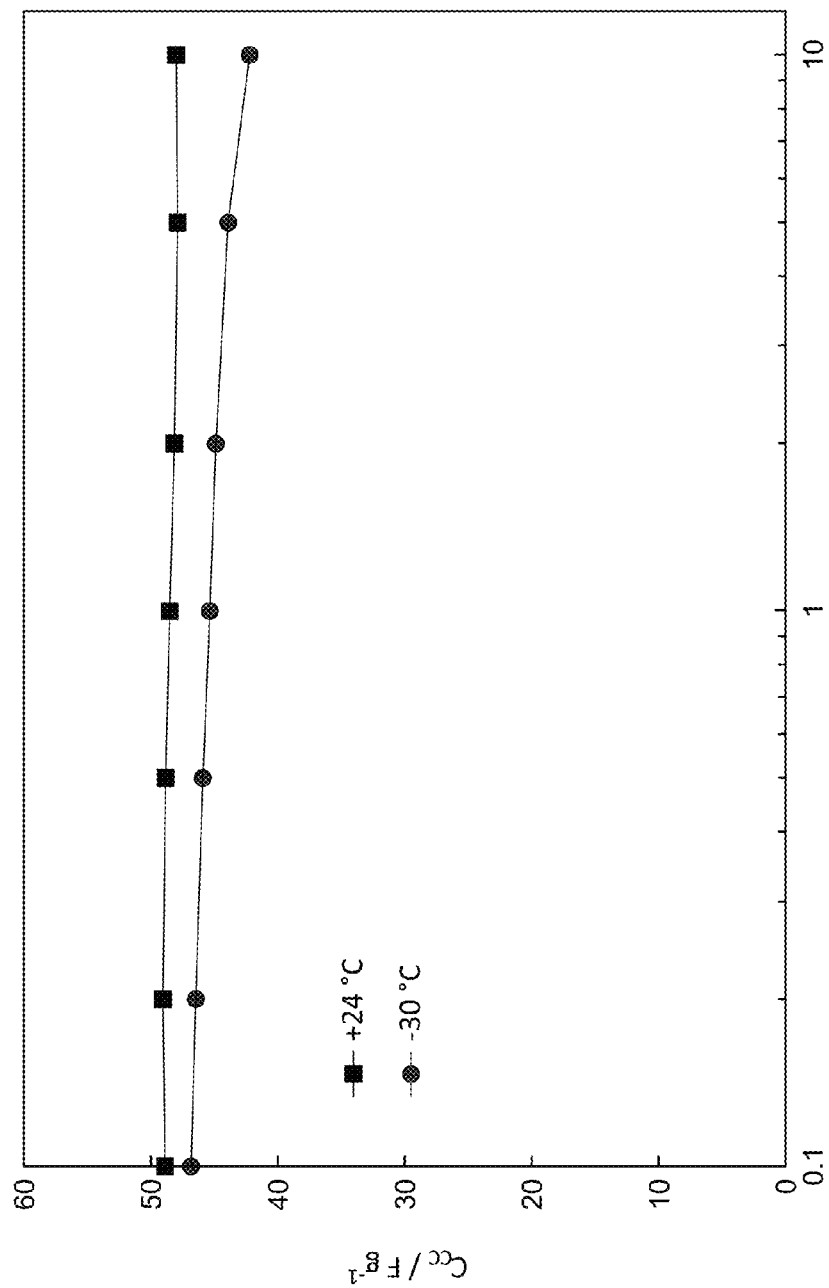

FIG. 19 shows discharge capacitance vs current density data for EDLC cells (isostatically compressed at 20 degrees C. for 2 minutes) at temperature 20 degrees Celsius and −30 degrees Celsius (as marked in the Figure).

Figure 20:
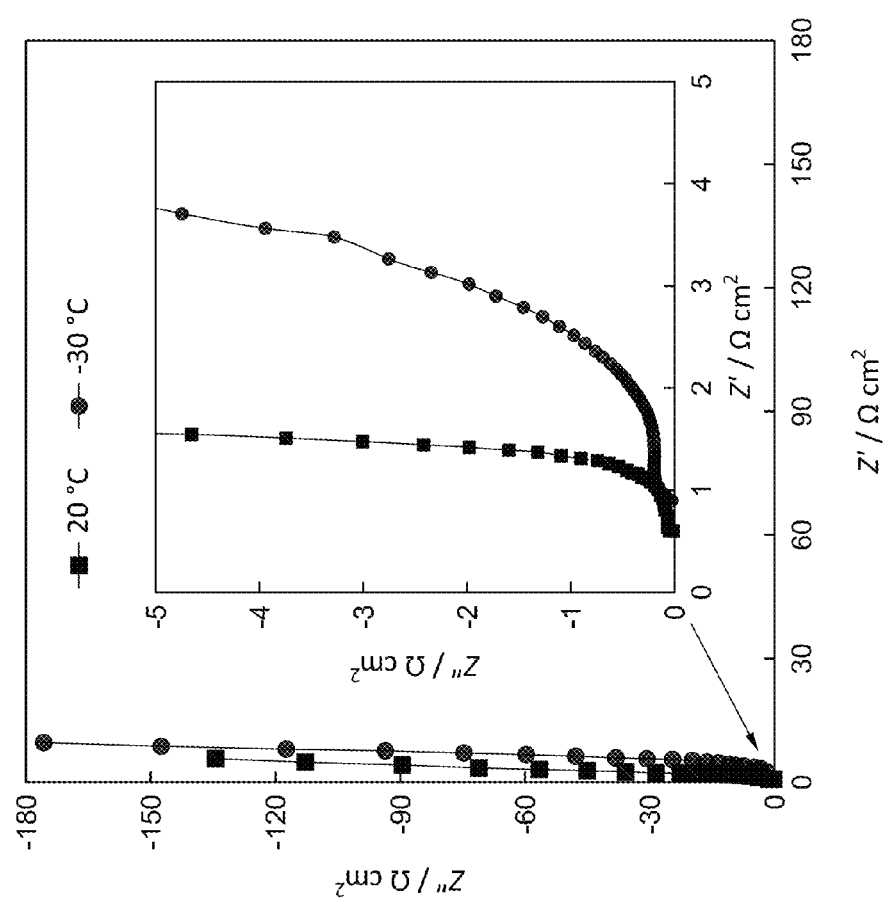

FIG. 20 shows complex impedance plane plots for two ultramicroporous-microporous-mesoporous electropun electrode/separator cells (isostatically compressed at 20 degrees Celsius for 2 minutes) at 20 degrees Celsius and at −30 degrees Celsius (as marked in the Figure).

Figure 21:
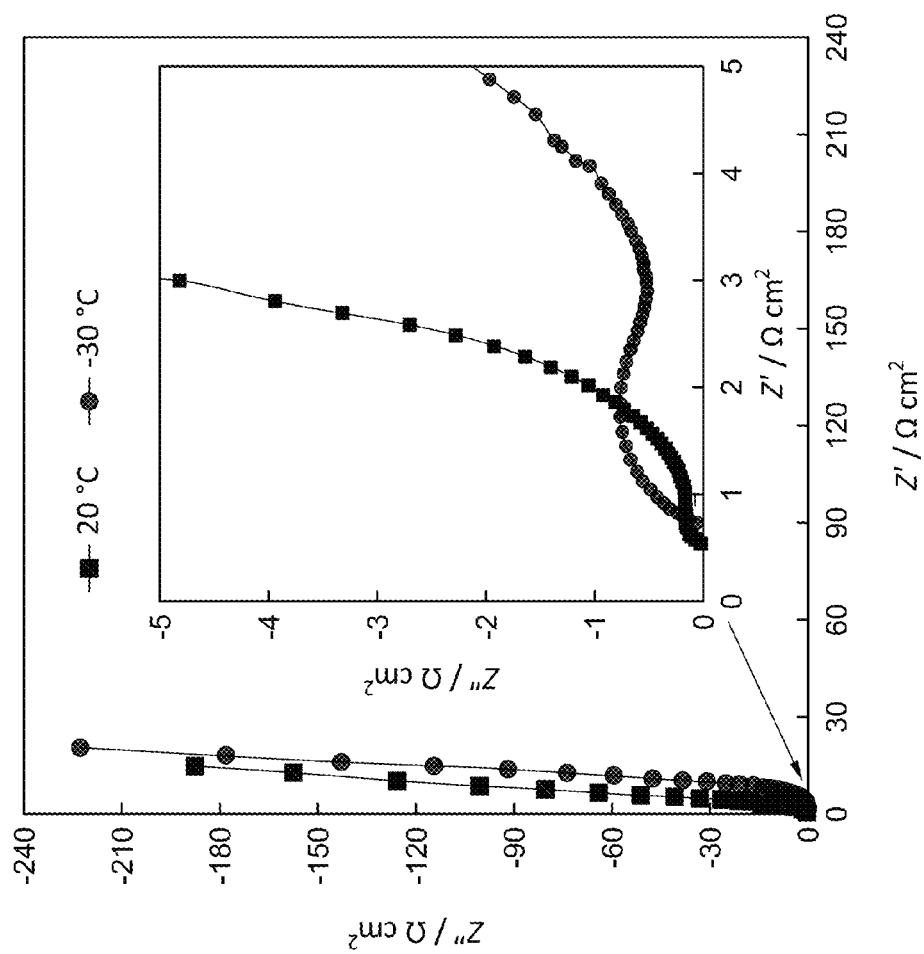

FIG. 21 shows Nyquist plots for non-compressed electrospun electrode/electrospun membrane based single cells measured at a temperature of 20 degrees Celsius and at a temperature of −30 degrees Celsius (as marked in the Figure).

Figure 22:
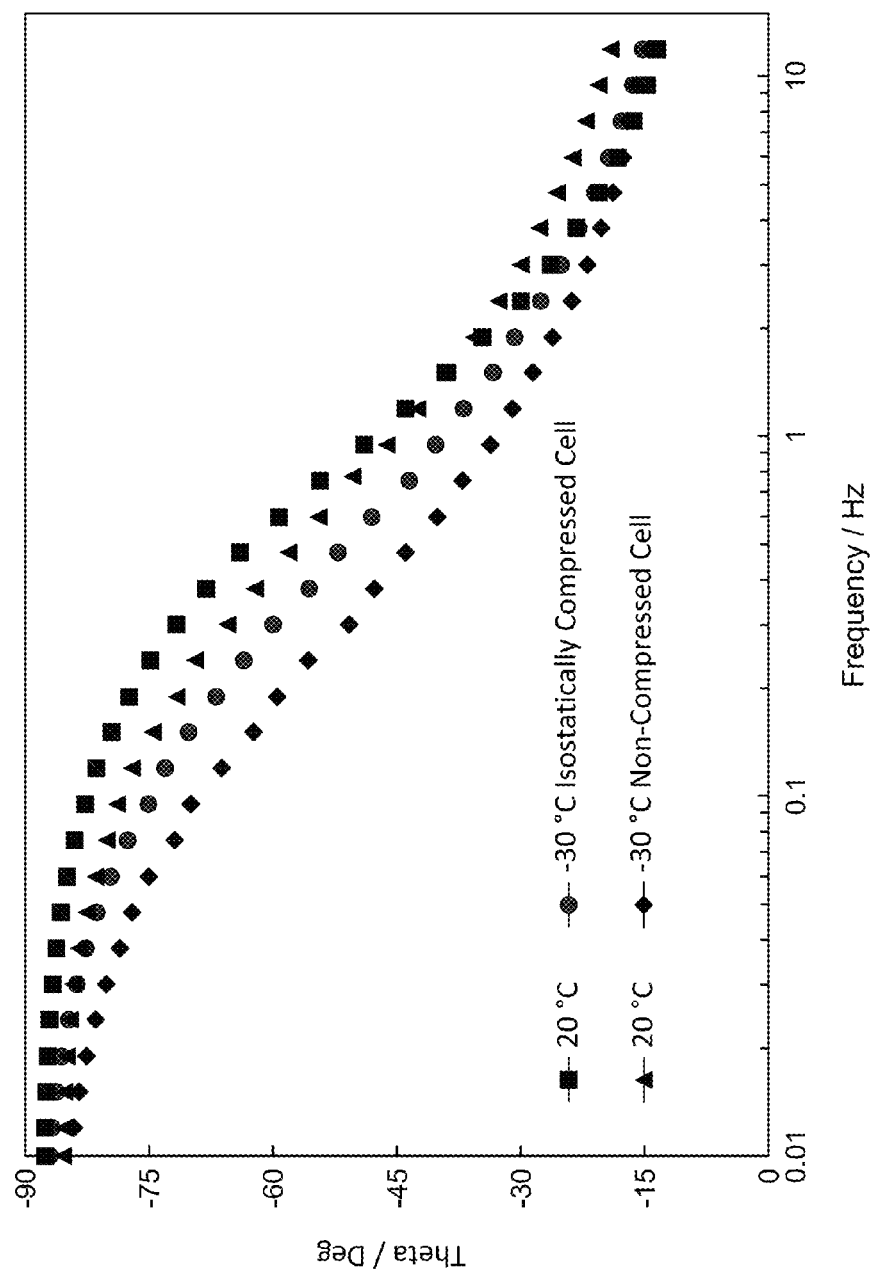

FIG. 22 shows phase angle vs. log ac frequency (log f) plots for two electrode-membrane combinations. One combination is an electrospun electrode with an electrospun membrane that were isostatically compressed at 20 degrees Celsius for 2 minutes; the other combination is an electrospun electrode with an electrospun membrane that were not isostatically compressed. Data at 20 and −30 degrees Celsius are provided in the Figure.

Figure 23:
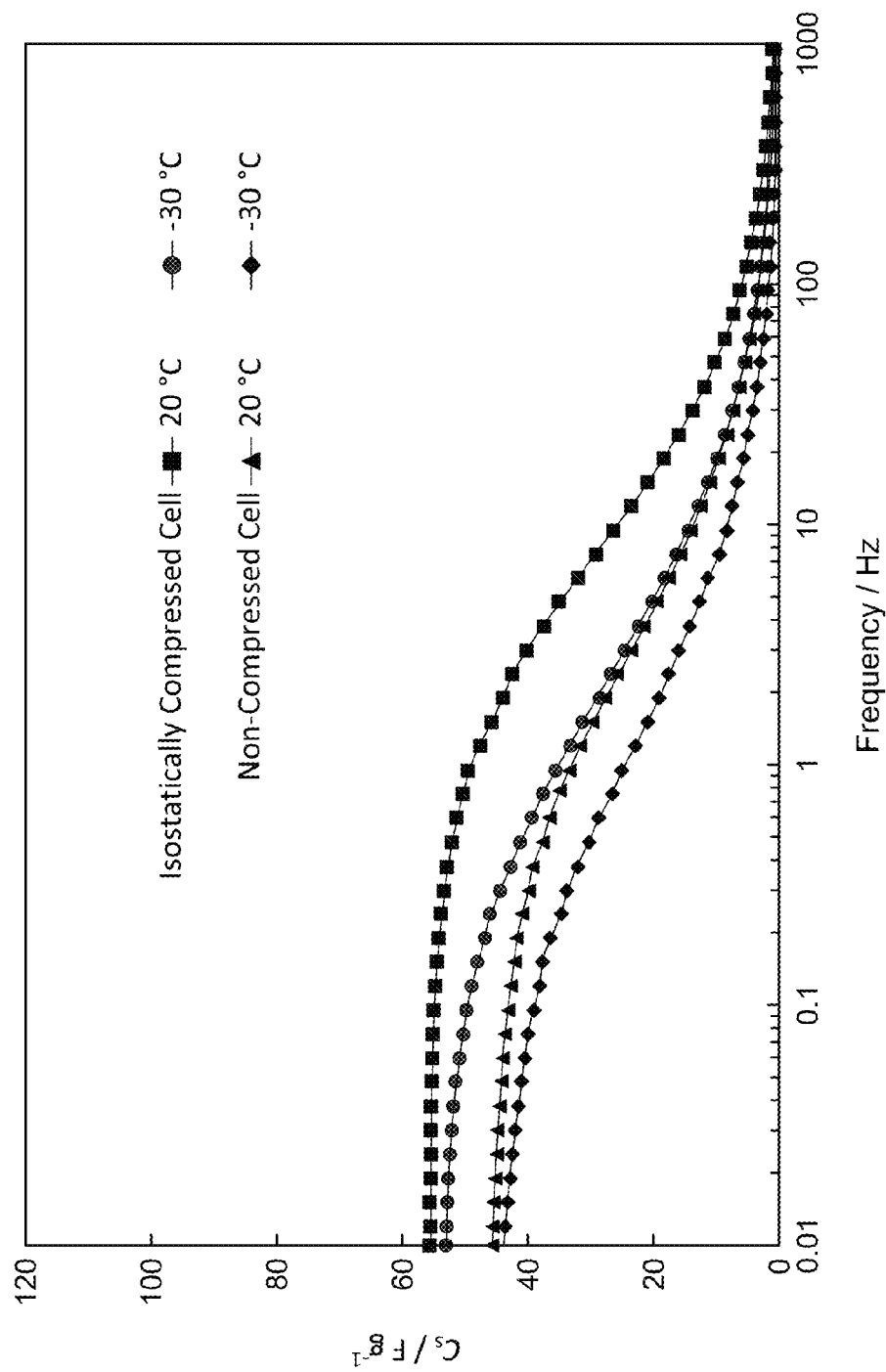

FIG. 23 illustrates series capacitance vs. log ac frequency (log f) plots for isostatically compressed and not compressed single cells. Data at 20 and −30 degrees Celsius are provided in the Figure.

Figure 24:
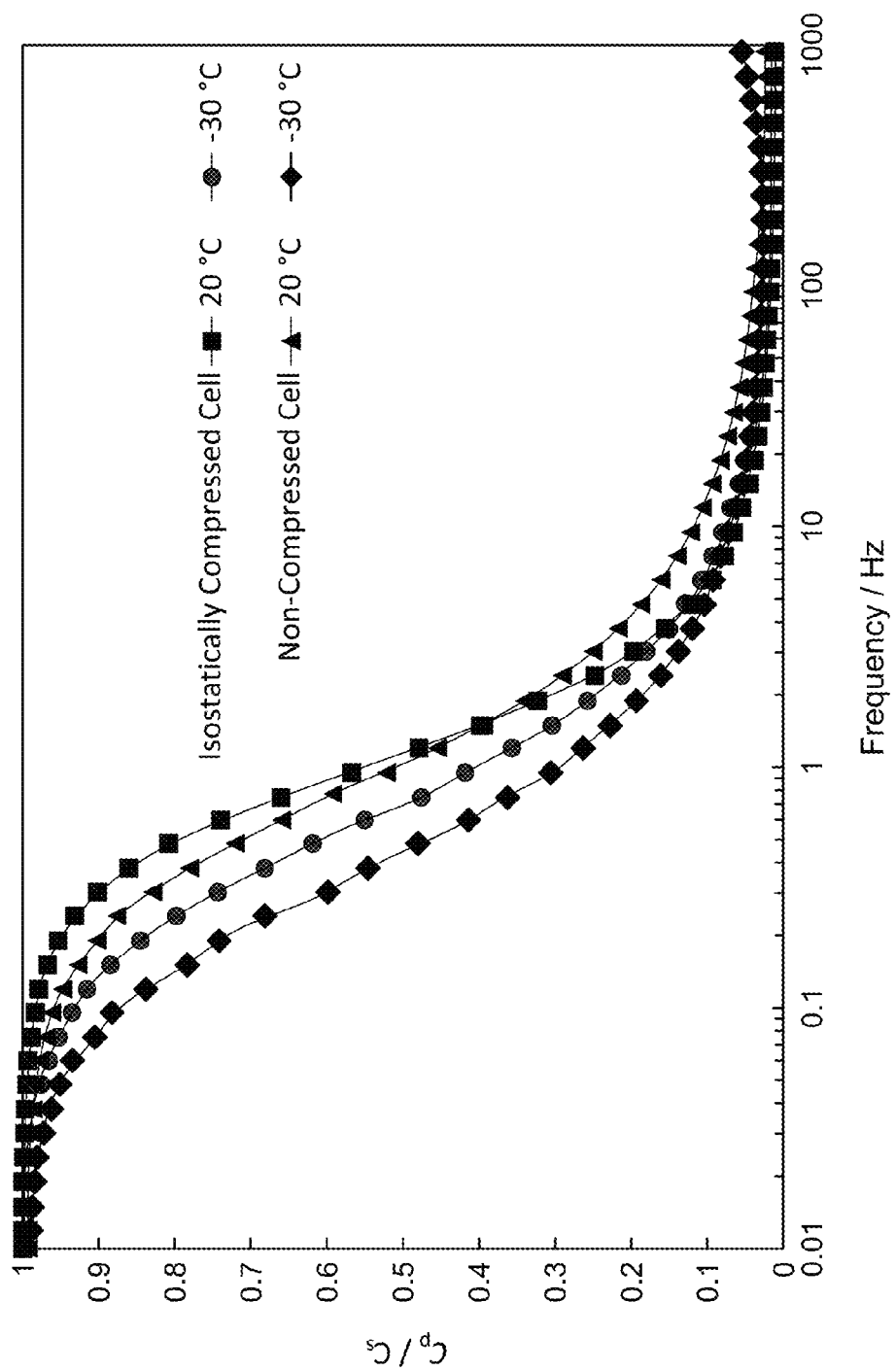

FIG. 24 illustrates the ratio of parallel capacitance $$C_p = C_s\left(1 + \tan^2\left(\frac{Z'(\omega)}{Z''(\omega)}\right)\right),$$

and series capacitance $$C_s = \frac{1}{\omega Z''(\omega)},$$

vs. log of ac frequency (log f) plots for electrospun cells in which the electrodes and separator were isostatically compressed, and electrospun cells in which the electrodes/separator were not isostatically compressed. Data at 20 and −30 degrees Celsius are provided in the Figure.

Figure 25:
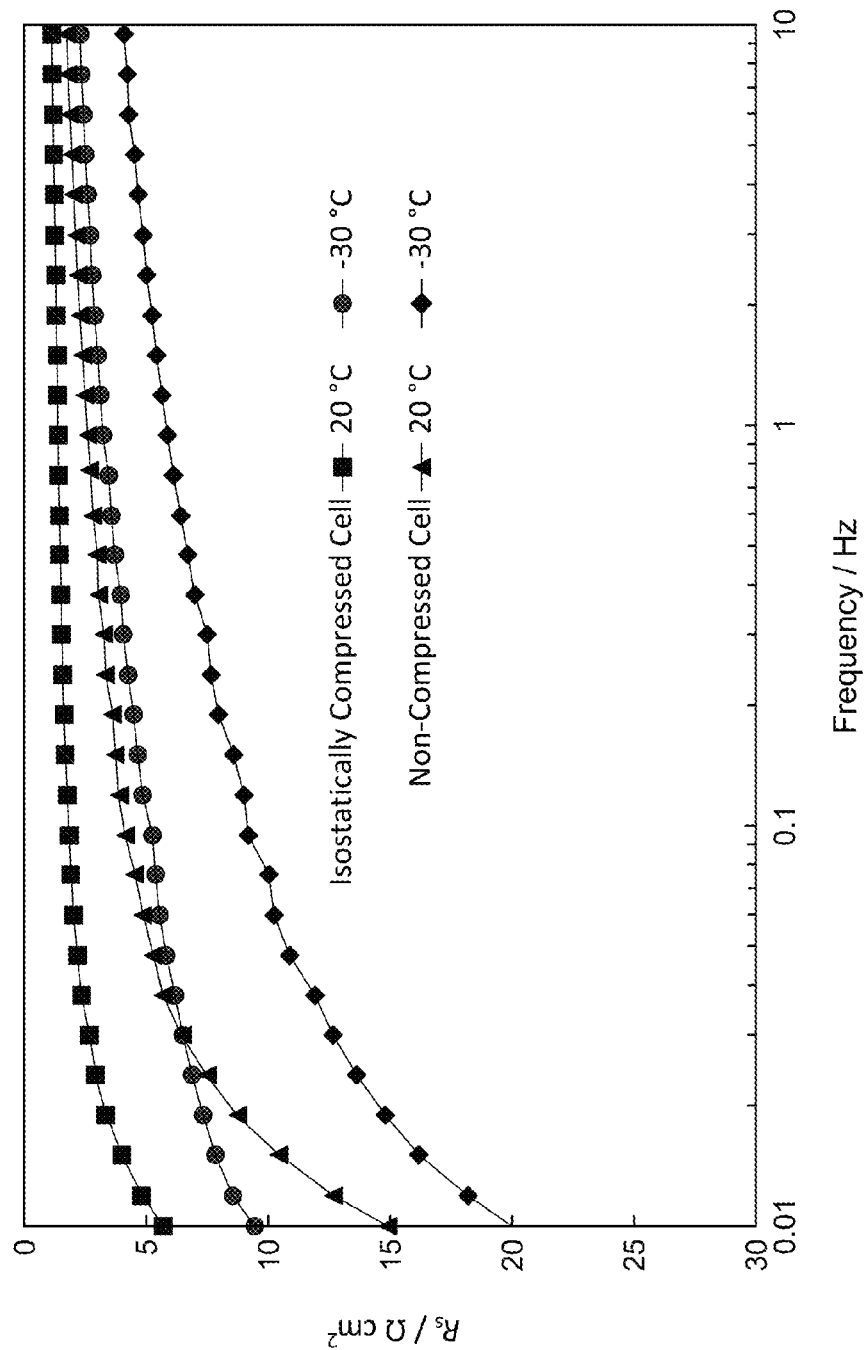
Figure 26:
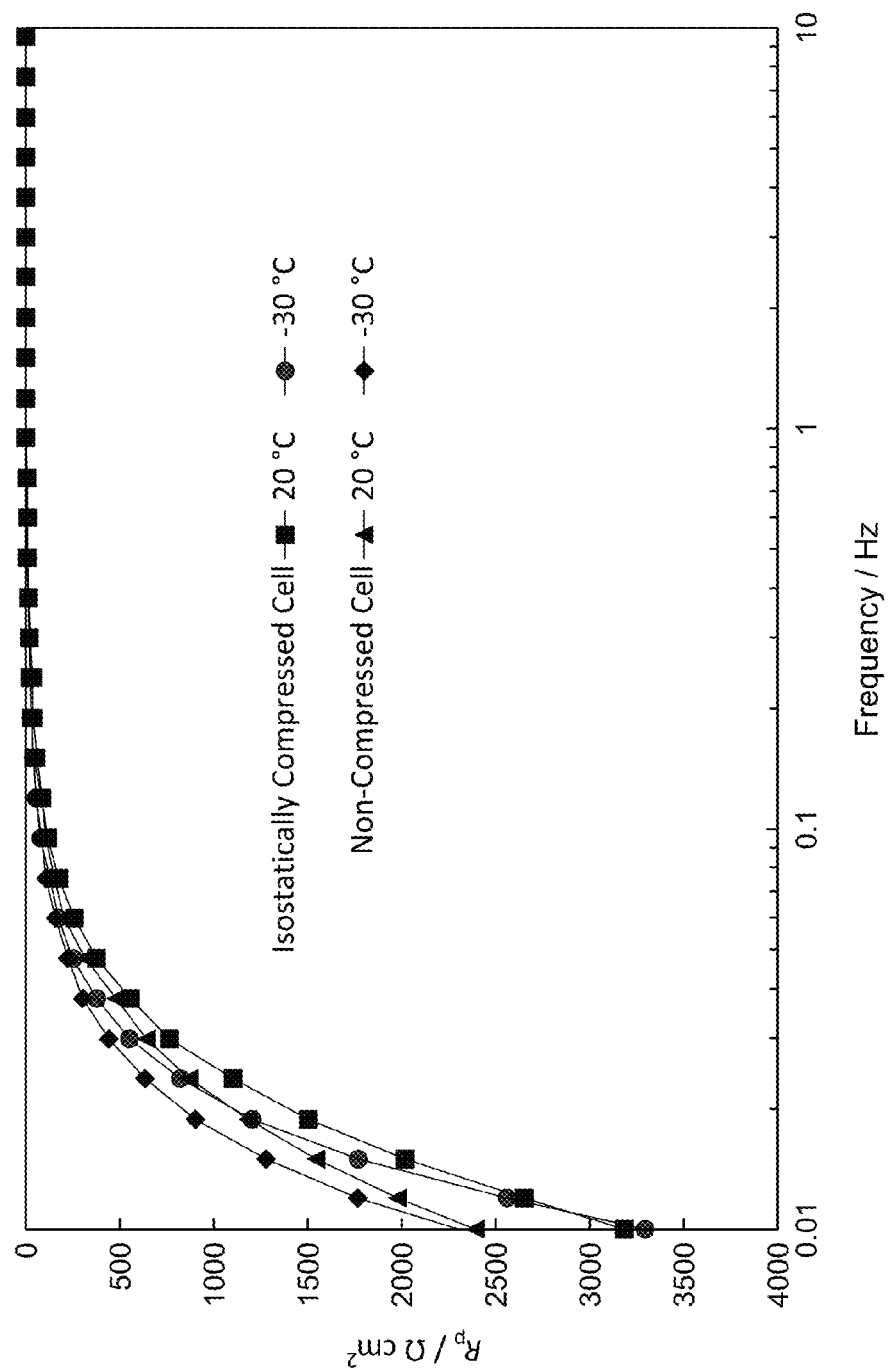

FIG. 25 shows series resistance $R_s = Z'(\omega)$ and FIG. 26 shows parallel resistance $$R_p = R_s\left(1 + \frac{1}{\tan^2\left(\frac{Z'(\omega)}{Z''(\omega)}\right)}\right)$$

plotted against log ac frequency (log f) for electrospun cells made with and without isostatic compression. Data at 20 and −30 degrees Celsius are provided in the Figures.

Figure 27:
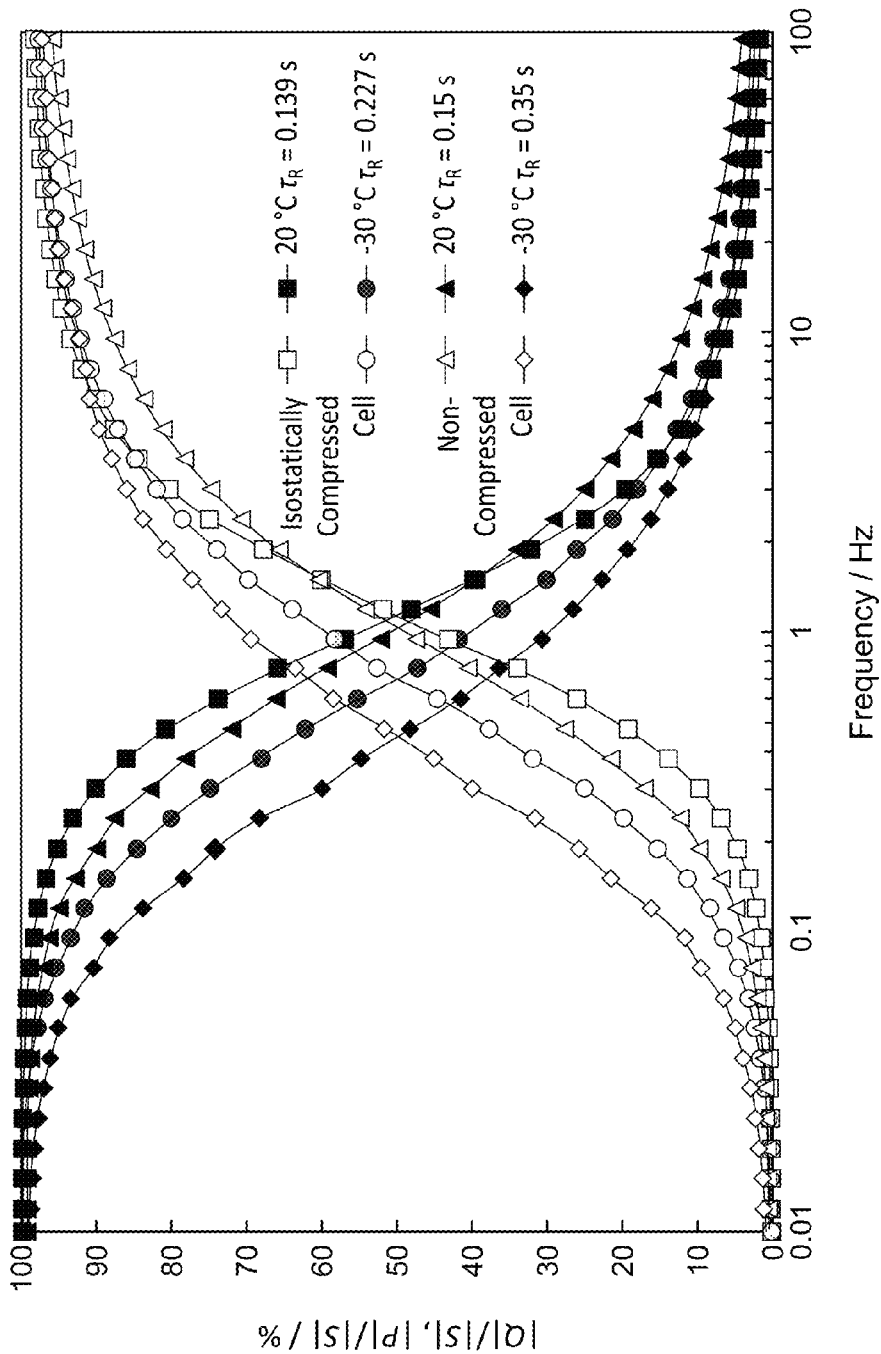

FIG. 27 shows the complex power plots calculated from impedance plane plots for ultramicroporous-microporous-mesoporous electrospun single cells made with and without isostatic compression. The characteristic time constants for charging/discharging of an EDLC are given in seconds in this Figure. Data at 20 and −30 degrees Celsius are provided.

Figure 28:
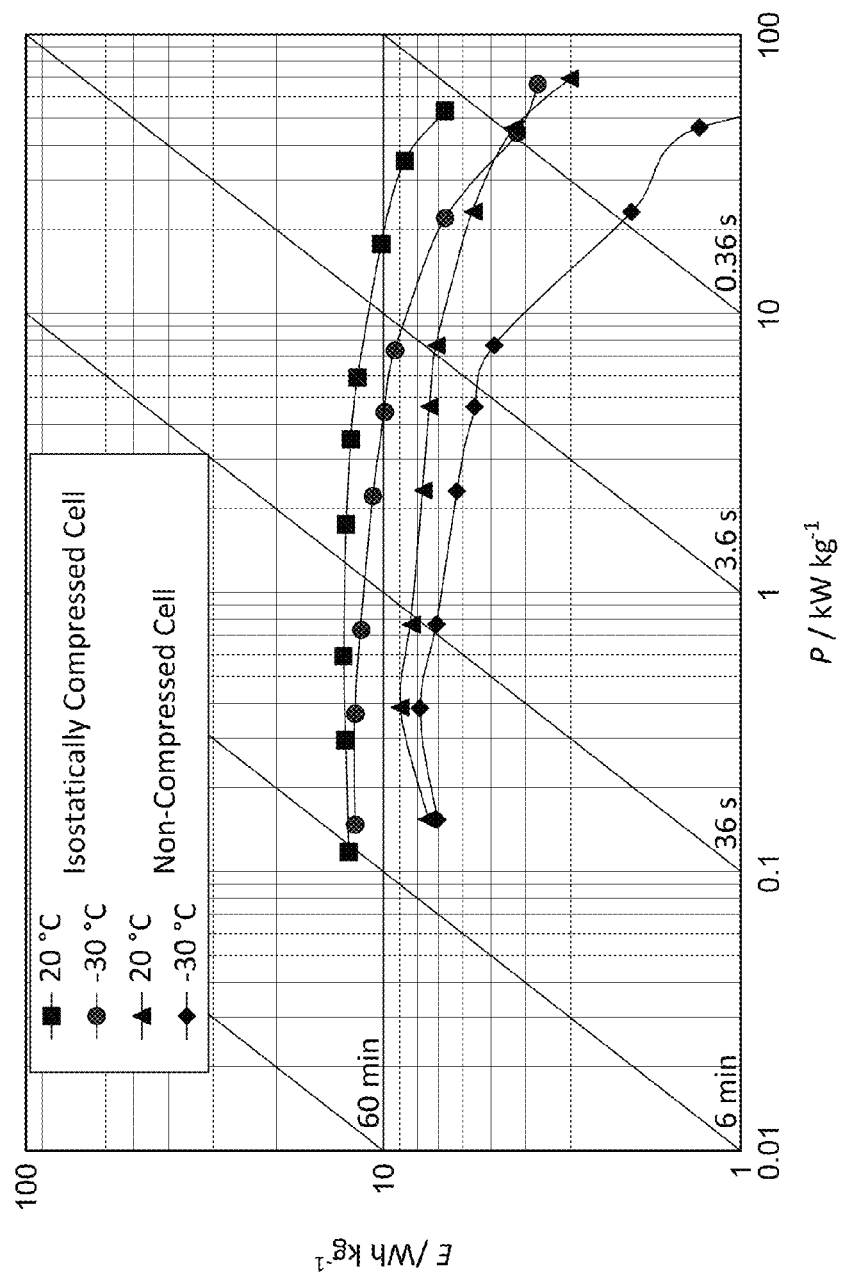

FIG. 28 shows Ragone (energy density vs. power density) plots for microporous-mesoporous electrospun electrode/separator/electrode based single cells made with and without isostatic compression, calculated from the constant power discharge data at various temperatures. Plots at 20 and −30 degrees Celsius are provided in the Figure.

Figure 29:
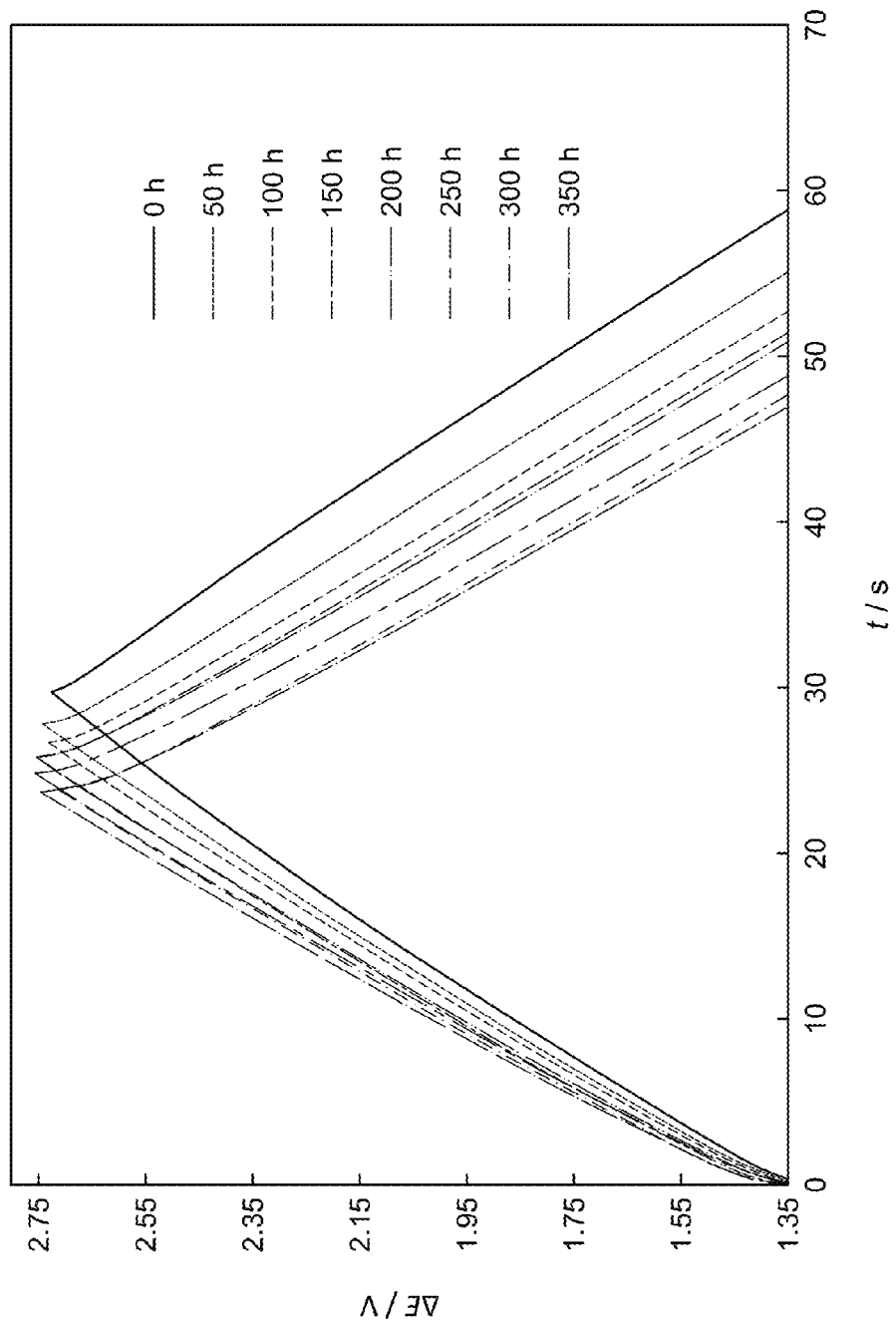

FIG. 29 shows constant current charge/discharge (at current $2 A*g^{-1}$) data for an EDLC made with electrospun cells at floating (time stability testing) conditions at −30 degrees Celsius, measured at fixed floating times, which are indicted in the Figure.

Figure 30:
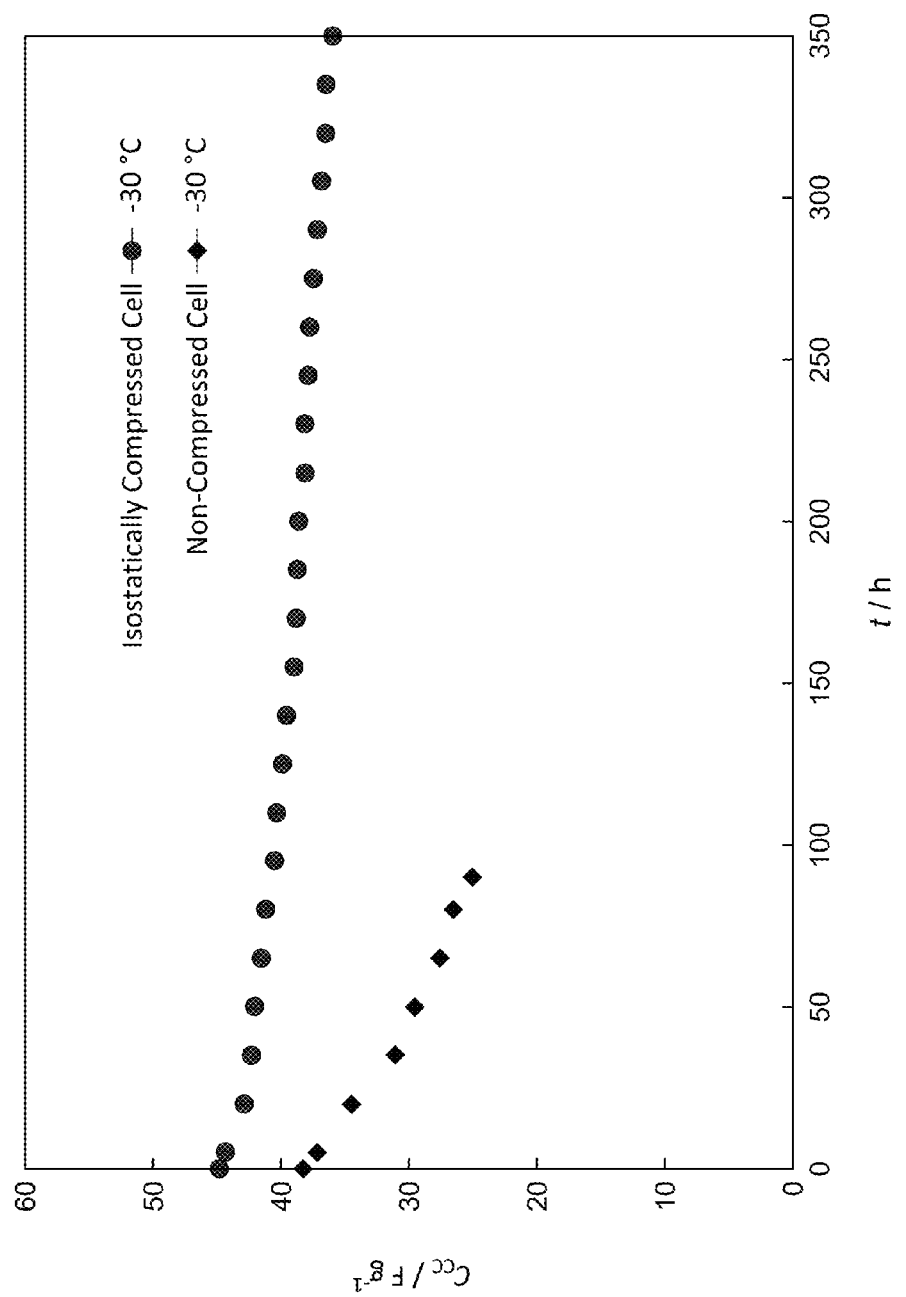

FIG. 30 shows dependence of capacitance vs. floating time (calculated from constant current charge/discharge data) for electrospun cells containing half-cells made with and without isostatic compression.

Finally, we list a number of publications to which a person skilled in the art may turn to understand better the present disclosure. Each of these publications is incorporated by reference in its entirety. The publications are:

B. E. Conway, Electrochemical Supercapacitors, Scientific Fundamentals and Technological Applications, New York: Kluwer Academic/Plenum Publishers, 1999.

F. Beguin, E. Frackowiak, Carbons for Electrochemical Energy Storage and Conversion Systems, New York: CRN Press, 2010.

R. Kötz, M. Carlen, "Principles and applications of electrochemical capacitors". Electrochim. Acta, vol. 45, p. 2483-2498, 2000.

A. G. Pandolfo, A. F. Hollenkamp, "Carbon properties and their role in supercapacitors". J. Power Sources, vol. 157, p. 11-27, 2006.

P. Simon, Y. Gogotsi, "Materials for electrochemical capacitors". Nature Materials, vol. 7, p. 845-854, 2008.

E. Lust, A. Jänes, T. Pärn, P. Nigu, "Influence of nanoporous carbon electrode thickness on the electrochemical characteristics of a nanoporous carbon|tetraethylammonium tetrafluoroborate in acetonitrile solution interface". J. Solid State Electrochem., vol. 8, p. 224-237, 2004.

E. Lust, G. Nurk, A. Jänes, M. Arulepp, P. Nigu, P. Möller, S. Kallip, V. Sammelselg, "Electrochemical properties of nanoporous carbon electrodes in various nonaqueous electrolytes". J. Solid State Electrochem., vol. 7, p. 91-105, 2003.

A. Jänes, T. Thomberg, E. Lust, "Synthesis and characterisation of nanoporous carbide-derived carbon by chlorination of vanadium carbide". Carbon, vol. 45, p. 2717-2722, 2007.

A. Jänes, T. Thomberg, H. Kurig, E. Lust, "Nanoscale fine-tuning of porosity of carbide-derived carbon prepared from molybdenum carbide". Carbon, vol. 47, p. 23-29, 2009.

I. Tallo, T. Thomberg, A. Jänes, E. Lust, "Electrochemical behavior of alpha-tungsten carbide-derived carbon based electric double-layer capacitors". J. Electrochem. Soc., vol. 159, p. A208-A213, 2012.

H. I. Becker, "Low voltage electrolytic capacitor". U.S. Pat. No. 2,800,616 A, 1957.

I. K. Yoshida Akihiko, "Electric double layer capacitor and method for producing the same". U.S. Pat. No. 5,150,283, 1992.

A. W. Roy Richner, "Method for cross-linking carbon or carbon material such as industrial carbon black and active carbon, use thereof in the production of electrochemical double layer capacitor electrodes". Patent WO2001045121 A1, 2001.

E. N. Mrotek, B. Reichman, M. P. Yin, "Porous electrodes containing activated carbon powders and fibers in matrix of carbonized resin, high strength, low resistance". U.S. Pat. No. 5,776,633, 1998.

M. Endo, K. Watanabe, K. Tanaka, H. Mukouyama, "Method of manufacturing polarizable electrode for electric double-layer capacitor". U.S. Pat. No. 5,277,729, 1994.

I. Tallo, T. Thomberg, H. Kurig, A. Janes, K. Kontturi, E. Lust, "Supercapacitors based on carbide-derived carbons synthesised using HCl and Cl-2 as reactants". J. Solid State Electrochem., vol. 17, p. 19-28, 2013.

I. Tallo, T. Thomberg, K. Kontturi, A. Jänes, E. Lust, "Nanostructured carbide-derived carbon synthesized by chlorination of tungsten carbide". Carbon, vol. 49, p. 4427-4433, 2011.

I. Tallo, T. Thomberg, H. Kurig, K. Kontturi, A. Jänes, E. Lust, "Novel micromesoporous carbon materials synthesized from tantalum hafnium carbide and tungsten titanium carbide". Carbon, vol. 67, p. 607-616, 2014.

T. Thomberg, T. Tooming, T. Romann, R. Palm, A. Jänes, E. Lust, "High power density supercapacitors based on the carbon dioxide activated D-glucose derived carbon electrodes and acetonitrile electrolyte". J. Electrochem. Soc., vol. 160, p. A1834-A1841, 2013.

T. Thomberg, H. Kurig, A. Jänes, E. Lust, "Mesoporous carbide-derived carbons prepared from different chromium carbides". Microporous and Mesoporous Materials, vol. 141, p. 88-93, 2011.

T. Thomberg, A. Jänes, E. Lust, "Energy and power performance of electrochemical double-layer capacitors based on molybdenum carbide derived carbon". Electrochim. Acta, vol. 55, p. 3138-3143, 2010.

T. Thomberg, A. Jänes, E. Lust, "Energy and power performance of vanadium carbide derived carbon electrode materials for supercapacitors." J. Electroanal. Chem., vol. 630, p. 55-62, 2009.

T. Tooming, T. Thomberg, L. Siinor, K. Tõnurist, A. Jänes, E. Lust, "A type high capacitance supercapacitor based on mixed room temperature ionic liquids containing specifically adsorbed iodide anions". J. Electrochem. Soc., vol. 161, p. A222-A227, 2014.

T. Tooming, T. Thomberg, H. Kurig, A. Jänes, E. Lust, "High power density supercapacitors based on the carbon dioxide activated d-glucose derived carbon electrodes and 1-ethyl-3-methylimidazolium tetrafluoroborate ionic liquid". J. Power Sources, vol. 280, p. 667-677, 2015.

E. Tee, I. Tallo, H. Kurig, T. Thomberg, A. Jänes, E. Lust, "Huge enhancement of energy storage capacity and power density of supercapacitors based on the carbon dioxide activated microporous SiC-CDC". Electrochim. Acta, vol. 161, p. 364-370, 2015.

M. Eikerling, A. A. Kornyshev, E. Lust, "Optimized structure of nanoporous carbon-based double-layer capacitors". J. Electrochem. Soc., vol. 152, p. E24-E33, 2005.

A. Jänes, L. Permann, M. Arulepp, E. Lust, "Electrochemical characteristics of nanoporous carbide-derived carbon materials in non-aqueous electrolyte solutions". Electrochem. Commun., vol. 6, p. 313-318, 2004.

E. Lust, A. Jänes, M. Arulepp, "Influence of electrolyte characteristics on the electrochemical parameters of electrical double layer capacitors". J. Solid State Electrochem., vol. 8, p. 488-496, 2004.

E. Lust, A. Jänes, M. Arulepp, "Influence of solvent nature on the electrochemical parameters of electrical double layer capacitors". J. Electroanal. Chem., vol. 562, p. 33-42, 2004.

K. Tõnurist, I. Vaas, T. Thomberg, A. Jänes, H. Kurig, T. Romann, E. Lust, "Application of multistep electrospinning method for preparation of electrical double-layer capacitor half-cell". Electrochim. Acta, vol. 119, p. 72-77, 2014.

A. Jänes, E. Lust, "Use of organic esters as co-solvents for electrical double layer capacitors with low temperature performance". J. Electroanal. Chem., vol. 588, p. 285-295, 2006.

A. Laheäär, A. Jänes, E. Lust, "Electrochemical properties of carbide-derived carbon electrodes in non-aqueous electrolytes based on different Li-salts". Electrochim. Acta, vol. 56, p. 9048-9055, 2011.

A. Jänes, J. Eskusson, T. Thomberg, E. Lust, "Supercapacitors based on propylene carbonate with small addition of different sulfur containing organic solvents". J. Electrochem. Soc., vol. 161, p. A1284-A1290, 2014.

A. Jänes, J. Eskusson, T. Thomberg, E. Lust, "Electrochemical double layer capacitors based on propylene carbonate solution operating from −45° C. to 100° C.". J. Electrochem. Soc., vol. 161, p. A712-A717, 2014.

R. Väli, A. Laheäär, A. Jänes, E. Lust, "Characteristics of non-aqueous quaternary solvent mixture and Na-salts based supercapacitor electrolytes in a wide temperature range". Electrochim. Acta, vol. 121, p. 294-300, 2014.

K. Tõnurist, T. Thomberg, A. Jänes, E. Lust, "Specific performance of supercapacitors at lower temperatures based on different separator materials". J. Electrochem. Soc., vol. 160, p. A1-A9, 2013.

K. Liivand, I. Vaas, T. Thomberg, A. Jänes, E. Lust, "Low temperature performance of electrochemical double-layer capacitor based on electrospun half-cells". J. Electrochem. Soc., vol. 162, p. A5031-A5036, 2015.

H. Kurig, M. Vestli, K. Tõnurist, A. Jänes, E. Lust, "Influence of room temperature ionic liquid anion chemical composition and electrical charge delocalization on the supercapacitor properties". J. Electrochem. Soc., vol. 159, p. A944-A951, 2012.

H. Kurig, M. Vestli, A. Jänes, E. Lust, Electrical double layer capacitors based on two 1-ethyl-3-methylimidazolium ionic liquids with different anions". Electrochem. Solid-State Lett., vol. 14, p. A120-A122, 2011.

H. Kurig, A. Jänes, E. Lust, "Electrochemical characteristics of carbide-derived carbon 1-ethyl-3-methylimidazolium tetrafluoroborate supercapacitor cells". J. Electrochem. Soc., vol. 157, p. A272-A279, 2010.

R. Palm, H. Kurig, K. Tõnurist, A. Jänes, E. Lust, "Is the mixture of 1-ethyl-3-methylimidazolium tetrafluoroborate and 1-butyl-3-methylimidazolium tetrafluoroborate applicable as electrolyte in electrical double layer capacitors?". Electrochem. Comm., vol. 22, p. 203-206, 2012.

R. Palm, H. Kurig, K. Tõnurist, A. Jänes, E. Lust, "Electrical double layer capacitors based on 1-ethyl-3-methylimidazolium tetrafluoroborate with small addition of acetonitrile". Electrochim. Acta, vol. 85, p. 139-144, 2012.

R. Palm, H. Kurig, K. Tõnurist, A. Jänes, E. Lust, "Influence of different organic solvent additives on 1-ethyl-3-methylimidazolium tetrafluoroborate electrolyte based electrical double layer capacitors". J. Electrochem. Soc., vol. 160, p. A1741-A1745, 2013.

K. Tõnurist, T. Thomber, A. Jänes, I. Kink, E. Lust, "Specific performance of electrical double layer capacitors based on different separator materials in room temperature ionic liquid". Electrochem. Commun., vol. 22, p. 77-80, 2012.

A. Jänes, T. Thomberg, J. Eskusson, E. Lust, "Fluoroethylene carbonate as co-solvent for propylene carbonate based electrical double layer capacitors". J. Electrochem. Soc., vol. 160, p. A1025-A1030, 2013.

A. Jänes, E. Lust, Micro- and mesoporous carbon based electrode materials for electrical double layer capacitors, J. Weidner, N. Dudney, S. Minteer, K. Zaghib, Edit., Electrochem. Soc., p. 269-278, 2008.

K. Tõnurist, T. Thomberg, A. Jänes, T. Romann, V. Sammelselg, E. Lust, "Polymorphic behavior and morphology of electrospun poly(vinylidene fluoride) separartor material for non-aqueous electrolyte based electric double layer capacitors". ECS Transactions, vol. 50, p. 49-58, 2013.

K. Tõnurist, A. Jänes, T. Thomberg, H. Kurig, E. Lust, "Influence of mesoporous separator properties on the parameters of electrical double-layer capacitor single cells". J. Electrochem. Soc., vol. 156, p. A334-A342, 2009.

K. Tõnurist, T. Thomberg, A. Jänes, T. Romann, V. Sammelselg, E. Lust, "Influence of separator properties on electrochemical performance of electrical double-layer capacitors". J. Electroanal. Chem., vol. 689, p. 8-20, 2013.

A. Laheäär, A.-L. Peikolainen, M. Koel, A. Jänes, E. Lust, "Comparison of carbon aerogel and carbide-derived carbon as electrode materials for non-aqueous supercapacitors with high performance". J. Solid State Electrochem., vol. 16, p. 2717-2722, 2012.

W. J. Morton, "Method of dispersing fluids". U.S. Pat. No. 705,691, 1902.

A. Formhals, "Process and apparatus for preparing artificial threads". U.S. Pat. No. 1,975,504, 1934.

A. Formhals, "Method and apparatus for spinning". U.S. Pat. No. 2,160,962, 1939.

A. Formhals, "Artificial thread and method of producing same". U.S. Pat. No. 2,187,306, 1949.

S. Cavaliere, S. Subianto, I. Savych, D. J. Jones, J. Roziere, "Electrospinning: designed architectures for energy conversion and storage devices". Energy & Environmental Science, vol. 4, p. 4761-4785, 2011.

Z. Dong, S. J. Kennedy, Y. Wu, "Electrospinning materials for energy-related applications and devices". J. Power Sources, vol. 196, p. 4886-4904, 2011.

C. Kim, K. S. Yang, "Electrochemical properties of carbon nanofiber web as an electrode for supercapacitor prepared by electrospinning". App. Phys. Lett., vol. 83, p. 1216-1218, 2003.

C. Kim, B. T. N. Ngoc, K. S. Yang, M. Kojima, Y. A. Kim, Y. J. Kim, M. Endo, S. C. Yang, "Self-sustained thin webs consisting of porous carbon nanofibers for supercapacitors via the electrospinning of polyacrylonitrile solutions containing zinc chloride". Advanced Materials, vol. 19, p. 2341-2346, 2007.

C. Kim, Y.-O. Choi, W.-J. Lee ja K.-S. Yang, "Supercapacitor performances of activated carbon fiber webs prepared by electrospinning of PMDA-ODA poly(amic acid) solutions". Electrochim. Acta, vol. 50, p. 883-887, 2004.

Although steps of various methods may have been described serially in this disclosure, some of the steps may be performed in conjunction or in parallel, asynchronously or synchronously, in a pipelined manner, or otherwise. There is no particular requirement that the steps be performed in the same order in which this description lists them and the accompanying Figures show them, except where explicitly so indicated, otherwise made clear from the context, or inherently required. It should be noted, however, that in selected examples the steps are performed in the particular progressions described in this document and/or shown in the accompanying Figures. Furthermore, not every illustrated step and decision may be required in every embodiment, while some steps that have not been specifically illustrated may be desirable or necessary in some embodiments.

The features described throughout this document may be present individually, or in any combination or permutation, except where the presence or absence of specific features in a given combination or permutation is inherently required, explicitly indicated, or otherwise made clear from the context.

The inventive methods for manufacturing electrodes, membranes, half-cells, and full cells, as well as the electrodes, membranes, half-cells, and full cells (electrode-separator/membrane-electrode) made using the methods have been described above in considerable detail. This was done for illustration purposes. Neither the specific embodiments of the disclosure as a whole, nor those of the features, necessarily limit the general principles underlying the disclosure of this document. In particular, the inventive methods and articles are not necessarily limited to double layer capacitors, but extend to other electrode applications. The specific features described herein may be used in some embodiments, but not in others, without departure from the spirit and scope of the invention(s) as set forth. Many additional modifications are intended in the foregoing disclosure, and it will be appreciated by those of ordinary skill in the art that, in some instances, some of the disclosed features may be used in the absence of a corresponding use of other features. The illustrative examples therefore do not necessarily define the metes and bounds of the invention (or the inventions, as the case may be) and the legal protection afforded the invention(s), which function is served by the claims and their equivalents.

What is claimed is:

1. A method of manufacturing a component for energy storage devices, the method comprising steps of:
    preparing a first solution of a first polymer in one or more solvents;
    electrospinning the first solution in a DC electric field between 0.5 kV/cm and 1.5 kV/cm using a pumping rate of between 0.5 ml/h per needle and 5 ml/h per needle;
    collecting fibers resulting from the step of electrospinning to obtain a separator;
    providing a charge carrier material;
    providing a second polymer binder selected from the group consisting of polyvinylidene difluoride (PVDF), polytetrafluoroethylene (PTFE) and Nafion;
    mixing the charge carrier material, the second polymer binder, and graphic powder in a second solvent for between 5 and 48 hours to form a suspension becoming microheterogeneous from about 2 to about 15 μm suspension, where the second solvent is a mixture of dimethylformamide (DMF) and acetone, the concentration of the second solvent in the suspension is between about 15 and about 25 percent by weight, and the ratio of DMF to acetone in the second solvent is between 70/30 and 95/5 by weight and ratio of the charge carrier material to graphite powder is between 80/20 and 95/5 by weight;
    electrospinning the suspension onto the separator by drop-wise feeding the suspension in a DC electric field of between 1.0 kV/cm and 1.8 kV/cm, thereby depositing an electrode onto the separator and obtaining a separator-electrode combination;
    drying the electrode of the separator-electrode combination
    depositing a current collector layer onto the electrode, wherein the current collector layer and the separator are on opposite sides of the electrode; and
    isostatically compressing in three dimensions the separator-electrode combination at a temperature between 20 and 80 degrees Celsius with applied pressure of between 3 MPa to about 25 MPa, for between 0.5 minute and 20 minutes, thereby obtaining the component;
    wherein the step of providing the charge carrier material comprises:
    providing carbon powder;
    increasing porosity of the carbon powder;
    eliminating chlorine and chloride from the carbon powder by exposing the carbon powder to hydrogen for between one hour and two hours at a temperature of between 600 degrees Celsius and 1000 degrees Celsius;
    expelling adherent hydrogen from the carbon powder; and
    depositing onto the carbon powder at least one set of items selected from the group consisting of: redox-active catalytical d-metal centers, Pt-nanoclusters, Ir-nanoclusters, and Pt—Ru-nanoclusters; wherein the step of increasing porosity comprises applying a micropores-mesopores forming agent and at least one step selected from the group consisting of:
    a. exposing the carbon powder to $CO_2$ at a temperature between 500 degrees Celsius and 1200 degrees Celsius for a duration of between 2 and about 16 hours;
    b. exposing the carbon powder to gaseous HCl at a temperature between 600 degrees Celsius and 1200 degrees Celsius for between 0.5 hour and 10 hours; and
    c. exposing the carbon powder to at least one of gaseous $CO_2$, $H_2O$, and $ZnCl_2$ at a temperature between 600 degrees Celsius and 1200 degrees Celsius for between 2 hours and 14 hours.

2. The method of claim 1, wherein:
    concentration of the first polymer in the first solution is between 5 and 35 percent by weight;
    the second solvent comprises a mixture of dimethylformamide (DMF) and acetone; and
    concentration of DMF in the second solvent is between 75 and 85 percent by weight.

3. The method of claim 2, wherein viscosity of the first solution is between about 1 and about 50 Pa*s.

4. The method of claim 2, wherein the DC electric field used in the step of electrospinning the solution is 0.9 kV/cm and 1.3 kV/cm.

5. The method of claim 2, wherein the step of collecting is performed so that thickness of the separator is between 10 μm and 30 μm.

6. The method of claim 1, wherein the step of depositing onto the carbon powder comprises depositing onto the carbon powder one or more of oxides of metals selected from the group consisting of Mn, Fe, Co, Ni, V.

7. A method of making an electrochemical double layer capacitor, the method comprising:
    a. manufacturing the component in accordance with claim 1;
    b. providing a second half-cell; and
    c. combining the component, the second half-cell, and electrolyte to obtain the electrochemical double layer capacitor.

8. A method of making a hybrid supercapacitor, the method comprising:
    a. manufacturing the component in accordance with claim 1;
    b. providing a second half-cell; and
    c. combining the component, the second half-cell, and electrolyte to obtain the hybrid supercapacitor.

9. A method of making an electrical energy storage device, the method comprising:
   a. manufacturing the component in accordance with claim 1;
   b. providing at least one other component; and
   c. combining the component and the at least one other component to obtain the electrical energy storage device.

10. The method of claim 9, wherein the electrical energy storage device is at least one of Li-ion capacitor, Li-ion electrochemical electrical energy storage device, Na-ion capacitor, Na-ion electrochemical electrical energy storage device, and polymer electrolyte fuel cell energy storage device.

11. The component manufactured in accordance with the method of claim 1.

12. A method of manufacturing a component for energy storage devices, the method comprising steps of:
   preparing a first solution of a first polymer in one or more solvents;
   electrospinning the first solution in a DC electric field between 0.5 kV/cm and 1.5 kV/cm using a pumping rate of between 0.5 ml/h per needle and 5 ml/h per needle;
   collecting fibers resulting from the step of electrospinning to obtain a separator;
   providing a charge carrier material;
   providing a second polymer binder selected from the group consisting of polyvinylidene difluoride (PVDF), polytetrafluoroethylene (PTFE) and Nafion;
   mixing the charge carrier material, the second polymer binder, and graphic powder in a second solvent for between 5 and 48 hours to form a suspension becoming microheterogeneous from about 2 to about 15 μm suspension, where the second solvent is a mixture of dimethylformamide (DMF) and acetone, the concentration of the second solvent in the suspension is between about 15 and about 25 percent by weight, and the ratio of DMF to acetone in the second solvent is between 70/30 and 95/5 by weight and ratio of the charge carrier material to graphite powder is between 80/20 and 95/5 by weight;
   electrospinning the suspension onto the separator by drop-wise feeding the suspension in a DC electric field of between 1.0 kV/cm and 1.8 kV/cm, thereby depositing an electrode onto the separator and obtaining a separator-electrode combination;
   drying the electrode of the separator-electrode combination
   depositing a current collector layer onto the electrode, wherein the current collector layer and the separator are on opposite sides of the electrode; and
   isostatically compressing in three dimensions the separator-electrode combination at a temperature between 20 and 80 degrees Celsius with applied pressure of between 3 MPa to about 25 MPa, for between 0.5 minute and 20 minutes, thereby obtaining the component;
   wherein the step of providing the charge carrier material comprises:
   providing carbon powder;
   increasing porosity of the carbon powder;
   eliminating chlorine and chloride from the carbon powder by exposing the carbon powder to hydrogen for between one hour and two hours at a temperature of between 800 degrees Celsius and 900 degrees Celsius;
   expelling adherent hydrogen from the carbon powder; and
   depositing onto the carbon powder at least one set of items selected from the group consisting of: redox-active catalytical d-metal centers, Pt-nanoclusters, Ir-nanoclusters, and Pt—Ru-nanoclusters;
   wherein the step of increasing porosity comprises applying a micropores-mesopores forming agent and at least one step selected from the group consisting of:
   a. exposing the carbon powder to $CO_2$ at a temperature between 500 degrees Celsius and 1200 degrees Celsius for a duration of between 2 and about 16 hours;
   b. exposing the carbon powder to gaseous HCl at a temperature between 600 degrees Celsius and 1200 degrees Celsius for between 0.5 hour and 10 hours; and
   c. exposing the carbon powder to at least one of gaseous $CO_2$, $H_2O$, and $ZnCl_2$ at a temperature between 600 degrees Celsius and 1200 degrees Celsius for between 2 hours and 14 hours.

13. The method of claim 12, wherein:
   concentration of the first polymer in the first solution is between 5 and 35 percent by weight;
   the second solvent comprises a mixture of dimethylformamide (DMF) and acetone; and
   concentration of DMF in the second solvent is between 75 and 85 percent by weight.

14. The method of claim 13, wherein viscosity of the first solution is between about 1 and about 50 Pa*s.

15. The method of claim 13, wherein the DC electric field used in the step of electrospinning the solution is 0.9 kV/cm and 1.3 kV/cm.

16. The method of claim 13, wherein the step of collecting is performed so that thickness of the separator is between 10 μm and 30 μm.

17. The method of claim 12, wherein the step of depositing onto the carbon powder comprises depositing onto the carbon powder one or more of oxides of metals selected from the group consisting of Mn, Fe, Co, Ni, V.

18. A method of making an electrochemical double layer capacitor, the method comprising:
   a. manufacturing the component in accordance with claim 12;
   b. providing a second half-cell; and
   c. combining the component, the second half-cell, and electrolyte to obtain the electrochemical double layer capacitor.

19. A method of making a hybrid supercapacitor, the method comprising:
   a. manufacturing the component in accordance with claim 12;
   b. providing a second half-cell; and
   c. combining the component, the second half-cell, and electrolyte to obtain the hybrid supercapacitor.

20. A method of making an electrical energy storage device, the method comprising:
   a. manufacturing the component in accordance with claim 12;
   b. providing at least one other component; and
   c. combining the component and the at least one other component to obtain the electrical energy storage device.

21. The method of claim 20, wherein the electrical energy storage device is at least one of Li-ion capacitor, Li-ion electrochemical electrical energy storage device, Na-ion capacitor, Na-ion electrochemical electrical energy storage device, and polymer electrolyte fuel cell energy storage device.

* * * * *